(12) United States Patent
Hashima et al.

(10) Patent No.: US 7,257,521 B2
(45) Date of Patent: Aug. 14, 2007

(54) SUPPORT SYSTEM, AND COMPUTER-READABLE RECORDING MEDIUM IN WHICH SUPPORT PROGRAM IS RECORDED

(75) Inventors: Masayoshi Hashima, Kawasaki (JP); Yosuke Senta, Kawasaki (JP); Yuichi Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 606 days.

(21) Appl. No.: 09/754,301

(22) Filed: Jan. 5, 2001

(65) Prior Publication Data

US 2001/0016807 A1    Aug. 23, 2001

(30) Foreign Application Priority Data

Feb. 14, 2000    (JP)    ............................. 2000-034642

(51) Int. Cl.
- G06G 7/48 (2006.01)
- G06F 17/50 (2006.01)
- G06F 19/00 (2006.01)
- G11B 27/36 (2006.01)
- G11B 5/09 (2006.01)

(52) U.S. Cl. .............................. 703/7; 703/13; 700/98; 700/163; 360/31; 360/48

(58) Field of Classification Search .................... 703/7, 703/13; 700/98, 163; 360/31, 48
See application file for complete search history.

(56) References Cited

U.S. PATENT DOCUMENTS

| | | | |
|---|---|---|---|
| 5,331,571 A | 7/1994 | Aronoff et al. ............. 364/490 |
| 5,357,628 A | 10/1994 | Yuen ........................ 395/575 |
| 5,831,875 A | 11/1998 | Hirata et al. | |
| 5,907,487 A * | 5/1999 | Rosenberg et al. ........... 700/85 |
| 6,442,104 B1 * | 8/2002 | Ridgell et al. ................. 367/1 |
| 6,546,297 B1 * | 4/2003 | Gaston et al. ................ 700/83 |
| 6,615,091 B1 * | 9/2003 | Birchenough et al. ........ 700/96 |

FOREIGN PATENT DOCUMENTS

| EP | 1 111 483 A1 | 6/2001 |
|---|---|---|
| JP | 63-49851 | 3/1988 |

(Continued)

OTHER PUBLICATIONS

Harel et al, "STATEMATE: A Working Environment for the Development of Complex Reactive Systems", Proceedings of the 10th International Conference on Software Engineering, pp. 396-406, 1998.*

(Continued)

*Primary Examiner*—Anthony Knight
*Assistant Examiner*—Thomas H. Stevens
(74) *Attorney, Agent, or Firm*—Staas & Halsey LLP

(57) ABSTRACT

An apparatus concurrently executing designing of a mechanism and developing of embedded software. A three-dimensional-mechanism model simulates an operation of the mechanism, an embedded software developing section develops a control program to control the designing and operation of the mechanism in parallel to each other, a first interface inputs designing data from a mechanism designing section to the three-dimensional-mechanism model simulator for being dynamically reflected on the three-dimensional-mechanism model, and a second interface transfers data between the three-dimensional-mechanism model simulator and the embedded software developing section while synchronizing the simulator and the embedded software developing section with each other.

19 Claims, 76 Drawing Sheets

FOREIGN PATENT DOCUMENTS

| | | | |
|---|---|---|---|
| JP | 402253303 A | * | 1/1990 |
| JP | 2-253303 | | 10/1990 |
| JP | 05-242203 | | 9/1993 |
| JP | 9-050371 | | 2/1997 |
| JP | 9-190467 | | 7/1997 |
| JP | 9-305389 | | 11/1997 |
| JP | 10-91671 | | 4/1998 |
| JP | HEI 11-138649 | | 5/1999 |
| JP | HEI 11-203167 | | 7/1999 |
| JP | 2000-20291 | | 1/2000 |
| JP | 2001147703 A | * | 5/2001 |
| WO | WO200036477 A | * | 6/2000 |

OTHER PUBLICATIONS

Kissell, Ann H., "An Example of Simulation Use in Army Weapon System Development", Proceedings of the 31st conference on Winter simulation: Simulation—a bridge to the future—vol. 2, pp. 1079-1087, 1999.*

Google Search result, "Development of Control Simulation System in Which 3-D data is . . . " search 8/805 p. 1.*

Amatucci et al., "Summary of Modeling and Simulation for NIST RoboCrane Applications". 1997. Deneb International Simulation Conference and Technology Showcase, Detroit pg.*

Lamb-P., "Generating Solid Models For VLSI Process and Device Simulation" 1992 IEEE. p. 1-4.*

Zimmer et al., "Recent Developments in Japanese Robotics Research-Notes of a Japan Tour" 1997 GMD Technical Report #1077. pg.*

Kelly-A., "Simulation and Development Tools" 1996 p. 1-44.*

Pai et al.,"ACME, A Telerobotic Active Measurement Facility" 1999. Univ. of British Columbia pg.*

Mukherjee et al., "Structured Design of Microelectromechanical Systems" 1997.ACM/IEEE Automated Conference p. 680-685.*

Bortolazzi et al., "Specification and Design of Electronic Control Units" 1996 IEEE p. 1-6.*

Jo et al., "Virtual Testing of Agile Manufacturing Software Using 3D Graphics Simulation" IEEE 1997 p. 1223-1228.*

Decision of Rejection issued on Sep. 1, 2006 by the Japanese Patent Office in Japanese Patent Application No. 2000-034642 from which the present pending U.S. patent application claims priority (1 page) (including English translation, 2 pages).

Notification of Reasons for Rejection mailed on Jun. 6, 2006 for Japanese Patent Application No. 2000-034642 corresponding to the present above-identified pending US patent application, including English translation thereof (total of 5 pages).

* cited by examiner

FIG. 6A

```
SOLID KAM_VERSION2_0_LIBRARY1
   COLOR 1.000000 0.660000 0.000000
   FACET
      NORMAL 0.000000 0.952236 -0.305364
      NORMAL 0.000000 0.952236 -0.305364
      NORMAL 0.000000 0.952236 -0.305364
      OUTER LOOP
         VERTEX 46.667969 -54.467480 -31.538586
         VERTEX 46.667969 -57.256718 -40.236450
         VERTEX 16.667969 -57.256718 -40.236450
      ENDLOOP
   ENDFACET
   FACET
      NORMAL 0.000000 0.952236 -0.305364
      NORMAL 0.000000 0.952236 -0.305364
      NORMAL 0.000000 0.952236 -0.305364
      OUTER LOOP
         VERTEX 16.667969 -57.256718 -40.236450
         VERTEX 16.667969 -54.467480 -31.538586
         VERTEX 46.667969 -54.467480 -31.538586
      ENDLOOP
   ENDACET
   .
   .
   .
   FACET
      NORMAL 0.000000 -0.472754 0.881194
      NORMAL 0.000000 -0.472754 0.881194
      NORMAL 0.000000 -0.472754 0.881194
      OUTER LOOP
         VERTEX 91.667969 -77.803757 -26.071329
         VERTEX 91.667969 -73.224937 -23.614828
         VERTEX 46.667969 -73.224937 -23.614828
      ENDLOOP
   ENDFACET
ENDSOLID KAM_VERSION2_0_LOBRARY1
```

FIG. 6B

```
BEGIN SPACE
# NO 1
PARENT 0 # ROOT
JOINTTYPE FREE
END

BEGIN "SEAT_ASSY_0_LIBRARY1"
# NO 2
PARENT 1 # SPACE
RELPOSITION 0.000000 0.000000 0.000000
RELATTITUDE 1.000000 0.000000 0.000000 0.000000
1.000000 0.000000 0.000000 0.000000 1.000000
JOINTTYPE FIXED
END

BEGIN "SEAT_PAN_0_LIBRARY1"
# NO 3
PARENT 2 # SEAT_ASSY_0_LIBRARY1
SHAPE SEAT_PAN_0_LIBRARY1.SLP
RELPOSITION 1.810953 51.404652 450.053009
RELATTITUDE 1.000000 0.000000 0.000000 0.000000
1.000000 0.000000 0.000000 0.000000 1.000000
JOINTTYPE FIXED
END

BEGIN "KAM_VERSION2_0_LIBRARY1"
# NO 4
PARENT 2 # SEAT_ASSY_0_LIBRARY1
SHAPE KAM_VERSION2_0_LIBRARY1.SLP
RELPOSITION 201.712204 -211.475098 811.809509
RELATTITUDE 0.104385 0.034423 -0.993941 0.994522
-0.009110 0.104131 -0.005471 -0.999366 -0.035185
JOINTTYPE FIXED
END
.
.
.
```

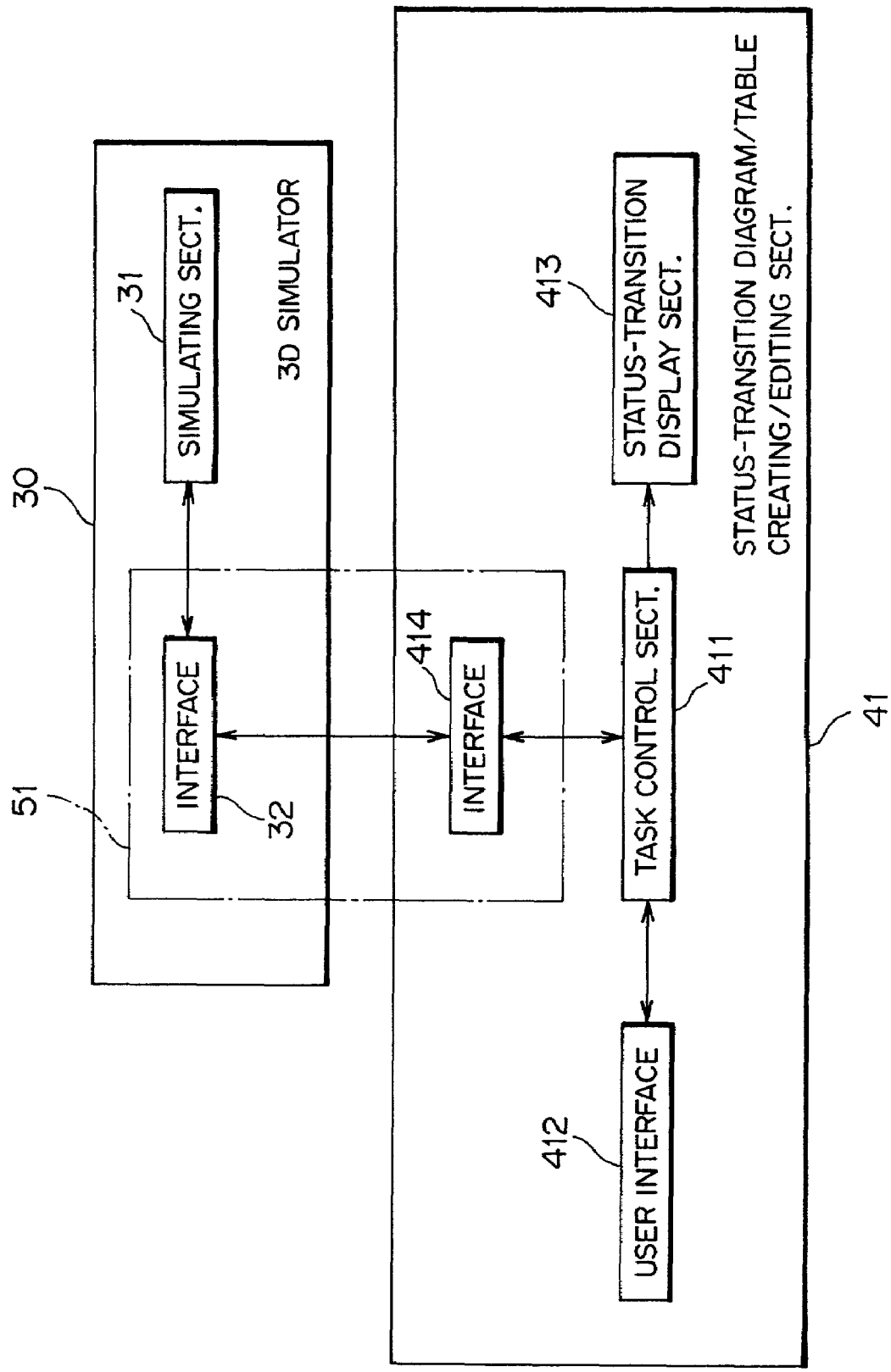

FIG. 9

| S \ E | STOPPING | RUNNING STRAIGHT | CORNERING LEFT | CORNERING RIGHT |
|---|---|---|---|---|
| SIGNAL_BLUE 0 | 0 — | 1 — | 2 — | 3 — |
| LEFT CURVE 1 | 1 ACCELE ON ( ); | 1 — | 1 — | 1 — |
| RIGHT CURVE 2 | — | 2 ACCELE OFF ( ); TURN LEFT ( ); | 1 TURN LEFT ( ); | 2 TURN LEFT ( ); |
| STRAIGHT 3 | — | 3 ACCELE OFF ( ); TURN RIGHT ( ); | 3 TURN RIGHT ( ); | 3 TURN RIGHT ( ); |
|  | — | — | 1 STEERING BACK ( ); ACCELE ON ( ); | 1 STEERING BACK ( ); ACCELE ON ( ); |

FIG. 42
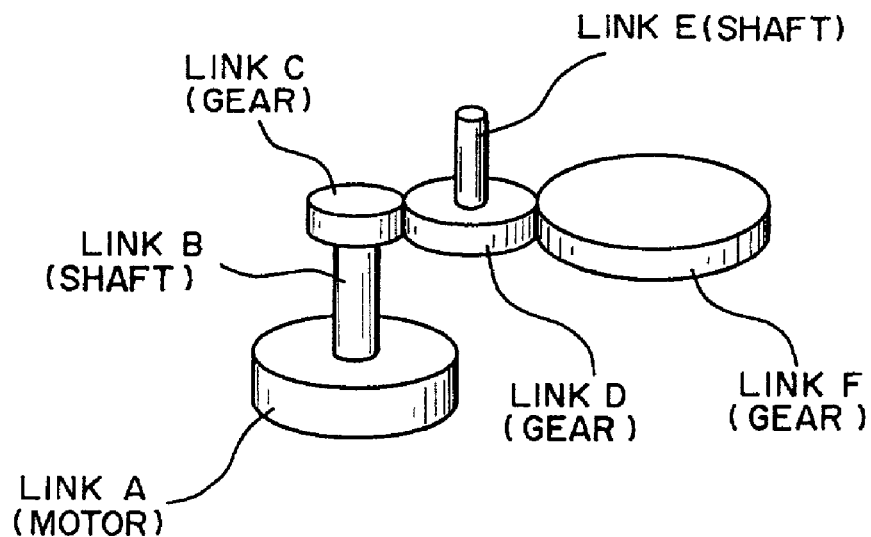
FIG. 43
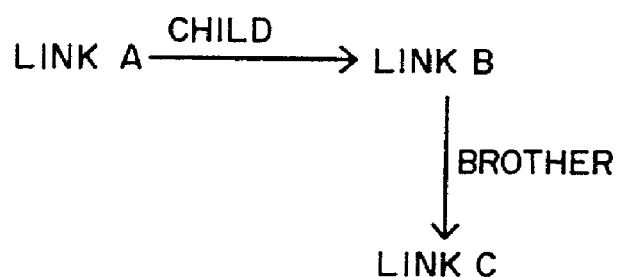

FIG. 44A

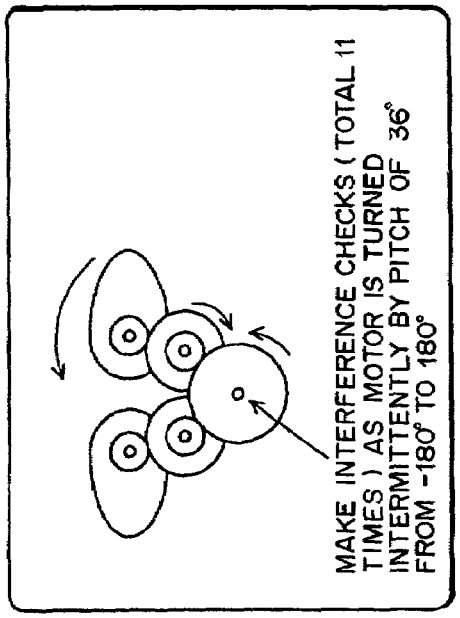

ALL PARTS WHOSE POSTURES ARE CHANGED DUE TO ROTATION OF THIS MOTOR

FIG. 44B

MAKE INTERFERENCE CHECKS (TOTAL 11 TIMES) AS MOTOR IS TURNED INTERMITTENTLY BY PITCH OF 36° FROM -180° TO 180°

FIG. 44C

| LINK A AND LINK B | 2 |
| LINK A AND LINK C | 3 |
| LINK B AND LINK D | 4 |
| LINK B AND LINK E | 11 |
| LINK C AND LINK E | 8 |
| LINK D AND LINK E | 11 |

SETS OF INTERFERED PARTS, AND FREQUENCY OF INTERFERENCE

FIG. 44D

| LINK A AND LINK B | 2 |
| LINK A AND LINK C | 3 |
| LINK B AND LINK D | 4 |
| LINK B AND LINK E | 11 |
| LINK C AND LINK E | 8 |
| LINK D AND LINK E | 11 |

EXCLUDE, FROM LIST, SETS WHOSE PARTS INTERFERED IN ALL INTERFERENCE CHECKS

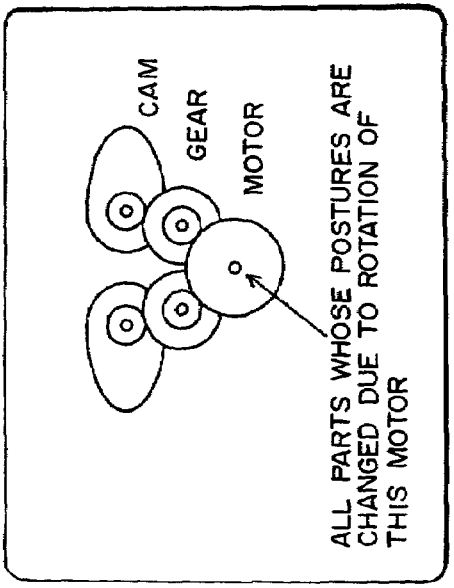

RECTANGULAR WAVE

SIGN WAVE

TRIANGULAR WAVE

SAWTEETH WAVE (RIGHT SIDE UP)

SAWTEETH WAVE (RIGHT SIDE DOWN)

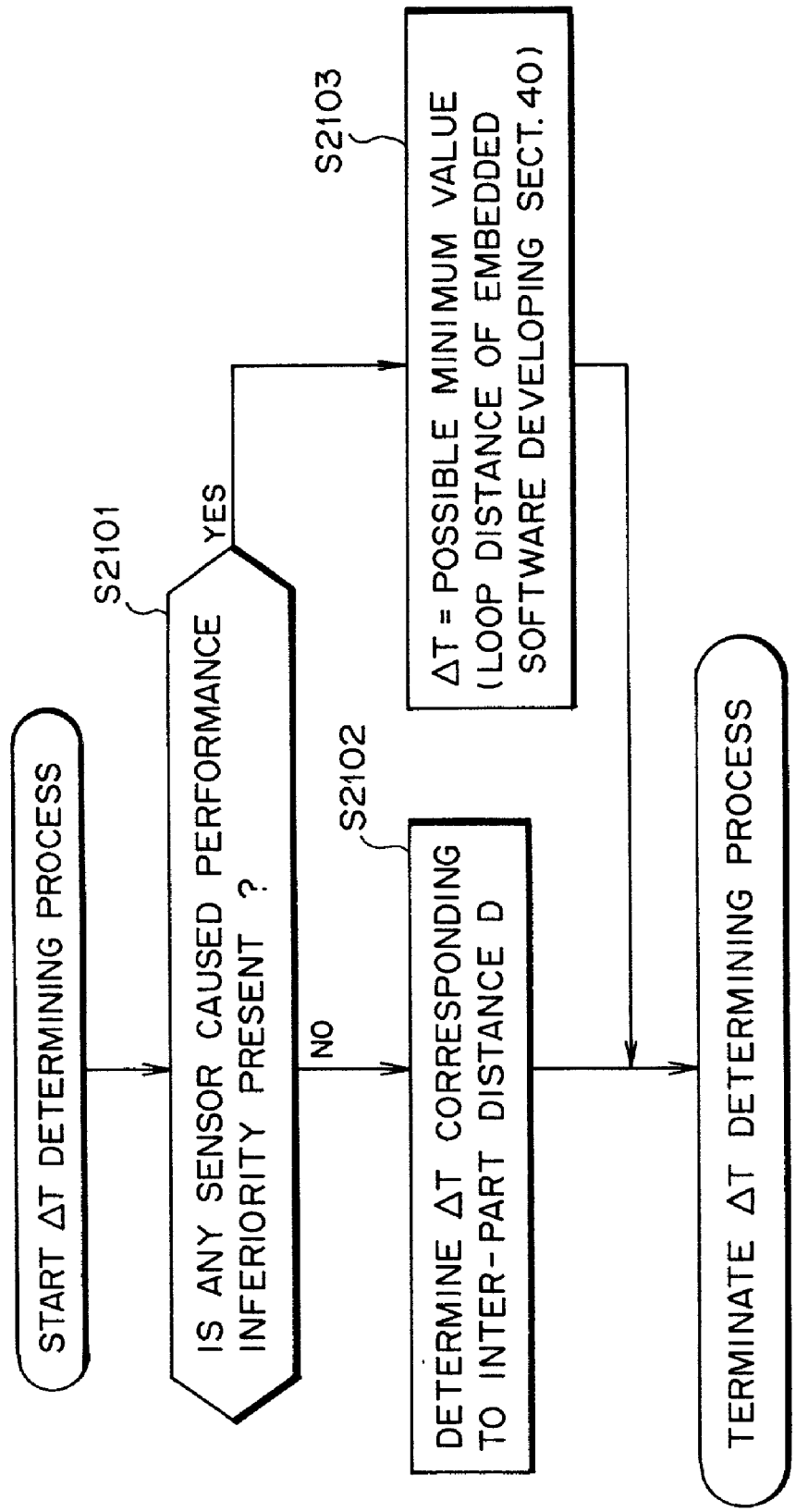

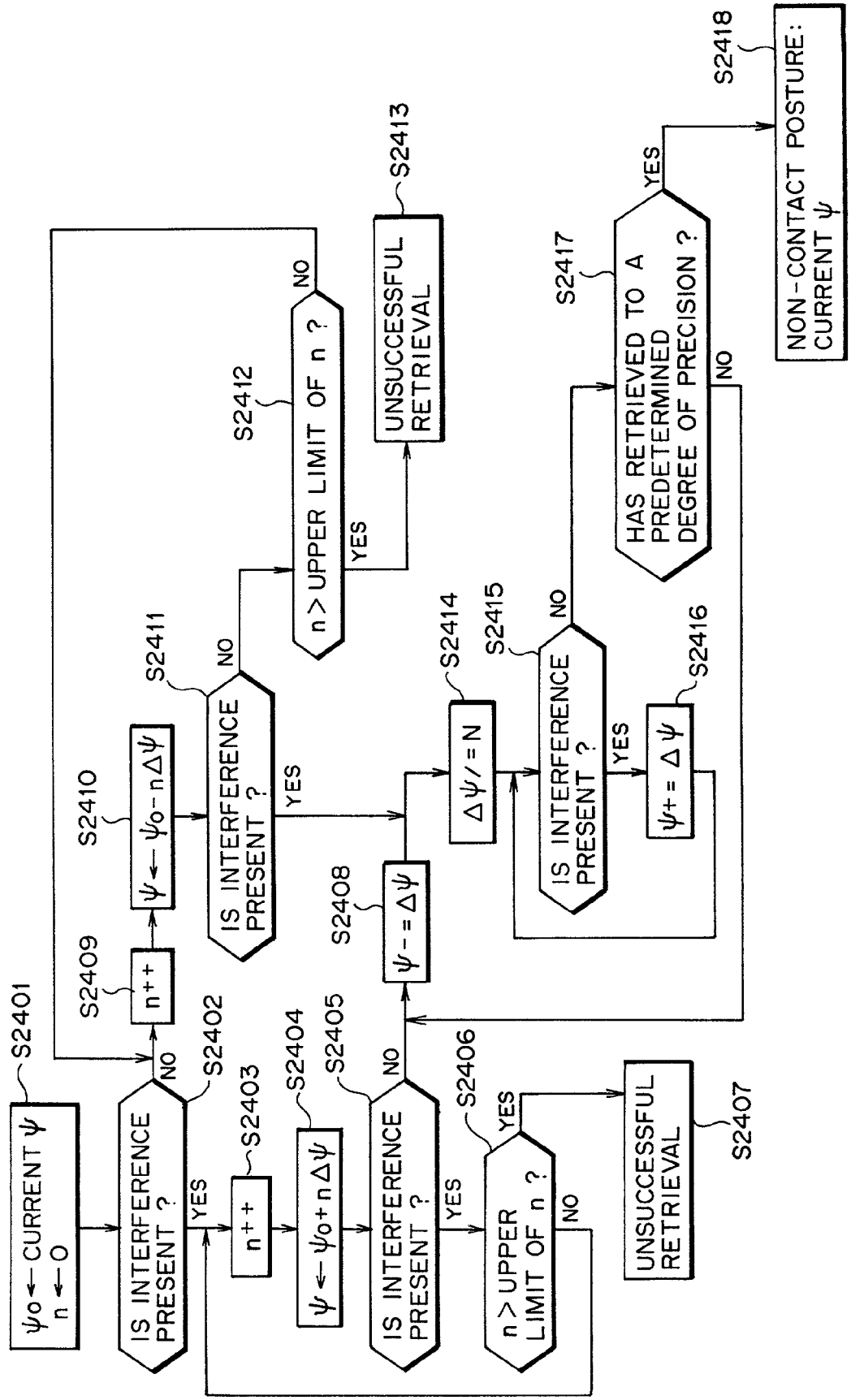

FIG. 71A
FIG. 71D
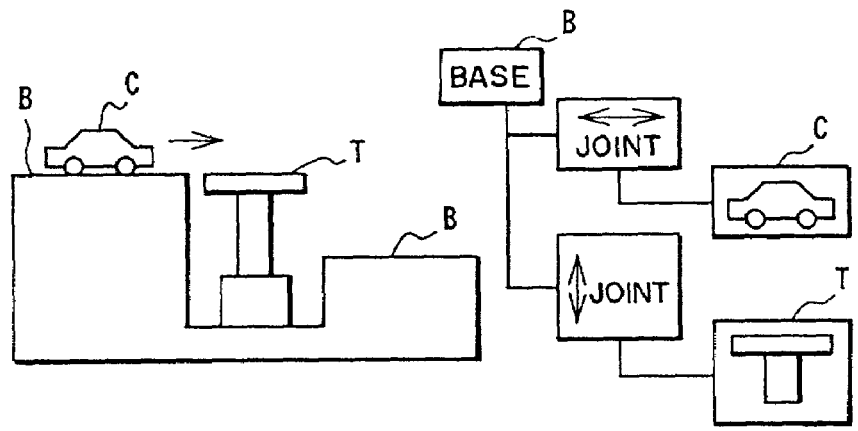
FIG. 71B
FIG. 71E
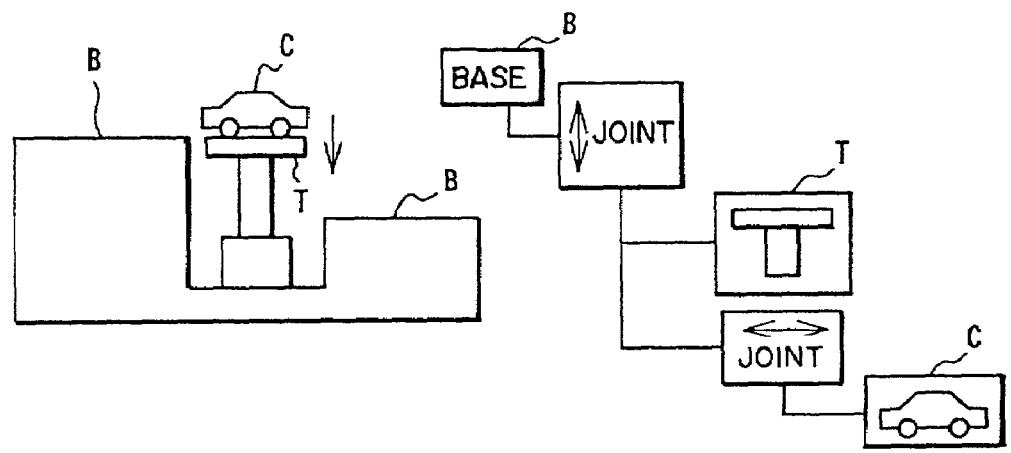
FIG. 71C
FIG. 71F
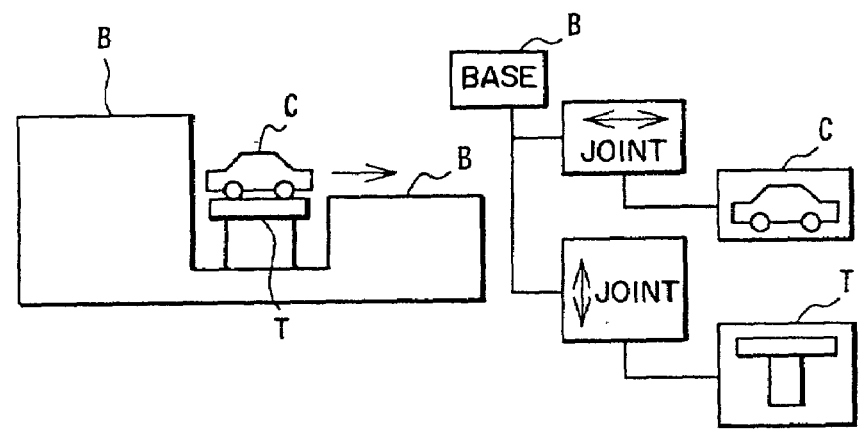

FIG. 75

|  | PORT NUMBER 11  12 | TARGET SPEED [deg / s] | SETTLING TIME [ms] |
|---|---|---|---|
| MOTOR INSTRUCTIONS CORRESPONDING TO BIT STRING | 0  0 | 0 | 0 |
| | 0  1 | +100 | 500 |
| | 1  0 | −100 | 500 |
| | 1  1 | 0 | 0 |

N = NUMBER OF ACCELERATION STEPS
Th[N] = {t1, t2, t3 ··· tN}

SUPPORT SYSTEM, AND COMPUTER-READABLE RECORDING MEDIUM IN WHICH SUPPORT PROGRAM IS RECORDED

BACKGROUND OF THE INVENTION

1. Field of the Invention

The present invention generally relates to a technology of designing and developing a mechanism which includes an actuator and a sensor and makes a three-dimensional motion, and more particularly to a support system for supporting the development of a control program (embedded software) to be embedded in the mechanism to control the mechanism. The invention relates also to a computer-readable recording medium in which a support program is recorded.

2. Description of the Related Art

Generally, when designing a mechanism, which includes an actuator (motor) and a sensor, and makes a three-dimensional motion, first a plan for the mechanism is made, followed by detail designing, preparation of drawings, and preparation of parts, whereupon a real mechanism is assembled of the prepared parts as a trial product and then motions, for example, of the trial product are evaluated. And design changing is made according to the result of evaluation, and then a modified trial product is assembled based on the design changing, whereupon motions, for example, of the modified trial product is evaluated. This procedure is repeated until a good result of evaluation is obtained, which requires no further design change, thus completing designing. The term "mechanism" means any mechanism exemplified by CD changer, MD changer, printer, and manipulator.

More specifically, for moving the thus designed mechanism, a control program to control the mechanism is developed. The control program is executed by a prospective microcomputer to be actually embedded in the mechanism to be controlled. The control program to be executed by the microcomputer is hereinafter also called "embedded software".

According to the conventional art, by the time the control program (embedded software) is developed, a trial product (real mechanism) of an object mechanism to be controlled has been completed. Namely, the mechanism cannot be practically moved until after completion of the trial product. Evaluation data is collected as the mechanism is practically (actually) moved, based on which developing of embedded software can be started.

The developing of this embedded software is carried out in the following procedure while the trial product is actually moved. Firstly outline designing of prospective embedded software is made, and then detail designing is made based on the outline designing, whereupon the result of the detail designing is coded to create the embedded software. Finally the created embedded software is debugged.

However, as mentioned above, since a trial product (real mechanism) of the object mechanism to be controlled is inevitable to develop embedded software (control program), the embedded software developing cannot be started until after completion of the trial product, which would be money- and time-consuming.

Yet if the embedded software developing could be started using the completed trial product, such developing would encounter repetitious design changing of the trial product depending on the result of evaluation. As the embedded software developing is thus often interrupted, trial products have to be completed one at each occurrence of design changes. After completion of each and every trial product, specifications changes and recoding are required for each trial product due to the individual design change, which would cause an extremely inefficient development of embedded software.

In the conventional art, as mentioned above, there appears no concurrency between designing of mechanism (manufacturing of real mechanism) and developing of embedded software for the mechanism, so they could not be executed simultaneously. Consequently a technology has been cherished to accomplish designing of an object mechanism and developing of embedded software in parallel.

SUMMARY OF THE INVENTION

With the foregoing problems in view, a first object of the present invention is to provide a support system which enables to accomplish designing of an object mechanism and developing of embedded software, which controls the mechanism, concurrently (in parallel) to increase the developing efficiency, thus shorting term of software development and reducing the number of steps.

A second object of the invention is to provide a computer-readable recording medium in which a support program is recorded and which is particularly useful when used in the above-mentioned support system.

In order to attain the first object, according to a first generic feature of the invention, there is provided a support system comprising: a mechanism designing section for three-dimensionally designing a mechanism composed of a plurality of parts including an actuator and a sensor; a three-dimensional-mechanism model simulating section, in which the mechanism is structured as a three-dimensional-mechanism model, for simulating an operation of the mechanism; an embedded software developing section for developing a control program, which is embedded in the mechanism to control the operation of the mechanism, as embedded software; a first interface section for inputting designing data, which is created in the mechanism designing section as the result of the designing by the mechanism designing section, from the mechanism designing section to the three-dimensional-mechanism model simulating section for being reflected on the three-dimensional-mechanism model; and a second interface section for transferring data between the three-dimensional-mechanism model simulating section and the embedded software developing section while synchronizing the three-dimensional-mechanism model simulating section and the embedded software developing section in operation with each other.

Preferably, the first interface section inputs the result of the simulating by the three-dimensional-mechanism model simulating section from the three-dimensional-mechanism model simulating section to the mechanism designing section for being reflected on the designing of the mechanism.

As another preferred feature, the embedded software developing section includes a status-transition diagram or table creating section for creating and editing a status-transition diagram or table describing specifications of the embedded software to execute detailed designing of the embedded software; and the second interface section transfers data between the three-dimensional-mechanism model simulating section and the status-transition diagram or table creating section while synchronizing the three-dimensional-mechanism model simulating section and the status-transition diagram or table creating section in operation with each other.

As still another preferred feature, the status-transition diagram or table creating section employs a multi-task, which executes a plurality of tasks in parallel to one another, and executes, separately from the plural tasks, a synchronous task functioning so as to stop the plural tasks during the simulation operation of the three-dimensional-mechanism model simulating section; and the second interface section synchronizes the three-dimensional-mechanism model simulating section and the status-transition diagram or table creating section in operation with each other using the synchronous task. Further, the synchronous task is set to a highest priority to control starting/stopping of the plural tasks in accordance to the synchronous task to thereby synchronize the three-dimensional-mechanism model simulating section and the status-transition diagram or table creating section in operation with each other.

As a further preferred feature, the embedded software developing section includes a microcomputer chip in which the embedded software is embedded during the developing; and the second interface section transfers data between the three-dimensional-mechanism model simulating section and the microcomputer chip while synchronizing the three-dimensional-mechanism model simulating section and the microcomputer chip in operation with each other.

As an additional preferred feature, the microcomputer chip employs a multi-task, which executes a plurality of tasks in parallel to one another, and executes, separately from the plural tasks, a synchronous task functioning so as to stop the plural tasks during the simulation operation of the three-dimensional-mechanism model simulating section; and the second interface section synchronizes the three-dimensional-mechanism model simulating section and the microcomputer chip in operation with each other using the synchronous task. Further, the three-dimensional-mechanism model simulating section and the microcomputer chip are synchronized in operation with each other by setting the synchronous task to a highest priority to control starting/stopping of the plural tasks in accordance to the synchronous task.

As a further preferred feature, the second interface section transfers: an actuator instruction signal for the actuator in the three-dimensional-mechanism model from the embedded software developing section to the three-dimensional-mechanism model simulating section; and a sensor signal, which is obtained as the result of simulation in response to the actuator instruction signal, from the three-dimensional-mechanism model simulating section to the embedded software developing section.

As a still further preferred feature, the support system further comprises an analyzing section for analyzing and displaying variation of the actuator instruction signal for the actuator and the sensor signal from the three-dimensional-mechanism model simulating section with real time.

In order to attain the second object, according to a second generic feature of the invention, there is provided a computer-readable recording medium in which a support program to realize, on a computer, a function of assisting a development of embedded software to be embedded in a mechanism, composed of a plurality of parts including an actuator and a sensor, as a control program to control the mechanism is recorded, the support program comprises: a mechanism designing program for instructing the computer to function as a mechanism designing section which designs the mechanism three-dimensionally; a three-dimensional-mechanism model simulating program for instructing the computer to function as a three-dimensional-mechanism model simulating section, in which the mechanism is structured as a three-dimensional-mechanism model, for simulating an operation of the mechanism; an embedded software developing program for instructing the computer to function as an embedded software developing section which develops the embedded software; a first interface program for instructing the computer to function as a first interface section for inputting designing data, which is created in the mechanism designing section as the result of the designing by the mechanism designing section, from the mechanism designing section to the three-dimensional-mechanism model simulating section for being reflected on the three-dimensional-mechanism model; and a second interface program for instructing the computer to function as a second interface section which transfers data between the three-dimensional-mechanism model simulating section and the embedded software developing section while synchronizing the three-dimensional-mechanism model simulating section and the embedded software developing section in operation with each other.

Preferably, the first interface program inputs the result of the simulating by the three-dimensional-mechanism model simulating section from the three-dimensional-mechanism model simulating section to the mechanism designing section for being reflected on the designing of the mechanism.

As another preferred feature, the embedded software developing program includes a status-transition diagram or table creating program instructing the computer to function as a status-transition diagram or table creating section for creating and editing a status-transition diagram or table describing specifications of the embedded software to execute detailed designing of the embedded software; and the second interface program transfers data between the three-dimensional-mechanism model simulating section and the status-transition diagram or table creating section while synchronizing the three-dimensional-mechanism model simulating section and the status-transition diagram or table creating section in operation with each other.

As still another preferred feature, the status-transition diagram or table creating program employs a multi-task, which executes a plurality of tasks in parallel to one another, and executes, separately from the plural tasks, a synchronous task functioning so as to stop the plural tasks during the simulation operation of the three-dimensional-mechanism model simulating section; and the second interface program synchronizes the three-dimensional-mechanism model simulating section and the status-transition diagram or table creating section in operation with each other using the synchronous task. Further, the three-dimensional-mechanism model simulating section and the status-transition diagram or table creating section are synchronized in operation with each other by setting the synchronous task to a highest priority to control starting/stopping of the plural tasks in accordance to the synchronous task.

As a further preferred feature, the second interface program transfers data between the three-dimensional-mechanism model simulating section and a microcomputer chip, in which the embedded software being developed is embedded, while synchronizing the three-dimensional-mechanism model simulating section and the microcomputer chip in operation with each other.

As an additional preferred feature, the microcomputer chip employs a multi-task, which executes a plurality of tasks in parallel to one another, and executes, separately from the plural tasks, a synchronous task functioning so as to stop the plural tasks during the simulation operation of the three-dimensional-mechanism model simulating section; and the second interface program synchronizes the threedimensional-mechanism model simulating section and the microcomputer chip in operation with each other using the synchronous task. Further, the synchronous task is set to a highest priority to control starting/stopping of the plural tasks in accordance to the synchronous task to thereby synchronize the three-dimensional-mechanism model simulating section and the microcomputer chip in operation with each other.

As still another preferred feature, the second interface program transfers: an actuator instruction signal for the actuator in the three-dimensional-mechanism model from the embedded software developing section to the three-dimensional-mechanism model simulating section; and a sensor signal, which is obtained as the result of simulation in response to the actuator instruction signal, from the three-dimensional-mechanism model simulating section to the embedded software developing section.

As a further preferred feature, the support program further comprises an analyzing program for instructing the computer to function as an analyzing section which analyzes and displays variation of the actuator instruction signal for the actuator and the sensor signal from the three-dimensional-mechanism model simulating section with real time.

According to the thus constructed support system of the present invention, by taking the three-dimensional real-time simulator 30 as the pivot section, it is possible not only to progress the developing the embedded software (control program) separately (concurrently) of the designing the mechanism, without making a trial product of the mechanism. Namely, it is possible to concurrently perform designing of the mechanism by the mechanism designing section 20 and developing of the embedded software by the embedded software developing section 40 so that efficient developing of the embedded software and reduction of the developing period (term) and the number of steps can be achieved.

BRIEF DESCRIPTION OF THE DRAWINGS

FIGS. 6A and 6B show respective specific examples of a figure data file and an assembly data file which are to be transferred from a mechanism designing section to a three-dimensional real-time simulator (hereinafter also called the simulator);

FIG. 7 is a block diagram showing a main portion (a three-dimensional real-time simulator, a status-transition diagram or table creating section, and a second interface section) of the support system of the first embodiment;

FIGS. 8 and 9 respectively show two displayed examples of status-transition diagram and table;

FIG. 42 is a perspective diagram of a link mechanism model for explaining operation of the routines of FIGS. 40 and 41;

FIG. 43 is a diagram illustrating a data structure of the link mechanism model of FIG. 42;

FIGS. 44A through 44D are diagrams specifically illustrating how to extract combinations of links for obtaining inter-link distances during simulation in the group of the links affected in posture by a movement of the motor link;

FIG. 59 is a flow diagram illustrating a inter-simulation distance determination processing routine;

FIGS. 63 and 64 are flow diagrams illustrating a driven-part non-contact posture retrieving routine;

FIGS. 71A through 71F are diagrams illustrating an elevator as a mechanism model, and a tree-structure link constituting the elevator;

FIG. 75 is a table showing input values of the DC motor and motor instruction values in correspondence with one another;

DESCRIPTION OF THE PREFERRED EMBODIMENTS

Preferred embodiments of the present invention will now be described with reference to the accompanying drawings.

Figure 3:
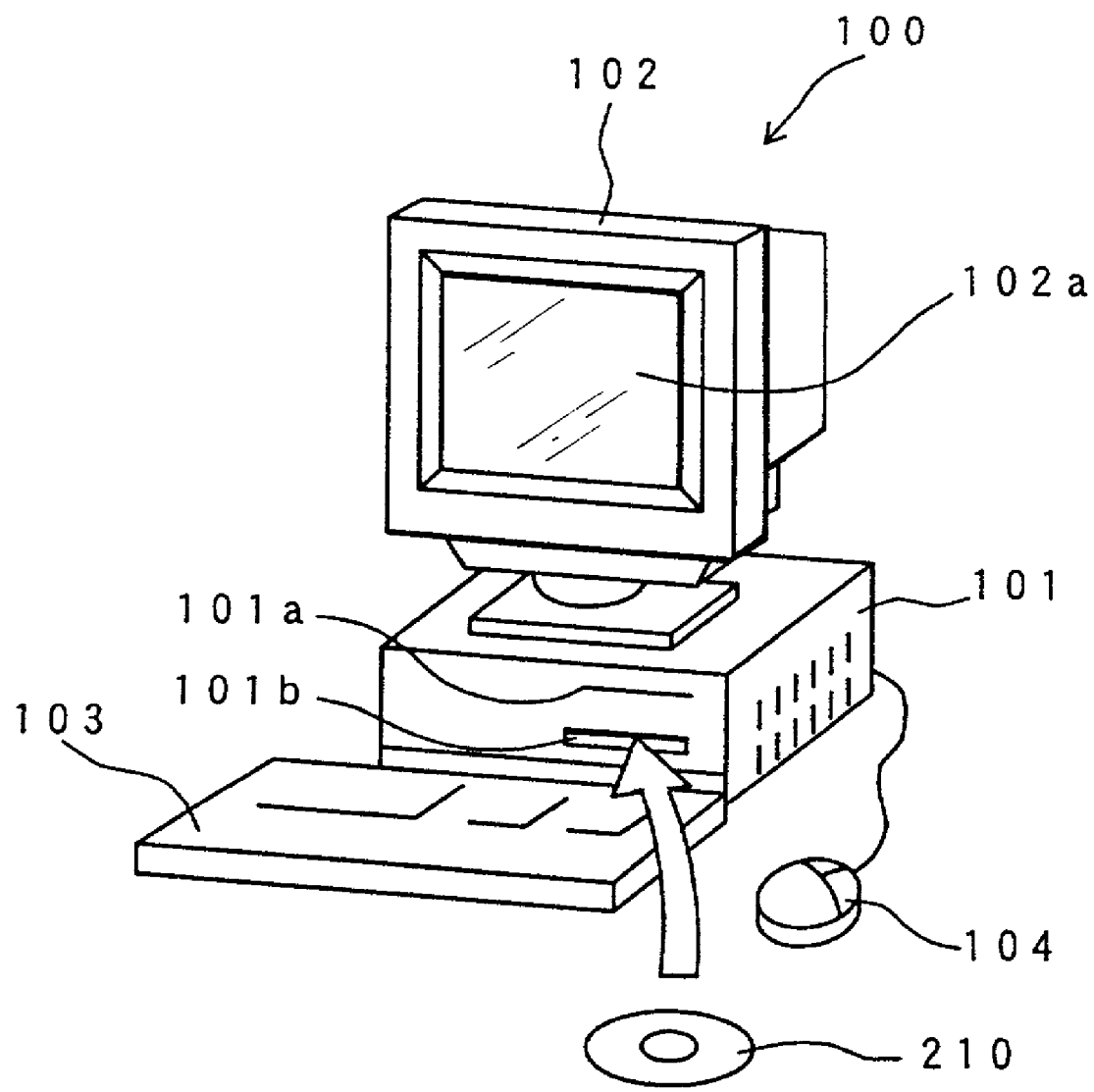
FIG. 3 is a schematic, perspective view of a computer system in which the support system of the first embodiment can be architected.

FIG. 3 is a schematic, perspective view of a computer system in which the support system of the first embodiment can be architected.

As shown in FIG. 3, the computer system 100 comprises, as fundamental components, a system cabinet 101, in which a CPU 221, an RAM 222, a hard disc 211, etc. are mounted as described later with reference to FIG. 4, a CRT display 102 for displaying on a screen 102a in response to an instruction from the system cabinet 101, a keyboard 103 for inputting a user's instructions and character information to the computer system 100, and a mouse 104 for inputting an instruction corresponding to an icon or the like, which is displayed on the display screen 102a at an arbitrary position, by designating the position.

The system cabinet 101 further has, on its exterior side, a floppy disk loading port 101a and a CD-ROM loading port 101b from which a floppy disk 212 (FIG. 4) and a CD-ROM 210 are removably loaded. And inside the system cabinet 101, a floppy disc driver 224 and a CD-ROM driver 225 (FIG. 4) are mounted to drive the loaded floppy disc 212 and CD-ROM 210, respectively.

In the CD-ROM (hereinafter also called "computer-readable recording medium") 210, a support program 310 (FIG. 2) according to the first embodiment is prewritten.

The CD-ROM 210 is loaded in the system cabinet 101 from the CD-ROM loading port 101b, and then the support program 310 recorded in the CD-ROM 210 is installed in the hard disc 211 of the computer system 100 by the CD-ROM driver 225.

Figure 1:
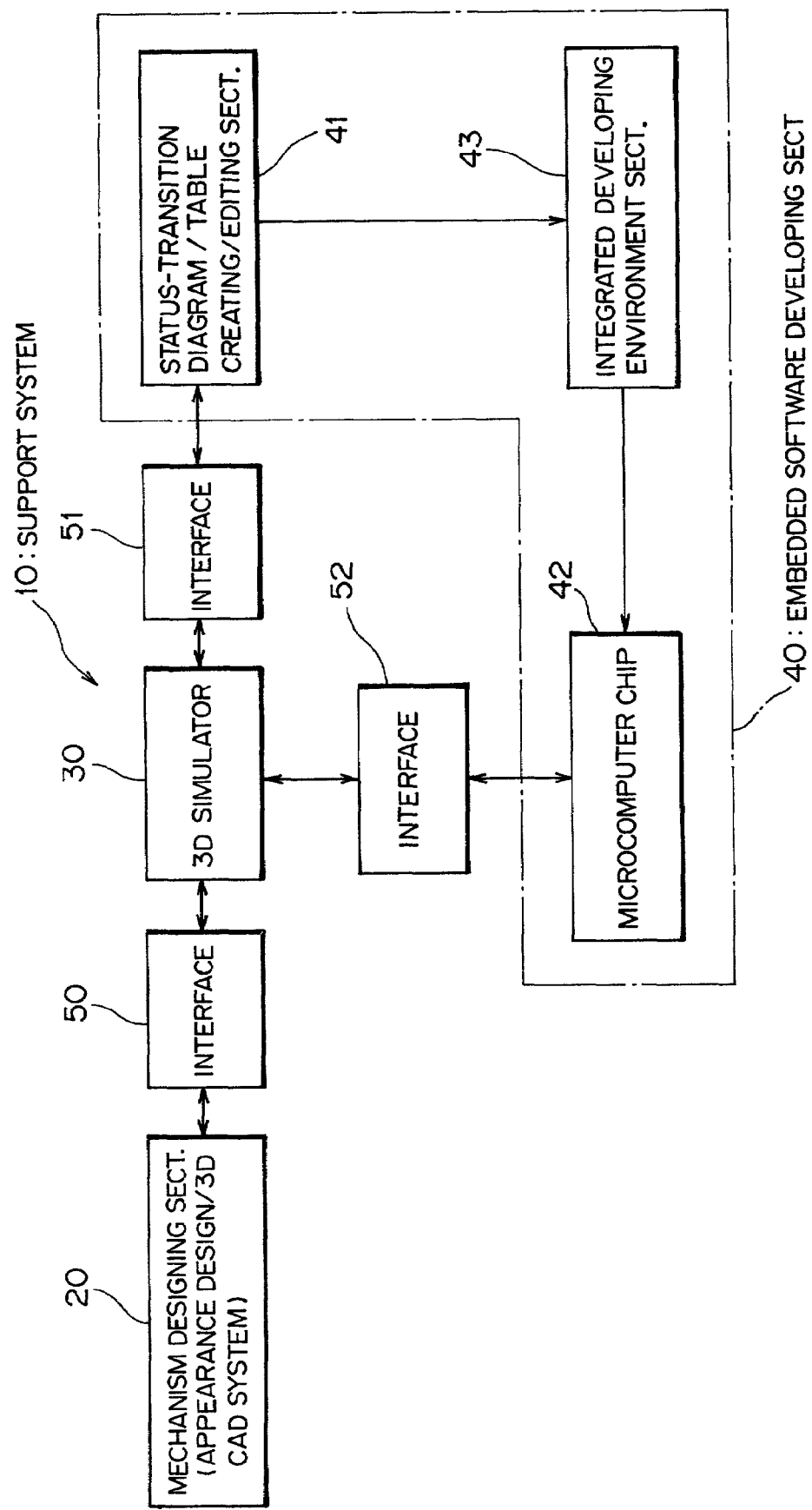
FIG. 1 is a block diagram showing a support system according to a first embodiment of the present invention.

Further, in the hard disc 211 of the computer system 100, designing data of an object mechanism, which is designed and defined by a mechanism designing section (hereinafter also called "appearance design and three-dimensional CAD system") 20 described later with reference to FIG. 1, is stored. Based on the designing data, a three-dimensional mechanism model can be architected for the mechanism in the computer system 100 (a later-described three-dimensional real-time simulator 30).

Furthermore, in the hard disc 211 of the computer system 100, a control program (hereinafter also called "embedded software") developed by an embedded software developing section 40, which will be described later with reference to FIG. 1, is stored. In the hard disc 211, not only the embedded software whose development has been completed is stored, but also the embedded software being developed is stored and preserved.

Figure 4:
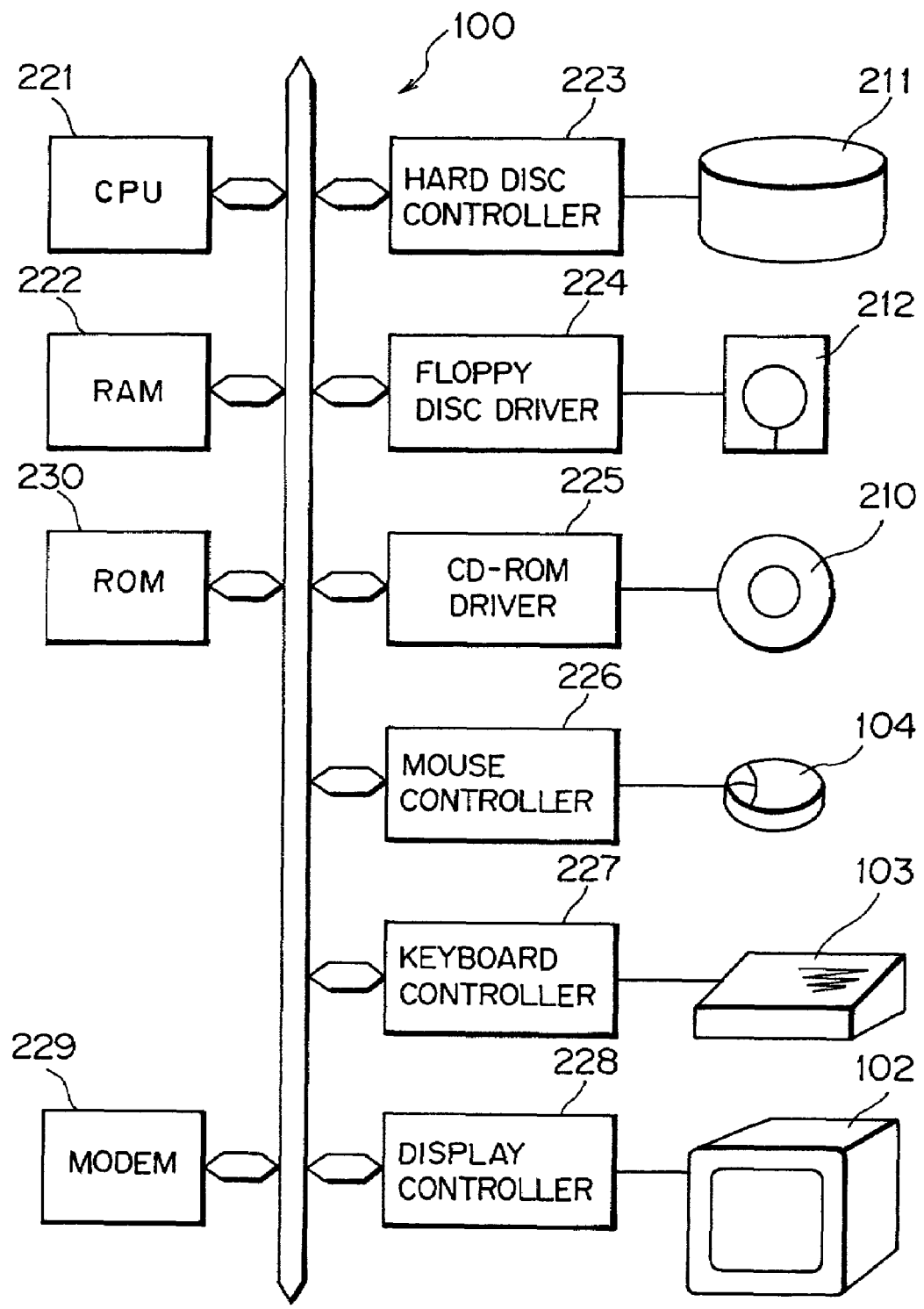
FIG. 4 is a block diagram showing hardware of a computer system in which the support system of the first embodiment can be architected.

FIG. 4 is a block diagram showing hardware of a computer system in which the support system of the first embodiment can be architected. As shown in FIG. 4, in the computer system 100 of the present embodiment, the central processing unit (CPU) 221, the RAM 222, a hard disc controller 223, the floppy disc driver 224, the CD-ROM driver 225, a mouse controller 226, a keyboard controller 227, a display controller 228, a modem 229, and a ROM 230 are interconnected via a bus line 220.

The floppy disc driver 224 and the CD-ROM driver 225, as described above in connection with FIG. 3, respectively take access to the floppy disc 212 and the CD-ROM 210 when loaded.

The hard disc controller 223 controls the hard disc 211 and take access to the hard disc 211 in accordance with an instruction from the CPU 221. The mouse controller 226 serves as an interface between the mouse 104 and the computer system 100; and the keyboard controller 227, an interface between the keyboard 103 and the computer system 100. And the display controller 228 controls the display status of the CRT display 102 in accordance with a control signal from the CPU 221.

Further, the modem 229 is connected to a non-illustrated communications circuit for communications with another computer system that is identical in construction with that of FIGS. 3 and 4.

As described above, the support program 310 (FIG. 2) is prewritten or prerecorded in the CD-ROM 210 for being read out from the CD-ROM 210 by the CD-ROM driver 225 and being stored in the hard disc 211 via the bus line 220 by the hard disc controller 223. Practically, the support program 310 in the hard disc 211 is loaded onto the RAM 222 and is executed by the CPU 221.

The support program 310 realizes an embedding support system 10 of FIG. 1 in the following manner. As the CPU 221 executes the support program 310 in RAM 222 via the bus line 220, the respective functions (described later in detail) of a mechanism designing section 20, a three-dimensional real-time simulator 30, a status-transition diagram or table creating/editing section 41, an integrated developing environment section 43 and interface sections 50-52, which jointly constitute the support system 10, is realized.

The support program 310 is provided in a form recorded in a computer-readable recording medium 300 (FIG. 2), such as CD-ROM (210) or a flexible disc (floppy disc 212) as described above. The computer system 100, as described above, reads out the support program 310 from the recording medium and transfers it to an internal storage of the hard disc 211 or an external storage to store for use. Alternatively, the program 310 may be recorded in a storage (recording medium), such as a magnetic disc, an optical disc or a magneto-optical disc, for being provided from the storage to the computer system 100 via a communications line and the modem 229.

The recording medium of the first embodiment may be various kinds of computer-readable media, which are exemplified by flexible disc, CD-ROM, magnet disc, optical disc, magneto-optical disc, IC card, ROM cartridge, magnetic tape, punched card, internal storage (memory such as RAM or ROM) of the computer, external storage, and printed matter labeled with code, e.g., bar code.

The support system 10 of the present embodiment to be realized by the computer system 100 of FIG. 4 supports in developing a control program (embedded software) to be embedded in a mechanism, which has at least one actuator and at least one sensor and makes a three-dimensional movement, to control the mechanism during designing and developing of the mechanism.

For this purpose, the support system 10 of the present embodiment not only has the respective functions as the mechanism designing section 20, the three-dimensional real-time simulator 30, the status-transition diagram or table creating/editing section 41, the integrated developing environment section 43, and the interface sections 50-52, but also includes a microcomputer chip 42 in which the embedded software having been developed is stored to control the mechanism.

FIG. 1 is a block diagram showing the functional structure of a support system 10 according to the first embodiment of the present invention.

The support system 10 of the present embodiment performs designing of a mechanism and developing of embedded software concurrently (in parallel) and, for this purpose, is generally divided into the mechanism designing section 20, the three-dimensional real-time simulator 30, and the embedded software developing section 40.

The mechanism designing section (appearance design and three-dimensional CAD system, and mechanism designing section) 20 three-dimensionally designs a mechanism that is composed of a plurality of parts including an actuator and a sensor. The cooperation of the mechanism designing section 20 and the three-dimensional real-time simulator 30 will be described later in detail with reference to FIGS. 5 and 6.

The three-dimensional real-time simulator (hereinafter also called "three-dimensional-mechanism model simulating section") 30 architects in it the mechanism, which is designed by the mechanism designing section 20, as a three-dimensional-mechanism model, and simulates movements of the mechanism. The three-dimensional real-time simulator 30 will be described later in detail with reference to FIGS. 17 through 82.

The embedded software developing section 40 develops, in parallel to designing of the mechanism by the mechanism designing section 20, a control program to be embedded in the mechanism, as embedded software, for controlling the movement of the mechanism.

Further, in the support system 10 of the present embodiment, which is equipped with the interface sections 50-52, the embedded software developing section 40 includes the status-transition diagram or table creating/editing section 41, the microcomputer chip 42, and the integrated developing environment section 43.

The interface section (first interface section) 50 serves to input designing data, which is designed by the mechanism designing section 20, from the mechanism designing section 20 to the three-dimensional real-time simulator 30 for being dynamically reflected on the three-dimensional-mechanism model, which is to be architected in the three-dimensional real-time simulator 30. The first interface section 50 serves also to input the result of simulation by the three-dimensional real-time simulator 30 from the three-dimensional real-time simulator 30 to the mechanism designing section 20.

The function of the first interface section 50 may be incorporated wholly in either one of the mechanism designing section 20 and the three-dimensional real-time simulator 30, or may be incorporated separately in the mechanism designing section 20 and the three-dimensional real-time simulator 30.

The other interface section (second interface sections) 51, 52 each serve to receive data from the three-dimensional real-time simulator 30 and transmit the data to the embedded software developing section 40 and vice versa, while establishing synchronization in operation between the three-dimensional real-time simulator 30 and the embedded software developing section 40.

Further, the embedded software developing software section 40 in the support system 10 of the present embodiment includes the status-transition diagram or table creating/editing section (hereinafter also called "status-transition diagram or table creating section") 41, the microcomputer chip 42, and the integrated developing environment section 43.

The status-transition diagram or table creating/editing section 41 describes specifications of embedded software for detailed designing of the embedded software and creates a task control flow for the embedded software. The detail of the status-transition diagram or table creating/editing section 41 and the detail cooperation between the status-transition diagram or table creating/editing section 41 and the three-dimensional real-time simulator 30 will be described later in detail with reference to FIGS. 7 through 14.

Embedded software being developed is embedded in the microcomputer chip 42, and the resultant microcomputer chip 42 is actually loaded on the mechanism to control the operation of the mechanism. The integrated developing environment section 43 converts a task control flow from the status-transition diagram or table creating/editing section 41 into C, C++, and assembler coding (by coding or code generation), and creates an executing module for a target microcomputer (i.e., embedded software to be written into the microcomputer chip 42).

And the second interface section 51 receives data from the three-dimensional real-time simulator 30 and transmits the data to the status-transition diagram or table creating/editing section 41 and vice versa, while establishing synchronization in operation between the three-dimensional real-time simulator 30 and the status-transition diagram or table creating/editing section 41.

In the first embodiment, as described later with reference to FIGS. 10 through 14, the status-transition diagram or table creating/editing section 41 adopts a multi-task for executing a plurality of tasks in parallel, and executes a synchronous task, apart from the plural task, for stopping the plural tasks during the simulation operation of the three-dimensional real-time simulator 30. Using the synchronous task, the second interface section 51 synchronizes the operations of the three-dimensional real-time simulator 30 and the status-transition diagram or table creating/editing section 41.

At that time, the second interface section 51 sets the priority of the synchronous task to a highest to control the starting and stopping of the plural tasks by the resultant synchronous task, thereby establishing synchronization in operation between the three-dimensional real-time simulator 30 and the status-transition diagram or table creating/editing section 41.

The function of the second interface section 51 may be incorporated wholly in the three-dimensional real-time simulator 30 and the status-transition diagram or table creating/editing section 41, or may be incorporated separately in the three-dimensional real-time simulator 30 and the status-transition diagram or table creating/editing section 41.

The other second interface section 52 serves to receive data from the three-dimensional real-time simulator 30 and transmit the data to the microcomputer chip 42 and vice versa, while establishing synchronization in operation between the three-dimensional real-time simulator 30 and the microcomputer chip 42.

In the first embodiment, the microcomputer chip 42, like the status-transition diagram or table creating/editing section 41, adopts a multi-task for executing a plurality of tasks in parallel, and executes a synchronous task, apart from the plural task, for stopping the plural tasks during the simulation operation of the three-dimensional real-time simulator 30. Using the synchronous task, the other second interface section 52 synchronizes the operations of the three-dimensional real-time simulator 30 and the microcomputer chip 42.

At that time, the other second interface section 52, like the one second interface section 51, sets the priority of the synchronous task to a highest to control the starting and stopping of the plural tasks by the resultant synchronous task, thereby establishing synchronization in operation between the three-dimensional real-time simulator 30 and the microcomputer chip 42.

The function of the other second interface section 52 may be incorporated wholly in either one of the three-dimensional real-time simulator 30 and the microcomputer chip 42, or may be incorporated separately in the three-dimensional real-time simulator 30 and the microcomputer chip 42.

In the support system 10 of the present embodiment, the second interface sections 51, 52 respectively transfer an actuator instruction signal for the actuator in the three-dimensional-mechanism model from the status-transition diagram or table creating/editing section 41 and the microcomputer chip 42 to the three-dimensional real-time simulator 30, and a sensor signal, which is from the sensor in the three-dimensional-mechanism model, from the three-dimensional real-time simulator 30 to the status-transition diagram or table creating/editing section 41 and the microcomputer chip 42.

Figure 15:
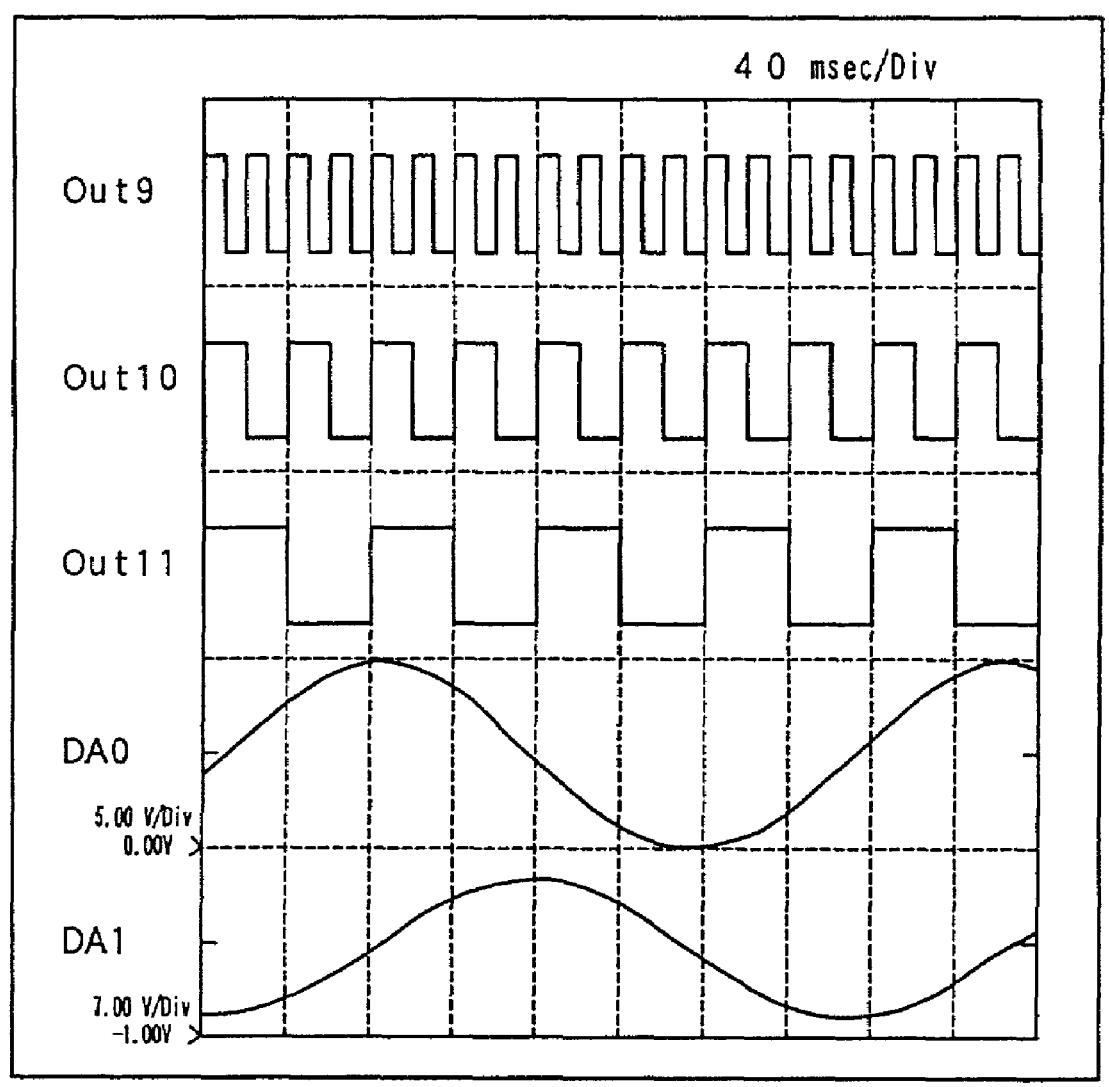
FIG. 15 a diagram showing a displayed example in a logic analyzer of the first embodiment.

The three-dimensional real-time simulator 30 may be equipped with a logic analyzer (analyzing section of FIG. 15). The logic analyzer analyzes a change with real time between the actuator instruction signal for the actuator and the sensor signal obtained by the three-dimensional real-time simulator 30, and displays the analyzed change with real time so that a developing person who develops the embedded software can confirm the change with time.

Further, the support system 10 may be equipped with an interface unit to connect a two-dimensional operation panel architecting unit with the three-dimensional real-time simulator 30 so that the three-dimensional-mechanism model can be operated on the two-dimensional operation panel on an interactive basis. In this case, on the two-dimensional operation panel, the images of various switches or the like actually disposed on the microcomputer chip 42 is displayed. And when the embedded-software developing person designates the switch-images on the two-dimensional operation panel, the three-dimensional real-time simulator 30 can perform the simulation as if the switches or the like on the microcomputer chip 42 are actually operated.

In addition, the three-dimensional real-time simulator 30 of the present embodiment includes a mechanism model creating unit for creating models of various kinds of mechanisms, such as gears, cam, groove, clutch, roller and ratchet, and another mechanism model creating unit for creating models of various kinds of motors/sensors, such as DC motor, steppingmotor, AC motor, micro switch/optical switch, encoder, and potentiometer. Using these mechanism model creating units, it is possible to express a mechanism, which is composed of various mechanisms and various motors/sensors in an arbitrary combination, as a three-dimensional-mechanism model.

Figure 2:
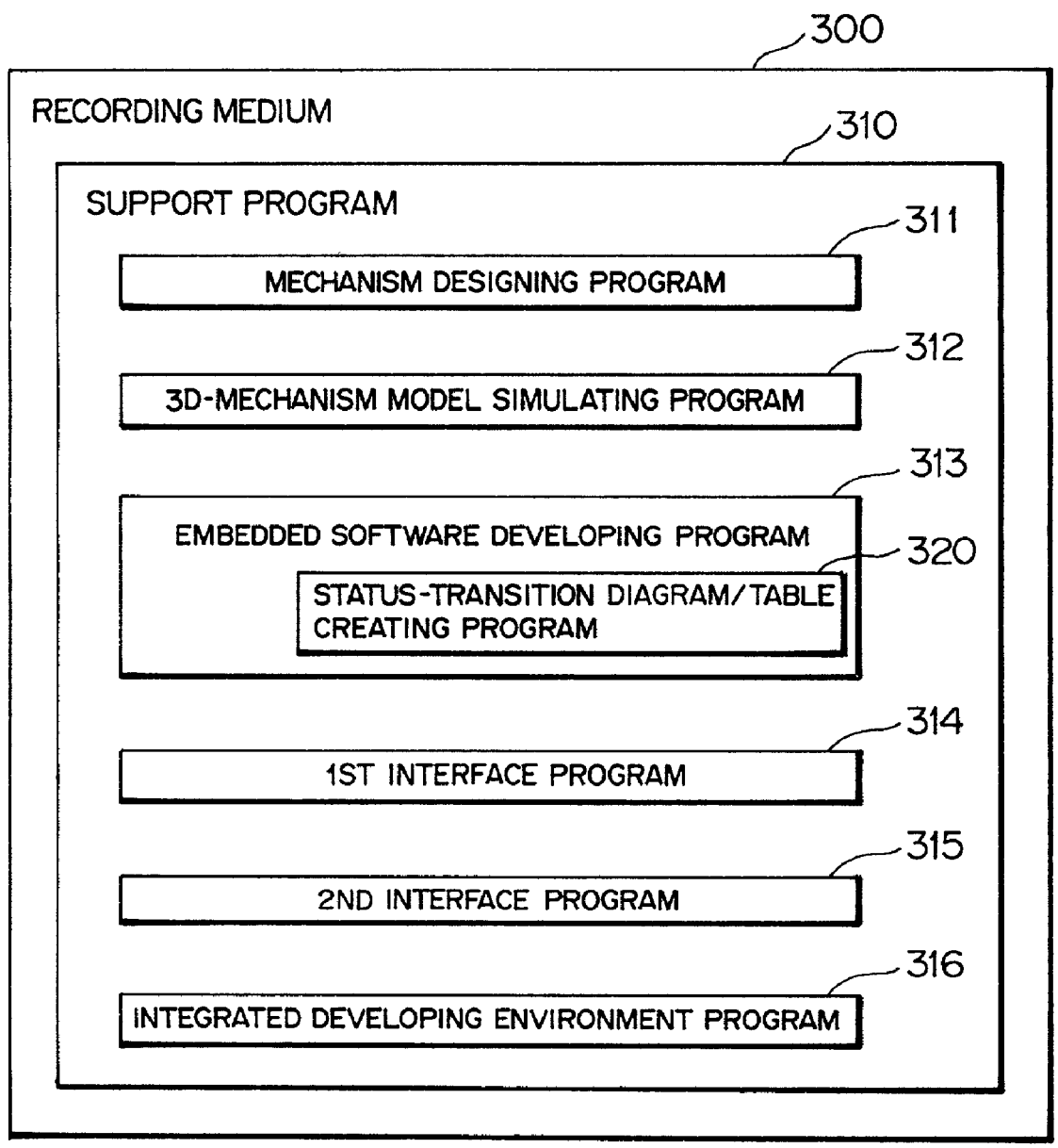
FIG. 2 is a diagram showing the architecture of a support program that is recorded in a computer-readable recording medium of the present embodiment.

In the meantime, FIG. 2 is a diagram showing the architecture of a support program 310 that is recorded in the computer-readable recording medium 300 of the present embodiment.

The recording medium 300 of FIG. 2 typically show the CD-ROM 210 in which the support program 310 is recorded, the hard disc 211 in which the support program 310 is installed, the floppy disc 212 or RAM 222 to which the support program 310 is downloaded, or ROM 230 in which the support program 310 is permanently recorded. The recording medium 300 is a multiple form composed of a plurality of individual recording media interconnected by a communications line or the like, in which media a plurality of individual programs 311-316 constituting the support programs 310 are separately recorded.

The support program 310 recorded in the recording medium 300 realizes, on the computer system 100 of FIGS. 3 and 4, the function of the support system 10 of FIG. 1, namely, a function of assist the developing of embedded software to be embedded in a mechanism, which is composed of various parts including an actuator and a sensor, as a control program to control the mechanism. For this purpose, the support program 310 comprises a mechanism designing program 311, a three-dimensional-mechanism model simulating program 312, an embedded software developing program 313, a first interface program 314, a second interface program 315, and an integrated developing environment program 316.

The mechanism designing program 311 renders the computer system 100 to function as the above-mentioned mechanism designing section 20, and the three-dimensional-mechanism model simulating program 312 renders the computer system 100 to function as the above-mentioned three-dimensional real-time simulator 30.

The embedded software developing program 313 renders the computer system 100 to function as the above-mentioned software developing section 40, and for this purpose, this program contains the status-transition diagram or table creating/editing program 320 that renders the computer system 100 to function as the above-mentioned status-transition diagram or table creating/editing section 41.

The first interface program 314 renders the computer system 100 to function as the above-mentioned first interface section 50. The first interface program 314 may be incorporated wholly in either one of the mechanism designing program 311 and the three-dimensional-mechanism model simulating program 312, or may be incorporated separately in these two programs 311, 312.

The mechanism designing program 311 (mechanism designing section 20) is combined with the first interface program 314 (the first interface section 50), which is loaded in the computer system 100 where the first interface program 314 is executed in association with the operation of the three-dimensional-mechanism model simulating program 312, namely, the operation of the three-dimensional-mechanism model.

The second interface program 315 renders the computer system 100 to function as the above-mentioned second interface sections 51, 52.

Of the second interface program 315, one partial program corresponding to one second interface section 51 may be incorporated wholly in either one of the three-dimensional-mechanism model simulating program 312 and the status-transition diagram or table creating program 320, or may be incorporated separately in these two programs 312, 320.

Of the second interface program 315, the other partial program corresponding to the other second interface section 52 may be wholly in either one of the three-dimensional-mechanism model simulating program 312 and the control program (embedded software), which is stored in the microcomputer chip 42, or may be separately incorporated in the three-dimensional-mechanism model simulating program 312 and the control program.

The integrated developing environment program 316 renders the computer system 100 to function as the above-mentioned integrated developing environment section 43.

In the present embodiment, as described above, the status-transition diagram or table creating program 320 (the status-transition diagram or table creating/editing section 41) and the microcomputer chip 42 adopt a multi-task.

Therefore, the second interface program 315 has a single synchronous task, whose priority is set to a highest, to represent a plurality of tasks to be executed by the status-transition diagram or table creating program 320 or the microcomputer chip 42. Using this synchronous task, the second interface program 315 renders the computer system 100 to stop the plural tasks in the status-transition diagram or table creating program 320 or the microcomputer chip 42 while the three-dimensional-mechanism model simulating program 312 (the three-dimensional real-time simulator 30) is operating, thereby synchronizing the operation according to the three-dimensional-mechanism model simulating program 312 with the respective operations according to the status-transition diagram or table creating program 320 and the microcomputer chip 42.

At that time, the second interface program 315 (the second interface sections 51, 52) realizes the synchronization, which uses a synchronous task, between the three-dimensional-mechanism model simulating program 312 and the status-transition diagram or table creating program 320 or between the former program and microcomputer chip 42 (control program) by taking the following communications as the second interface program 315 is executed by the computer system 100.

Namely, the three-dimensional-mechanism model simulating program 312 notifies the second interface program 315 of a time of execution (Ts) of the status-transition diagram or table creating program 320 or the control program.

Upon receipt of this notice, the second interface program 315 (second interface sections 51, 52) allows the execution of the status-transition diagram or table creating program 320 or of the control program by the notified time of execution. When the status-transition diagram or table creating program 320 or the control program has completed the allowed execution of the notified time of execution, then the second interface program 315 interrupts such execution and notifies to the three-dimensional-mechanism model simulating program 312 the obtained actuator instructing signal and the fact that the execution of the program for the allowed time has terminated.

The three-dimensional-mechanism model simulating program 312 renders the three-dimensional-mechanism model to move by an extent corresponding to the control of execution of the status-transition diagram or table creating program 320 or the control program for the allowed time of execution, obtaining a sensor signal corresponding to the extent of movement. After having obtained the sensor signal, the three-dimensional-mechanism model simulating program 312 determines the time of next execution of the status-transition diagram or table creating program 320 or the control program, and notifies the second interface program 315 of the determined time of execution and the sensor signal.

As this communication procedure is repeated, the three-dimensional-mechanism model simulating program 312 and one of the status-transition diagram or table creating program 320 and the control program are executed. In the three-dimensional real-time simulator 30, a three-dimensional-mechanism model is operated in accordance with the control by the execution of the status-transition diagram or table creating program 320 or the control program.

Further, the three-dimensional-mechanism model architected in the computer system 100 (the three-dimensional real-time simulator 30) is operated in the computer system 100 by the three-dimensional-mechanism model simulating program 312, which constitutes the support program 310 loaded in the computer system 100 from the CD-ROM 210.

And the status-transition diagram or table creating program 320 embedded in the computer system and the control program embedded in the microcomputer chip 42 (embedded software) are combined with the second interface program 315 (second interface sections 51, 52) loaded in the computer system 100 and are executed in synchronism with the operation of the three-dimensional-mechanism model simulating program 312, namely, the operation of the three-dimensional-mechanism model in the computer system 100.

As described above, the support system 10 of the present embodiment comprises the mechanism designing section 20, the three-dimensional real-time simulator 30, the status-transition diagram or table creating/editing section 41, the integrated developing environment section 43r and the first and second interface section 50-52, all of which are embedded in a single apparatus (the computer system 100 here).

The support system of the present invention may be in an alternative form in which a plurality of computer systems 100 are communicably interconnected via the modem 229 and a non-illustrated communications line and separately serve to function as the mechanism designing section 20, the three-dimensional real-time simulator 30, the status-transitional diagram or table creating/editing section 41, the integrated developing environment section 43, and the first and second interface sections 50-52.

In this alternative support system, the mechanism designing program 311, the three-dimensional-mechanism model simulating program 312, the status-transition diagram or table program 320, the first interface program 314, the second interface program 315, and the integrated developing environment program 316 are installed in the computer systems 100 which respectively function as the mechanism designing section 20, the three-dimensional real-time simulator 30, the status-transition diagram or table creating section 41, the first and second interface sections 50-52, and the integrated developing environment section 43.

In the support system 10 of the present embodiment, the microcomputer chip 42 in which the control program (embedded software) being developed is connected to the computer system 100 via a non-illustrated I/O (input/output) board so that an actuator instructing signal (in an original sense, an electrical signal to be transmitted to a motor driver or the like) to be outputted from the microcomputer chip 42 based on the control program is input to the computer system via I/O board and also to the three-dimensional real-time simulator 30 via the second interface section 52. And the three-dimensional real-time simulator 30 renders the three-dimensional-mechanism model in accordance with the actuator instructing signal to generate a sensor signal resembling a signal to be originally output from the sensor), and then inputs the generated sensor signal to the microcomputer chip 42 via the second interface section 52 and the I/O board.

Thus in the support system 10 of the present embodiment, by taking the three-dimensional real-time simulator 30 as the pivot section, it is possible not only to progress the developing the embedded software (control program) separately (concurrently) of the designing the mechanism, without making a trial product of the mechanism, but also to efficiently develop the embedded software in the absence of a trial product of the mechanism, by combining the task control describing method, which is according to the status-transition diagram or table, with the three-dimensional real-time simulator 30.

As described above, the support system 10 of the present embodiment is equipped with the mechanism designing section 20 for designing the mechanism during the mechanism simulation with real time, the three-dimensional real-time simulator 30 for simulating the mechanism with real time, and the embedded software developing section 40 for developing the embedded software with regarding a virtual three-dimensional-mechanism model on the three-dimensional real-time simulator 30 as an actual mechanism, all of which are operatively interconnected via the first and second interface sections 50-52.

In the support system 10 of the present embodiment, the designing of the mechanism and the developing of the embedded software for controlling the mechanism are performed concurrently. The basic performing procedure will now be simply described.

A designer of the mechanism progresses the designing of the individual parts and the designing of assembling these parts by making the mechanism designing section (an appearance design and CG system, and a three-dimensional CAD system) 20 the three-dimensional real-time simulator 30 operative with each other via the first interface section 50, while verifying the respective movements of various mechanisms, such as joints, gears and cam(s) in detail. During this designing, the mechanism designer inputs the designing data of the object parts, which are to be redesigned, for being dynamically reflected on the three-dimensional real-time simulator 30 via the first interface section 50 for every occurrence of design change, thereby verifying the movements of the whole assembly at that time. Since the three-dimensional-mechanism model to be dealt with the three-dimensional real-time simulator 30 is a software system, it is possible to reflect an arbitrary design change quickly as compared to the case that a trial product is actually manufactured.

In the meantime, regarding the three-dimensional real-time simulator 30 as an actual apparatus, an embedded software developing person progresses the developing of the embedded software while making three-dimensional real-time simulator 30, the status-transition diagram or table creating/editing section 41 and the microcomputer chip 42 cooperative with one another via the second interface sections 51, 52. At that time, since the three-dimensional real-time simulator 30 quickly reflects an arbitrary design change having occurred in designing of the mechanism, the developing of the embedded software will not be delayed due to the design change on the mechanism.

The embedded software developing person firstly decides detail specifications of task control of the embedded software (task control flow) while making the status-transition diagram or table creating/editing section 41 and the three-dimensional real-time simulator 30 with each other, and transfers the result of the decision to the integrated developing environment (microcomputer system developing environment) section In the integrated developing environment section 43, the task control flow received from the status-transition diagram or table creating/editing section 41 is converted into C, C++, and assembler coding to create an executing module (embedded software), and the created embedded software is written into the microcomputer chip 42.

Since the microcomputer chip 42 and the three-dimensional real-time simulator 30 can cooperate with each other via the second interface section 52, the embedded software developing section 40 can verify whether or not an executing module embedded in the microcomputer chip 42 performs a task control in accordance with the specifications, by moving a virtual mechanism model (three-dimensional-mechanism model) on the three-dimensional real-time simulator 30.

Thus with the support system 10 of the present embodiment, by progressing the designing of the mechanism and the developing of the embedded software, with regarding the three-dimensional real-time simulator 30 as an intermediate, and interconnecting the microcomputer chip 42 and the actual apparatus with each other to make a final combining test using the actual apparatus, it is possible to perform the designing of the mechanism and the developing of the embedded software with improved efficiency.

The various parts of the support system 10 of the present embodiment will now be described in detail with reference to FIGS. 5 through 82. To start with, the cooperating section (the first interface section 50) between the mechanism designing section (appearance design and three-dimensional CAD system) 20 and the three-dimensional real-time simulator 30 will be described with reference to FIGS. 5 through 6B.

Figure 5:
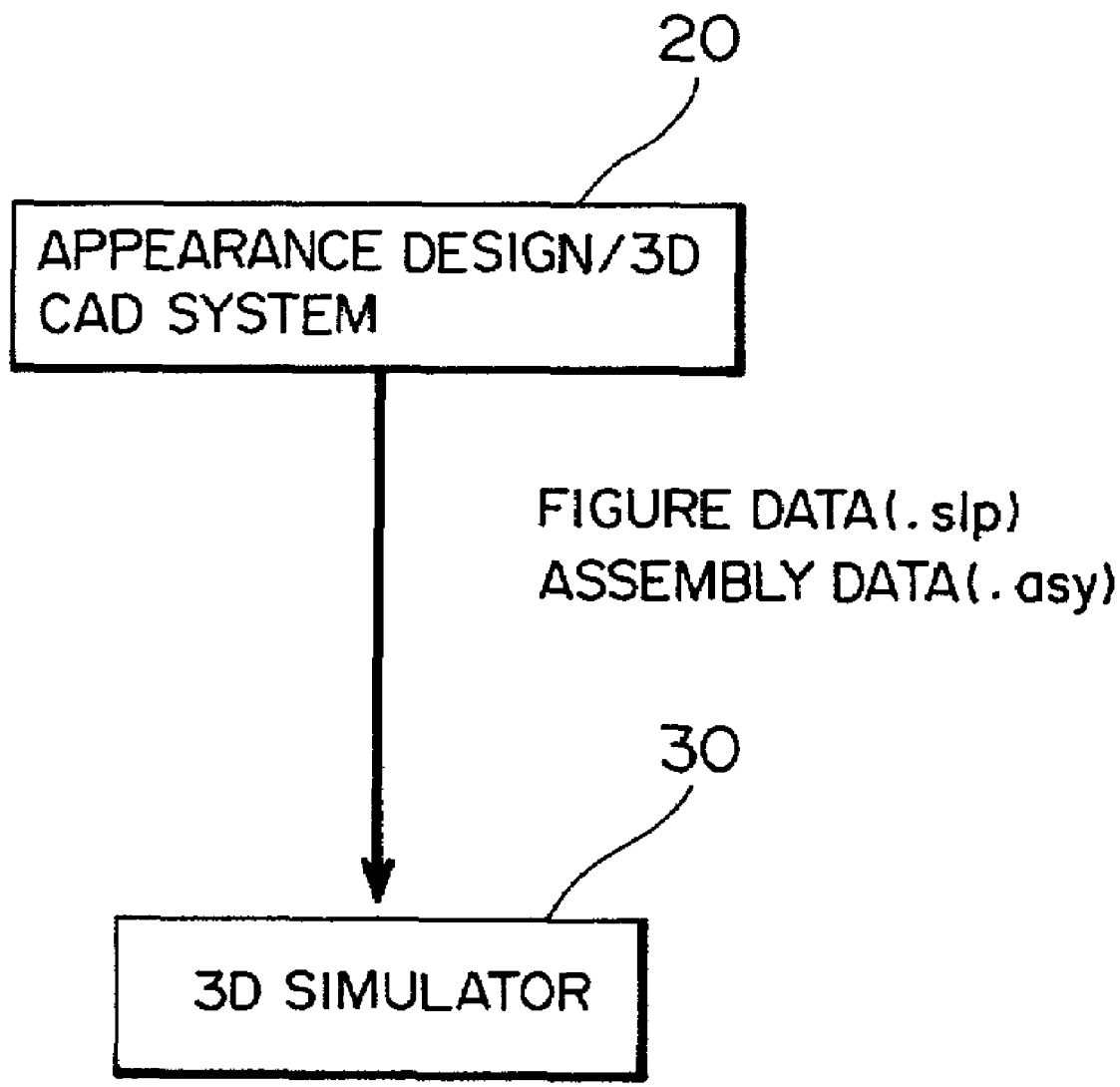
FIG. 5 is a block diagram showing a main portion of the support system of the first embodiment.

FIG. 5 is a block diagram showing the main sections (the mechanism designing section 20 and the three-dimensional real-time simulator 30) of the support system 10, and FIGS. 6A and 6B are diagrams showing the respective examples of a figure data file and an assembly data file, which are to be transferred from the mechanism designing section 20 and the three-dimensional real-time simulator 30.

As shown in FIG. 5, the figure data file (.slp file format) of various elements (parts) to be designed and the assembly data file (.asy file format), in which various elements are assembled, are read from the mechanism designing section (appearance design and three-dimensional CAD system) 20 to the three-dimensional real-time simulator 30.

At that time, the above-mentioned first interface section 50 (FIG. 1) is interposed between the mechanism designing section 20 and the three-dimensional real-time simulator 30. In the example of FIG. 5, the function of the first interface section 50 is wholly incorporated in either one of the mechanism designing section 20 and the three-dimensional real-time simulator 30, or is separately incorporated in the mechanism designing section 20 and the three-dimensional real-time simulator 30. Therefore, the first interface section 50 is not shown in FIG. 5.

As shown in FIG. 6A, the figure data file is a file of format of .slp, which format describes an aggregation of triangular polygons, specifically writing the tangents of apices of the individual triangular polygons and the three-dimensional-position coordinates in sequence. And, as shown in FIG. 6B, the assembly data file is a file format of .asy, in which format mutual arrangement information of the various elements are defined.

After reading the files of .asy and .slp from the mechanism designing section 20, the three-dimensional real-time simulator 30 inputs mechanism information, such as joints, cam(s) and gears, and various items of characteristic information on a motor and a sensor via GUI (graphical user interface) of the three-dimensional real-time simulator 30 to complete a virtual mechanism model (three-dimensional-mechanism model).

The relaying section (second interface section 51) between the three-dimensional real-time simulator 30 and the status-transition diagram or table creating/editing section 41 will now be described with reference to FIGS. 7 through 14.

Figure 8:
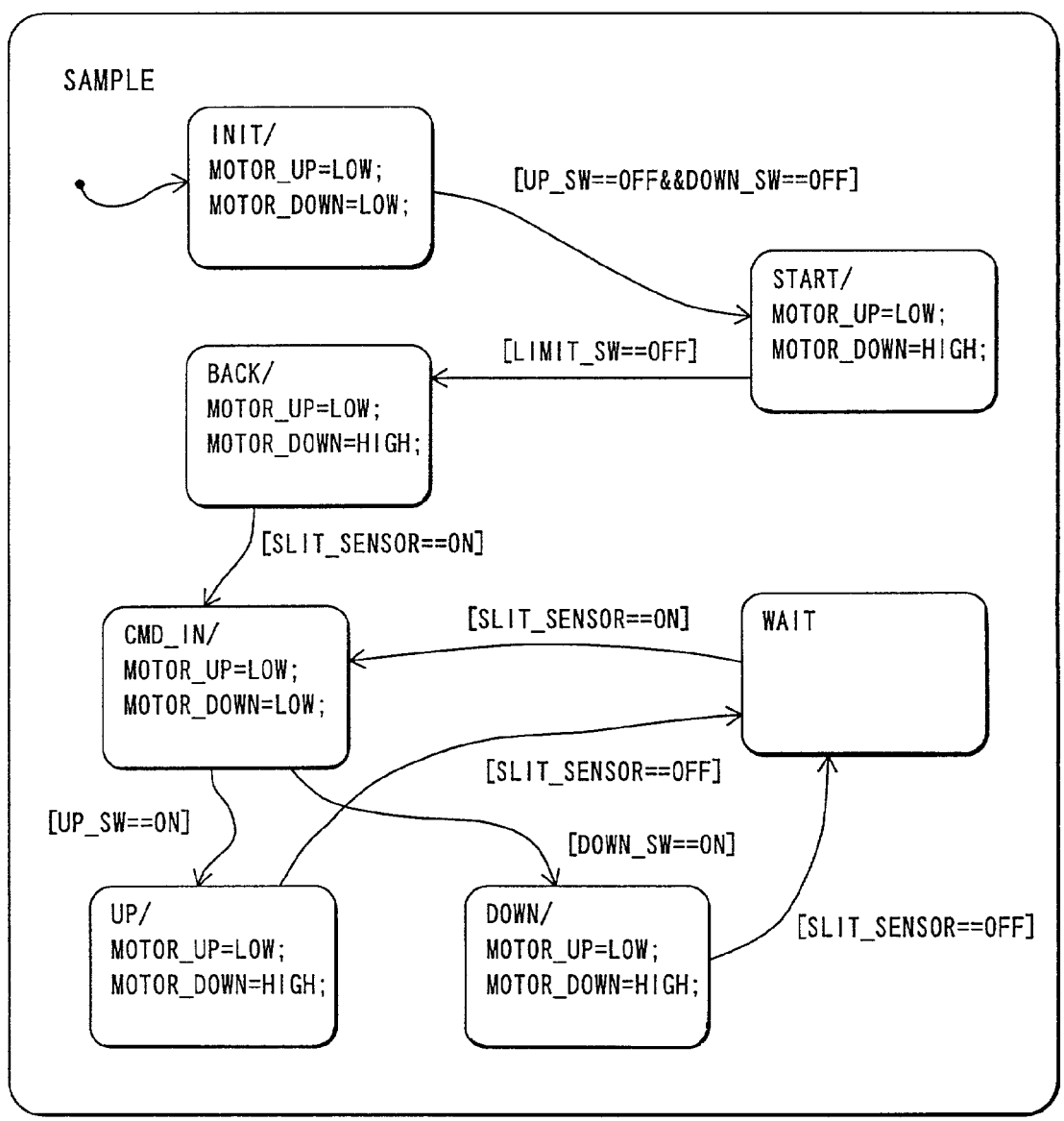
Figure 10:
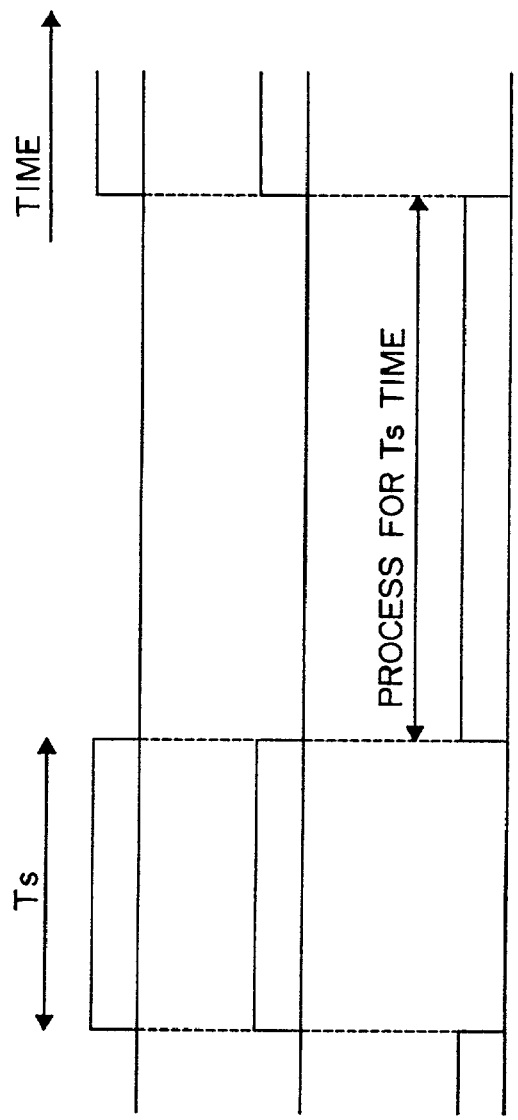
FIGS. 10A through 10C are a timing diagram illustrating a multi-task.
Figure 11:
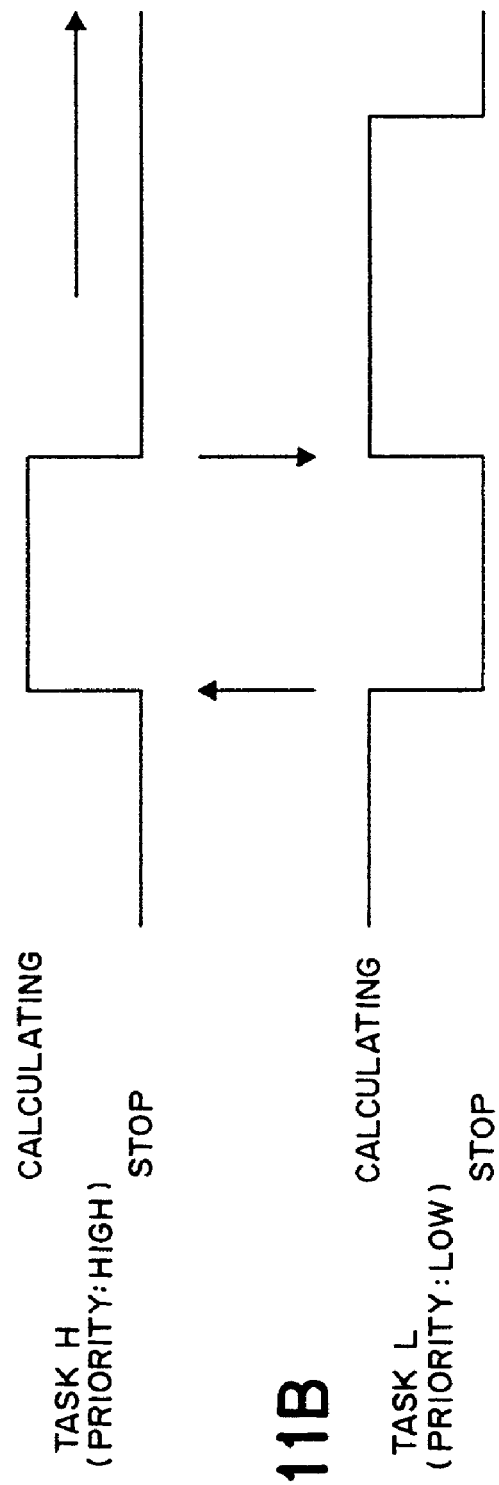
FIGS. 11A and 11B illustrate how to schedule a task with priority.
Figure 12:
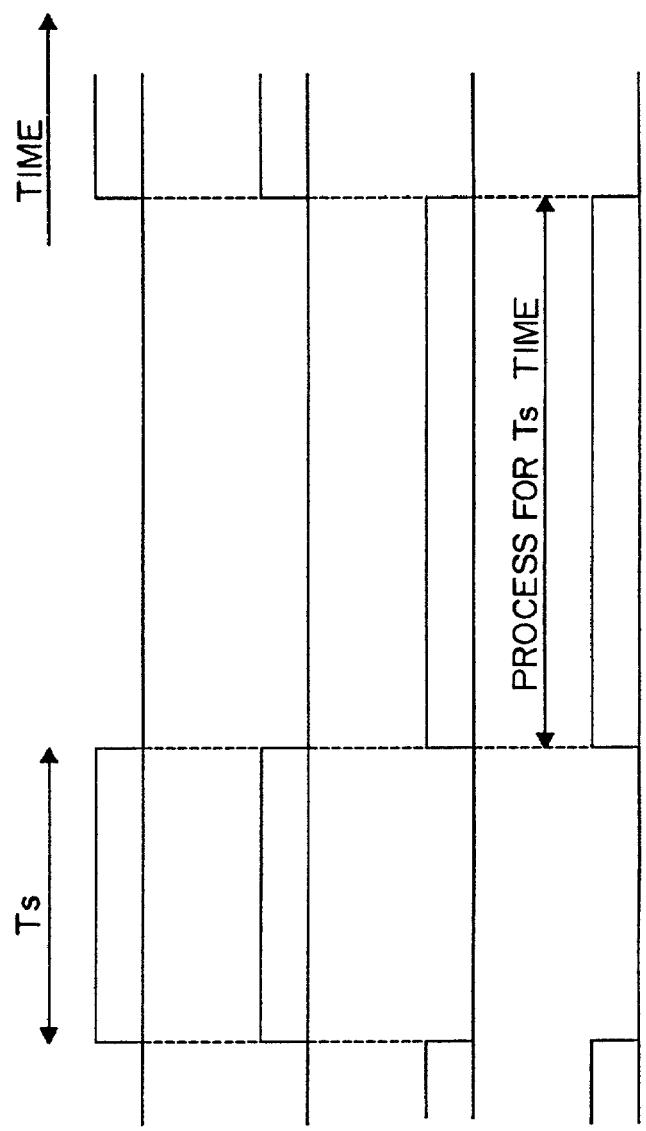
FIGS. 12A through 12D are a timing diagram illustrating a synchronization process using a synchronous task.

FIG. 7 is a block diagram showing the main portion (the three-dimensional real-time simulator 30, the status-transition diagram or table creating/editing section 41, and second interface section 51) of the support system 10 of the first embodiment, FIGS. 8 and 9 respectively show two displayed examples of status-transition diagram and table, FIGS. 10A through 10C are a timing diagram illustrating a multi-task, FIGS. 11A and 11B illustrate how to schedule a task with priority, and FIGS. 12A through 12D are a timing diagram illustrating a synchronization process using a synchronous task.

As shown in FIG. 7, the status-transition diagram or table creating/editing section 41 includes a task control section 411 for performing a task control described in a status transition, a user interface section 412 for editing the task control, which is to be performed by the task control section 411, using a keyboard, a mouse, etc., a status-transition display section 413 for displaying the content of the task control to be performed by the task control section 411, and an interface section 414 for interacting with the three-dimensional real-time simulator 30. In the status-transition display section 413, the content of the task control to be performed by the task control section 411 (task control flow) is displayed in the form of a status-transition diagram graphically as shown in FIG. 8, or in the form of a table (status-transition table) as shown in FIG. 9.

And the three-dimensional real-time simulator 30 includes a simulating section 31 for performing a three-dimensional-mechanism model simulation with real time, and an interface section 32 for interacting with the status-transition diagram or table creating/editing section 41.

The interface sections 414, 32 constitute the above-mentioned second interface section 51. Namely, in the example of FIG. 7, the function as the second interface section 51 is separately incorporated in the three-dimensional real-time simulator 30 and the status-transition diagram or table creating/editing section 41.

In the three-dimensional real-time simulator 30 operatively connected with firmware (the status-transition diagram or table creating/editing section 41 and the microcomputer chip 42), it is essential to simulate the three-dimensional-mechanism model (virtual mechanism model) as such in movement with the same time scale as real time on the firmware.

Assuming that calculation of time Ts is performed by tasks 1, 2 of the firmware as shown in FIGS. 10A and 10B, simulation of the virtual mechanism (three-dimensional-mechanism model) for the time Ts is continued on the three-dimensional real-time simulator 30.

However, as shown in FIGS. 10A and 10B, when a plurality of (two in these two views) tasks run in parallel, stopping/starting the processes of the plural tasks concurrently in synchronism with one another would encounter problems as to which task should be in charge of management of time and how to interrupt/restart the processes, for example.

Consequently, in the present embodiment, a synchronous task (synchronous take) as such shown in FIG. 12C is provided to perform management of time and controlling of the starting/stopping of the other tasks so that the firmware and the three-dimensional real-time simulator 30 is synchronized with each other without adding any special process to the tasks.

At that time, a function of scheduling tasks by priority is used as the basic function of real-time OS. In complicated embedded software (firmware), various processes are performed by a plurality of tasks on real-time OS. Though plural tasks can run in parallel on real-time OS, there is only a single resource (CPU); consequently OS schedules which task CPU should be allocated to.

For this scheduling, it has been a common practice to set the tasks by priority and then allocate CPU to a higher-priority upon receipt of simultaneous requests for use of CPU from plural tasks. As such shown in FIGS. 11A and 11B, when a higher-priority task H starts the process during the process of a low-priority task L, OS interrupts the process of the task L and transfers the right to execute the process to the task H. Upon termination of the process of the task H, OS restarts the process of the task L being interrupted.

By setting the priority of a synchronous task to higher than the other tasks using the function of changing over the task by priority, the synchronous task can control starting/stopping the other tasks. At that time, ordinary tasks require no special process for synchronization.

As such shown in FIGS. 12A through 12D, during execution of simulation for the time Ts on the three-dimensional real-time simulator 30 in correspondence with calculation of the time Ts by two tasks 1, 2, which are to be executed in parallel, with the priority of a newly added synchronous task set to the highest, the right to execute the process by CPU is transferred to the synchronous task. As a result, during that time, the processes of the tasks 1, 2 are interrupted and will not be restarted until after termination of simulation for the time Ts.

Figure 13:
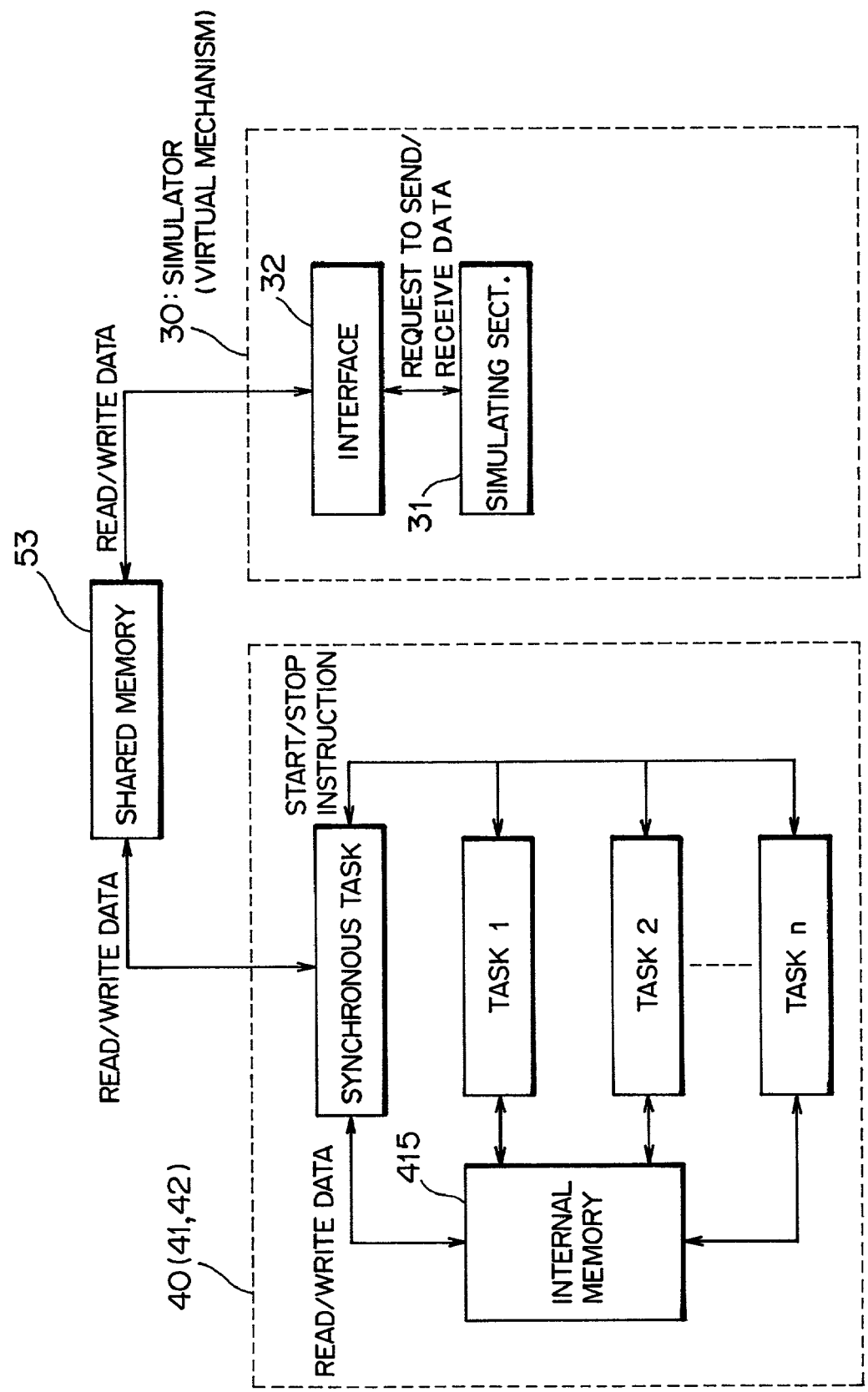
FIG. 13 is a block diagram illustrating a synchronization process using a synchronous task of the first embodiment.

FIG. 13 is a block diagram illustrating a synchronization process using a synchronous task of the first embodiment. In the example of FIG. 13, the second interface section 51 (52) between the status-transition diagram or table creating/editing section 41 (microcomputer chip 42) and the three-dimensional real-time simulator 30 is realized by a shared memory 53.

The status-transition diagram or table creating/editing section 41 executes n (natural number) tasks 1 through n are executed in parallel, referring to individual data in an internal memory 415. During the process of the synchronous task, the status-transition diagram or table creating/editing section 41 reads out data (actuator instructing signal) in the internal memory 415 to send the read-out data to the three-dimensional real-time simulator 30, and receives data (sensor signal) from the three-dimensional real-time simulator 30 to write the received data to the internal memory 415.

At that time, the individual data may be sent to and received from the three-dimensional real-time simulator 30 (virtual mechanism) in timed relation to the processes of the individual tasks. In the present embodiment, however, in order for efficient communications, the synchronous task serves to previously buffer data in the internal memory 415 and then performs transmitting/receiving of the data collectively at intervals, one individual collected quality of data at a needed time. The communications method may be the above-mentioned method using a shared memory 53, a socket communications method, or a message communications method.

The process of synchronization using a synchronous task will now be described using the flow diagram (steps S11 through S19) of FIG. 14.

Figure 14:
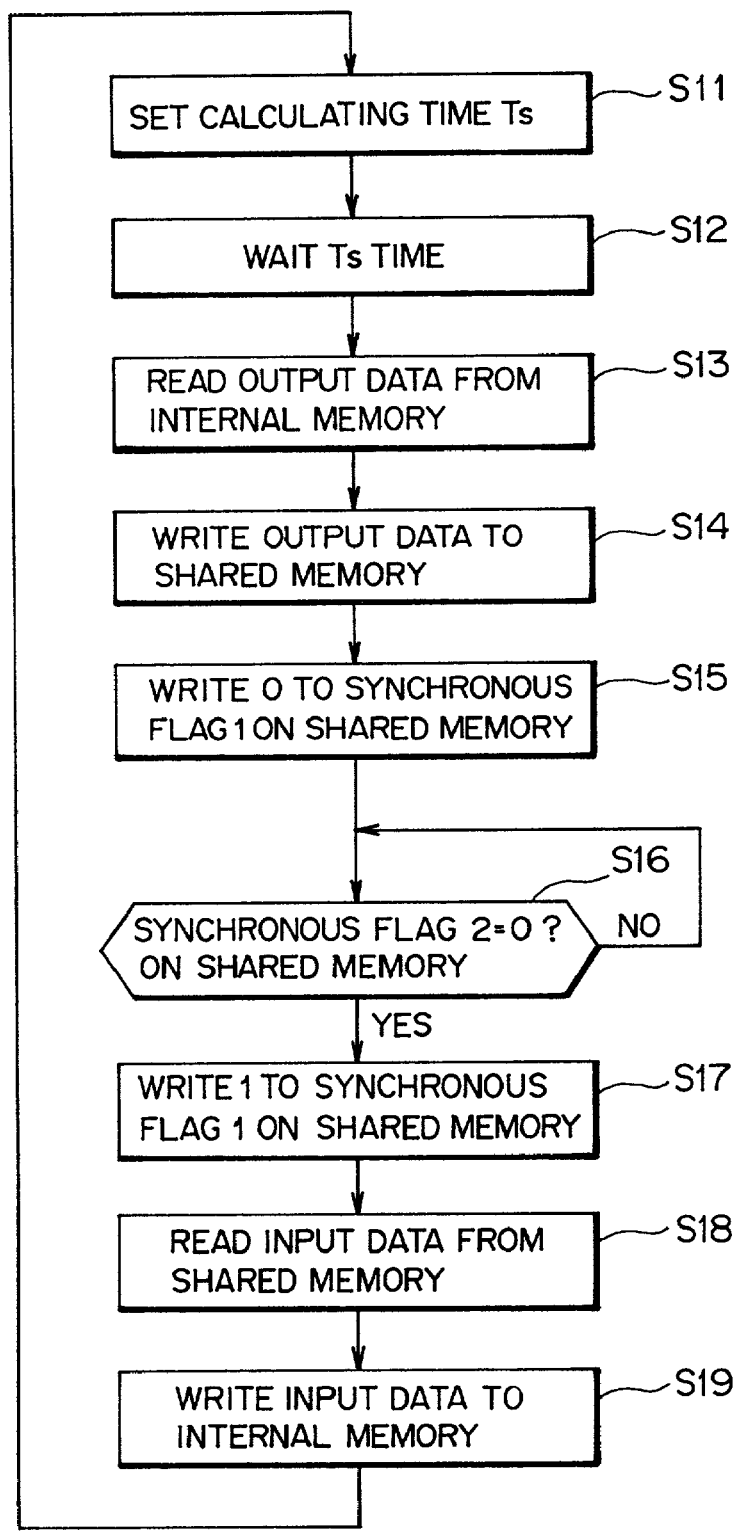
FIG. 14 is a flow diagram illustrating the synchronous process.

As shown in FIG. 14, the next calculated time (processing time) Ts, along with the result of the previous simulation (sensor signal), is transmitted from the three-dimensional real-time simulator 30 to the status-transition diagram or table creating/editing section 41 (microcomputer chip 42) where the time Ts is set (step S11).

Then the processing of the synchronous task is stopped for only the time Ts (step S12). Namely, the processing of the plural tasks is executed for the time Ts, and actuator instructing signals (motor instructing signal) obtained one for the process of each task are written in the internal memory 415. In the present embodiment, the synchronous task is normally kept stopping, and will becomes operative after the lapse of time Ts. This can be realized by the timer function and the sleep function, which are those of OS.

After the processing of the synchronous task has been stopped to stand by for only the time Ts (step S12), the synchronous task is rendered operative to interrupt all the other tasks. Bythe synchronous task, the output data (instructing signal) from the individual tasks are read out from the internal memory 415 (step S13) and written to the shared memory 53 (step S14), whereupon "0" is written to the shared memory 53 as a synchronous flag 1 (Loop Flag) (step S15), thereby permitting the three-dimensional real-time simulator 30 to execute the processing. In response to this, in the shared memory 53, a synchronous flag 2 (Ready Flag) is set from "0" to "1".

After that, the status-transition diagram or table creating/editing section 41 (microcomputer chip 42) waits for a termination-of-simulation notice from the three-dimensional real-time simulator 30, keeping the other tasks being interrupted.

Upon receipt of a start-execution-of-simulation instruction from the status-transition diagram or table creating/editing section 41 (microcomputer chip 42), the three-dimensional real-time simulator 30 performs simulation for the time Ts. Then upon completion of simulation for the time Ts, the three-dimensional real-time simulator 30 writes the result of the simulation (sensor signal) and the next calculated time (processing time) Ts in the shared memory 53 to overwrite the synchronous flag 2 (Ready Flag) on the shared memory 53 into "0", then standing by until it receives the next start-execution-of-simulation instruction from the status-transition diagram or table creating/editing section 41 (microcomputer chip 42).

When it recognizes that the synchronous flag 2 (Ready Flag) on the shared memory 52 has become "0", namely, the simulation has been completed (YES route of step S16), the status-transition diagram or table creating/editing section 41 (microcomputer chip 42) overwrites the synchronous flag 1 (Loop Flag) on the shared memory 53 into "0" (step S17) and reads out input data, which is the result of the simulation (sensor signal), from the shared memory 53 (step S18) and writes the read-out input data to the internal memory 415 (step S19). At that time, the next calculated time (processing time) Ts also is written into the internal memory 415, whereupon the procedure returns to step S11 to repeat execution of the same process as described above.

By repeating the foregoing processing, it is possible to establish precise synchronization between the status-transition diagram or table creating/editing section 41 (microcomputer chip 42) and the three-dimensional real-time simulator 30 even if a multi-task is employed in the status-transition diagram or table creating/editing section 41 (microcomputer chip 42).

At that time, the time Ts should by no means be fixed and may vary depending on the status of the simulation; for this purpose, as described above, the simulation time Ts is transferred upon synchronization.

Further, in the status-transition diagram or table creating/editing section 41 (microcomputer chip 42), data (such as an instructing signal) to the three-dimensional real-time simulator 30 is transmitted to the three-dimensional real-time simulator 30 before starting the simulation. After termination of the simulation, the data (such as a sensor signal) from the three-dimensional real-time simulator 30 is received before starting the calculating of the status-transition diagram or table creating/editing section 41 (microcomputer chip 42) and written into the internal memory 415.

The second interface section 52 between the three-dimensional real-time simulator 30 and the microcomputer chip 42, which is similar in construction to the second interface section 51 described in connection with FIGS. 5 through 14, serves to function likewise the second interface section 51 so that the microcomputer chip 42 and the three-dimensional real-time simulator 30 are exactly synchronized with each other even if a multi-task is employed in the microcomputer chip 42.

Practically the status-transition diagram or table creating/editing section 41 is exemplified by technologies disclosed as such in StateFlow 3.0 (product of Math Works Inc.) manual, StateMate 2.0 (product of iLogix Inc.) manual and ZIPC 6.0 (product of CATS) manual. And the integrated developing environment section 43 is exemplified by technologies disclosed as such in Softune V3 (product of Fujitsu Inc.) manual. The status-transition diagram or table creating/editing section 41 and the integrated developing environment section 43 are operatively interconnected so that the task control flow created by the status-transition diagram or table creating/editing section 41 is loaded into the integrated developing environment section 43 where finally a target-microcomputer execution module is created seamlessly.

As mentioned above, after designing of the mechanism and developing of the embedded software have been concurrently progressed utilizing the three-dimensional real-time simulator 30, combination of the mechanism and the embedded software is tested (the actual system is finally confirmed) using a trial product of an actual interface (by interconnecting the actual system and the microcomputer chip 42).

Further, as mentioned above, the three-dimensional real-time simulator 30 is equipped with a logic analyzer (analyzing section). This logic analyzer, as shown in FIG. 15, analyzes a change with time between a actuator instructing signal for the actuator (motor) and a sensor signal obtained by the three-dimensional real-time simulator 30 with real time under a synchronous algorithm, displaying this change as the result of simulation so that an embedded software developing person can confirm the change with time. The logic analyzer serves also to preserve data and print the data.

Figure 16:
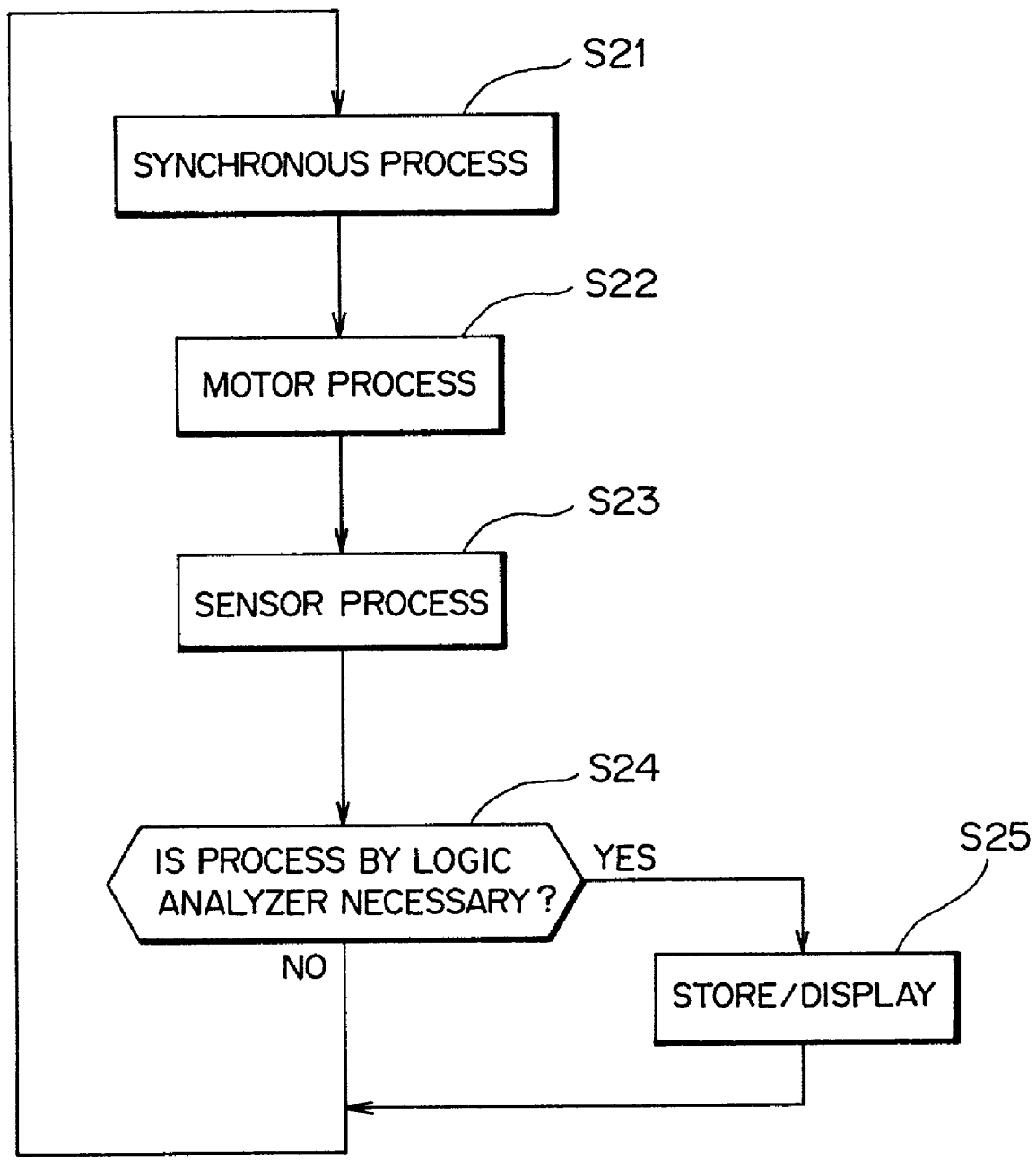
FIG. 16 is a flow diagram illustrating the procedure of a whole simulating process including a process by the logic analyzer of the first embodiment.

FIG. 16 is a flow diagram illustrating the procedure of a whole simulating process including a process by the logic analyzer of the first embodiment. As shown in FIG. 16, during the simulation by the three-dimensional real-time simulator 30, the motor processing is performed based on the actuator instructing signal from the status-transition diagram or table creating/editing section 41 and the microcomputer chip 42 (step S22) while establishing synchronization by the second interface sections 51, 52 (step S21), whereupon the sensor processing is performed in accordance with the actuator instructing signal (step S23). During the processing of steps S21 through S23, inputting/outputting is performed by the I/O board or socket communication so that the output values with these processes are buffered and can be read out later. On the other hand, since it is guaranteed that the input values do not vary at steps other than the synchronization (step S21), no buffering is performed.

If the processing by the logic analyzer is unnecessary (NO route of step S24), the procedure returns to step S21. Otherwise if the processing by the logic analyzer is necessary (YES route of step 24), the actuator instructing signal and the sensor signal are stored and displayed (step S25).

At that time, in the present embodiment, since the time Ts for simulation occasionally varies for every loop, the information in the logic analyzer is stored using three rows of arrangement of "time", "PIO value" and "DA value".

For saving the memory capacity, as the arrangement of "time", the number of control loops (n is the frequency corresponding to time Ts and described later in connection with FIG. 33) designated by the three-dimensional real-time simulator 30 during the synchronization is stored. As the arrangement of "PIO value", data of 32 channels is stored for every bit. As the arrangement of "DA value", data of 2 channels is quantized into 16 bits and is stored as a 32-bit integer.

The three-dimensional real-time simulator 30 of the support system 10 of the present embodiment will now be described in further detail with reference to FIGS. 17 through 82.

Figure 17:
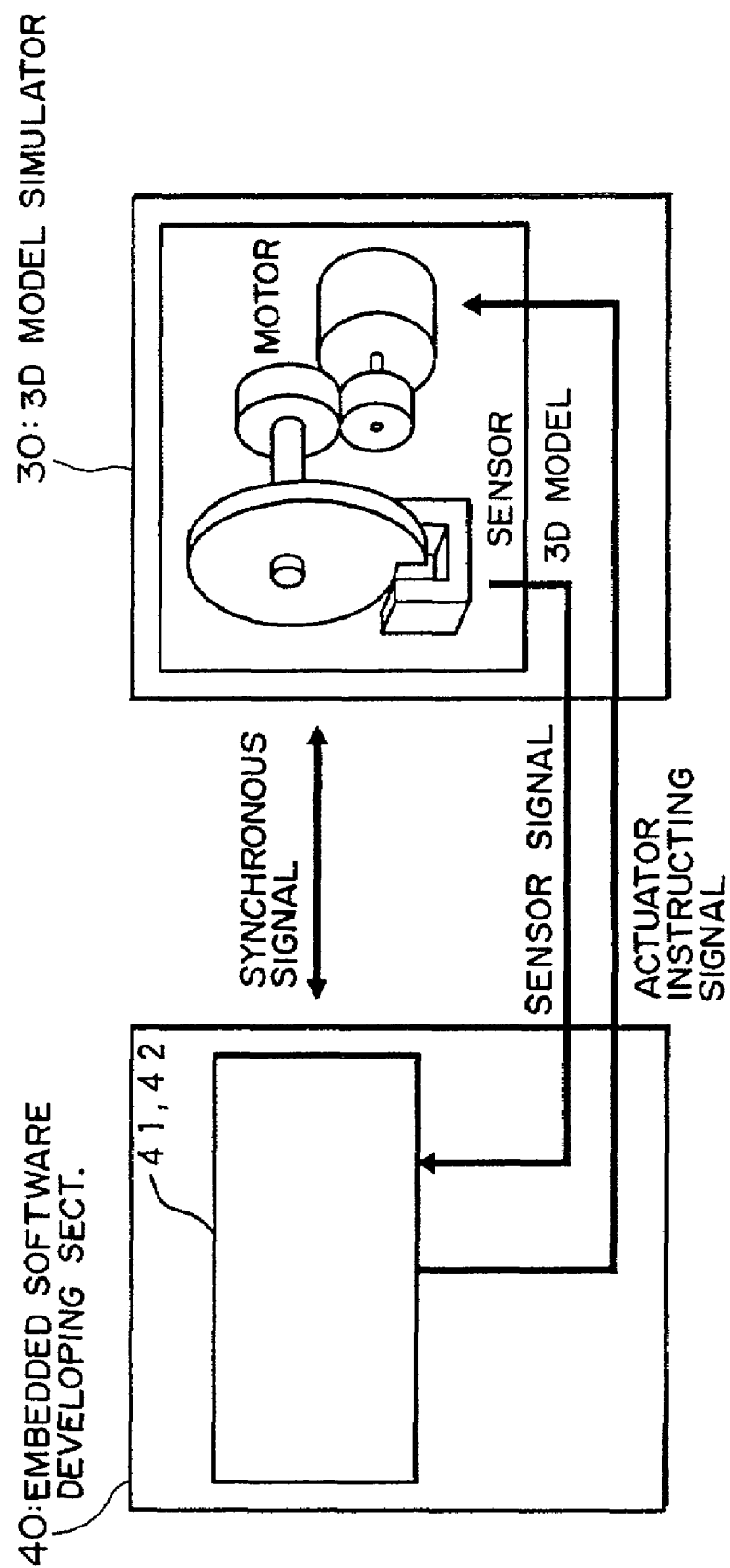
FIG. 17 is a concept diagram illustrating the mode of operation of a three-dimensional model simulator of the support system of the first embodiment.

FIG. 17 is a concept diagram illustrating the mode of operation of a three-dimensional model simulator of the support system of the first embodiment. As shown in FIG. 17, a three-dimensional-mechanism model (hereinafter also called "3D model") is architected in the three-dimensional real-time simulator (hereinafter also called "3D model simulator").

3D model is a three-dimensional model of a product which model is defined by three-dimensional mechanism data defining the relations between three-dimensional shapes of plural links (individual parts constituting a product) and postures of the individual parts; the 3D model of a link is moved as the posture of the link is changed.

An actuator instructing signal for moving an actuator, such as amotor, is transmitted from the embedded software developing section 40 (the status-transition diagram or table creating/editing section 41 and the microcomputer chip 42) to the 3D model simulator 30, and a sensor signal indicating the on/off state of a sensor is transmitted from the 3D model simulator 30 to the embedded software developing section 40. In FIG. 17, the second interface sections 51, 52 (FIG. 5) serving to receive/transmit synchronous signals are not shown.

Figure 18:
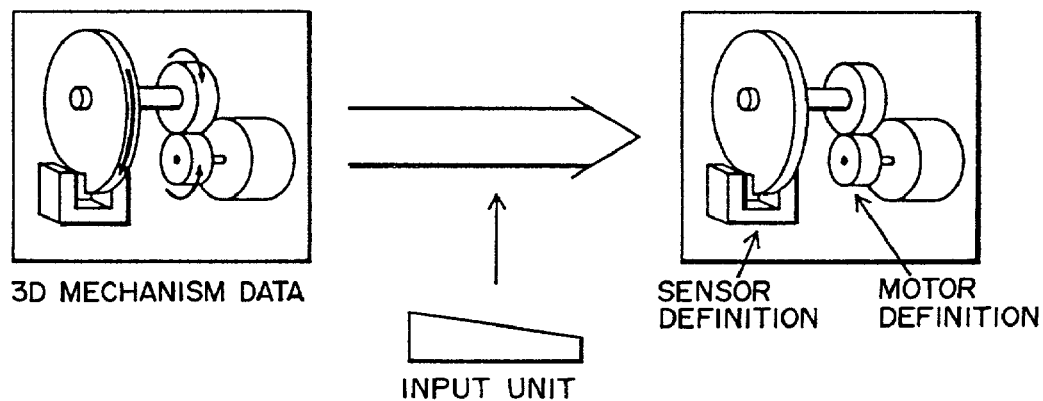
FIG. 18 is a diagram of a three-dimensional real-time simulator, illustrating how to define a sensor and a motor.
Figure 19:
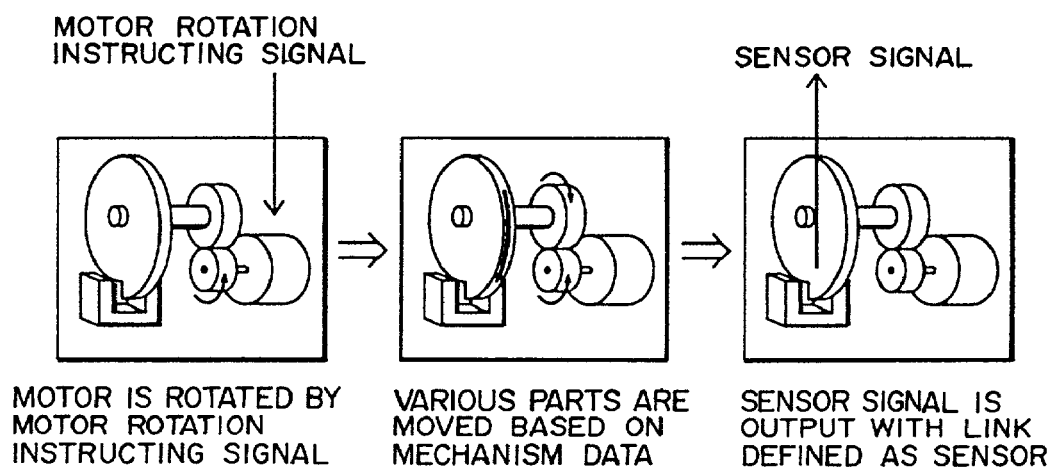
FIG. 19 is a diagram illustrating a simulating process according to the three-dimensional real-time simulator of the first embodiment.

FIG. 18 is a diagram of the 3D model simulator 30, illustrating how to define a sensor and a motor, and FIG. 19 is a diagram illustrating a simulating process according to the 3D model simulator 30 of the first embodiment.

3D model is architected by the mechanism designing section 20, such as three-dimensional CAD; as shown in FIG. 18, a motor and a sensor are defined on the architected 3D model as the input device such as a keyboard is operated by the user.

For practical simulation after this defining, as shown in FIG. 19, the posture of a line defined as the motor (hereinafter also called "motor link") is varied in accordance with an actuator instructing signal received from the embedded software developing section 40. Based on the mechanism data, other links connected with the motor link are moved by an extent corresponding to the change in posture of the motor link, giving influence also on the posture of a link defined as the sensor (hereinafter also called "sensor link"). Then a sensor signal corresponding to the posture of the sensor link is generated and transmitted to the embedded software developing section 40.

Figure 20:
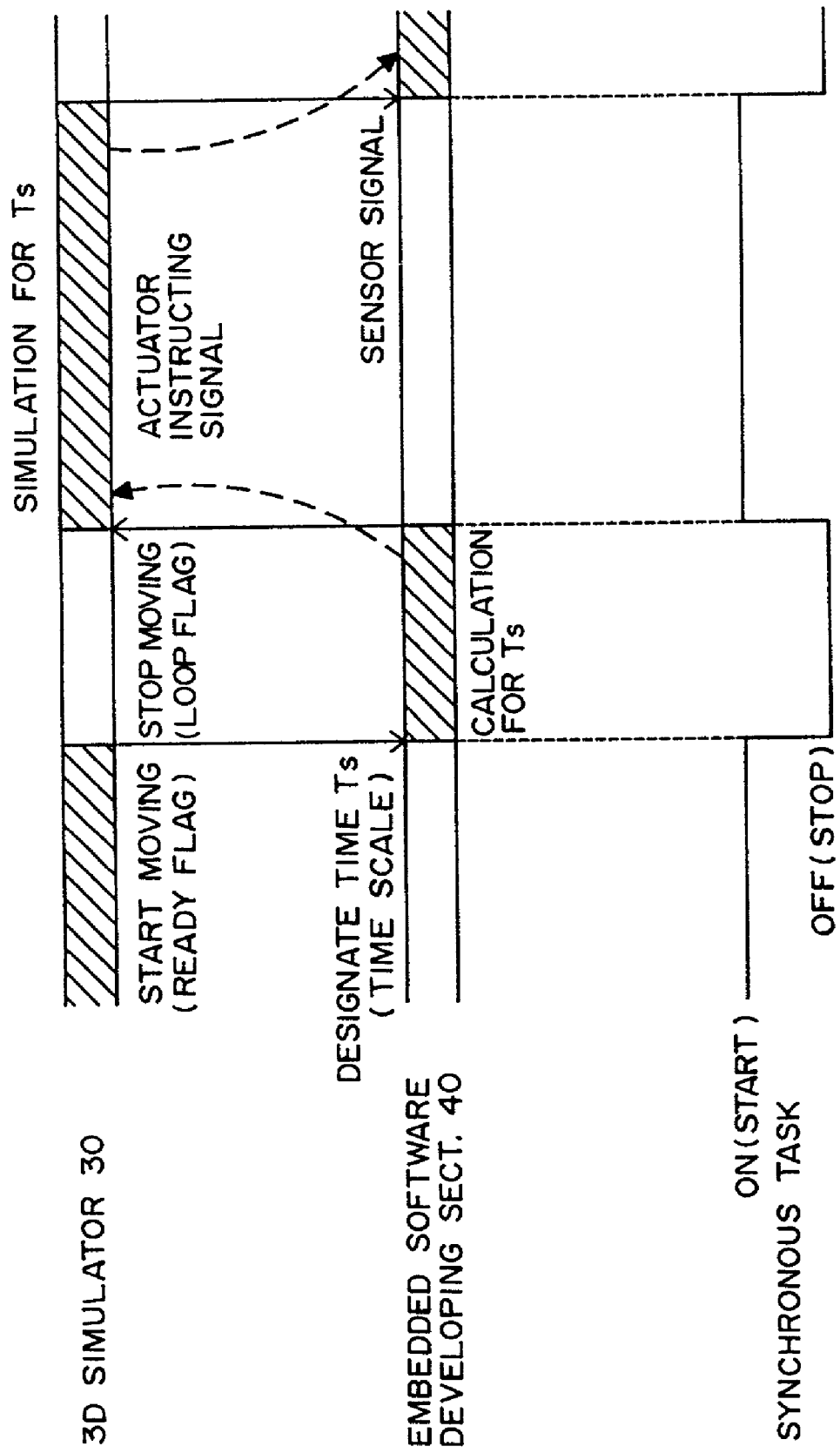
FIG. 20 is a timing diagram illustrating the operating timing between the three-dimensional real-time simulator and an embedded software developing section (synchronous task) according to the first embodiment.

FIG. 20 is a timing diagram illustrating the operating timing between the 3D model simulator 30 and the embedded software developing section 40 (synchronous task) according to the first embodiment. The hatched portions in FIG. 20 each indicate a period for which the 3D model simulator 30 or the embedded software developing section 40.

As shown in FIG. 20, the 3D model simulator 30 and the embedded software developing section 40 (the off-state operation of a synchronous task) repeat alternately the operating and stopping cycles. In each cycle, the 3D model simulator 30 and the embedded software developing section 40 operate in the following procedure. The detail of synchronization between the 3D model simulator 30 and the embedded software developing section 40 (synchronous task) will be described later.

(1) The 3D model simulator 30 performs simulation for the simulation time Ts, based on the actuator instructing signal, and outputs a sensor signal.

(2) the 3D model simulator 30 determines the simulation time Ts for the next loop from the possibility of interference of a current 3D model, transfers the determined simulation time Ts and an operation start instruction (Ready Flag) to the embedded software developing section 40.

(3) The embedded software developing section 40 receives the time Ts and the operation start instruction (Ready Flag) and then performs calculation (control) for the time Ts by a multi-task, whereupon the embedded software developing section 40 sends an operation termination signal (Loop Flag) to the 3D model simulator 30 to interrupt the operation of the 3D model simulator 30, with the synchronous task being on, until receiving the next operation start instruction (Ready Flag).

(4) The 3D model simulator 30 starts simulation for the time Ts upon receipt of the operation termination signal (Loop Flag) of the embedded software developing section 40.

The 3D model simulator 30 and the embedded software developing section 40 operate alternately synchronously with each other by repeating the foregoing procedure.

Figure 21:
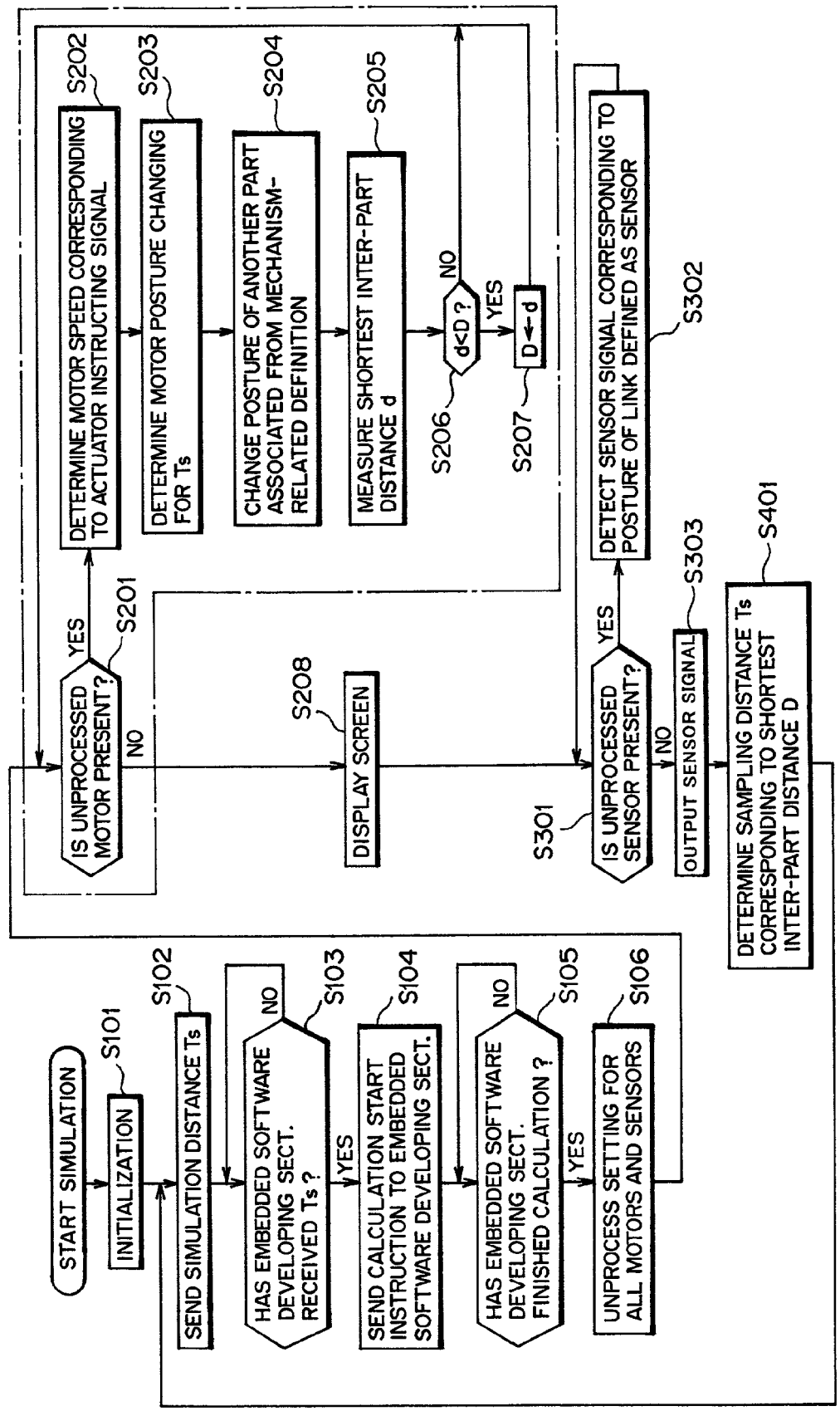
FIG. 21 is a flow diagram illustrating the simulation procedure according to the three-dimensional real-time simulator of the first embodiment.

FIG. 21 is a flow diagram illustrating the simulation procedure according to the 3D model simulator 30 of the first embodiment.

As shown in FIG. 21, the simulation starts with initialization (step S101) to initialize the posture of the individual links of the 3D models. Then a distance (simulation distance) Ts to perform the simulation is sent to the embedded software developing section 40 (step S102) Upon receipt of a signal indicating that the simulation distance Ts has been received from the embedded software developing section 40 (YES route of step S103), a calculation start instruction is sent to the embedded software developing section 40 (step S104).

When the embedded software developing section 40 has performed calculation for the simulation distance Ts and the termination of the calculation is notified (YES route of step S105), all the motors and all the sensors, which constitute the 3D model being simulated are initialized as being unprocessed for the current Ts (step S106).

Then at step S201, it is discriminates whether or not there exist unprocessed motors, and the processes of steps S202 through S207 are performed for each and every unprocessed motor.

Namely, if unprocessed motors exist (YES route of step S201), a rate of rotation of a motor currently being processed is determined in accordance with an actuator instructing signal received from the embedded software developing section 40 relating to the current motor (step S202), and the motor posture varying in the distance Ts is determined from the rotating rate (step S203).

Then the postures of other parts related with the current motor according to the above-mentioned mechanism relation definition are changed (step S204), and the shortest distance d between the individual parts is measured (step S205). At steps S206, S207, the shortest distance D, among all the individual shortest distances d measured in terms of rotations of the individual motors.

It is discriminated whether or not a newly measured shortest distance d is smaller than the past shortest distance D (step S206). If it is smaller (YES route), the newly measured shortest distance d is replaced with the past shortest distance D (step S207), whereupon the procedure returns to step S210. Otherwise if it is not smaller (NO route), the procedure only returns to step S201.

The foregoing processes of steps S202 through S207 are repeatedly executed until it takes NO route at step S201, namely, until it is judged that no unprocessed motor exists.

Thus when changing of the posture in the time Ts for each and every motor has been completed, the resultant 3D model is displayed on the screen (step S208).

After that, it is discriminated whether or not there exist unprocessed sensors (step S301). If unprocessed sensors exist (YES route), the on/off state of each of sensor signals in accordance with the postures of the corresponding sensor links is detected for each and every unprocessed sensor (step S302).

When the processes of all the sensors have been completed (NO route of step S301), a sensor signal related to all these sensors is outputted to the embedded software developing section 40 (step S303), and a sampling distance Ts corresponding to the shortest inter-part distance D is determined (step S401), whereupon the procedure returns to step S102 to send the determined distance Ts to the embedded software developing section 40.

In the 3D model simulator 30, as the foregoing processes are repeatedly executed, simulation of movement of the 3D model performed while the 3D model simulator 30 is kept in synchronization with the embedded software developing section 40.

Figure 22:
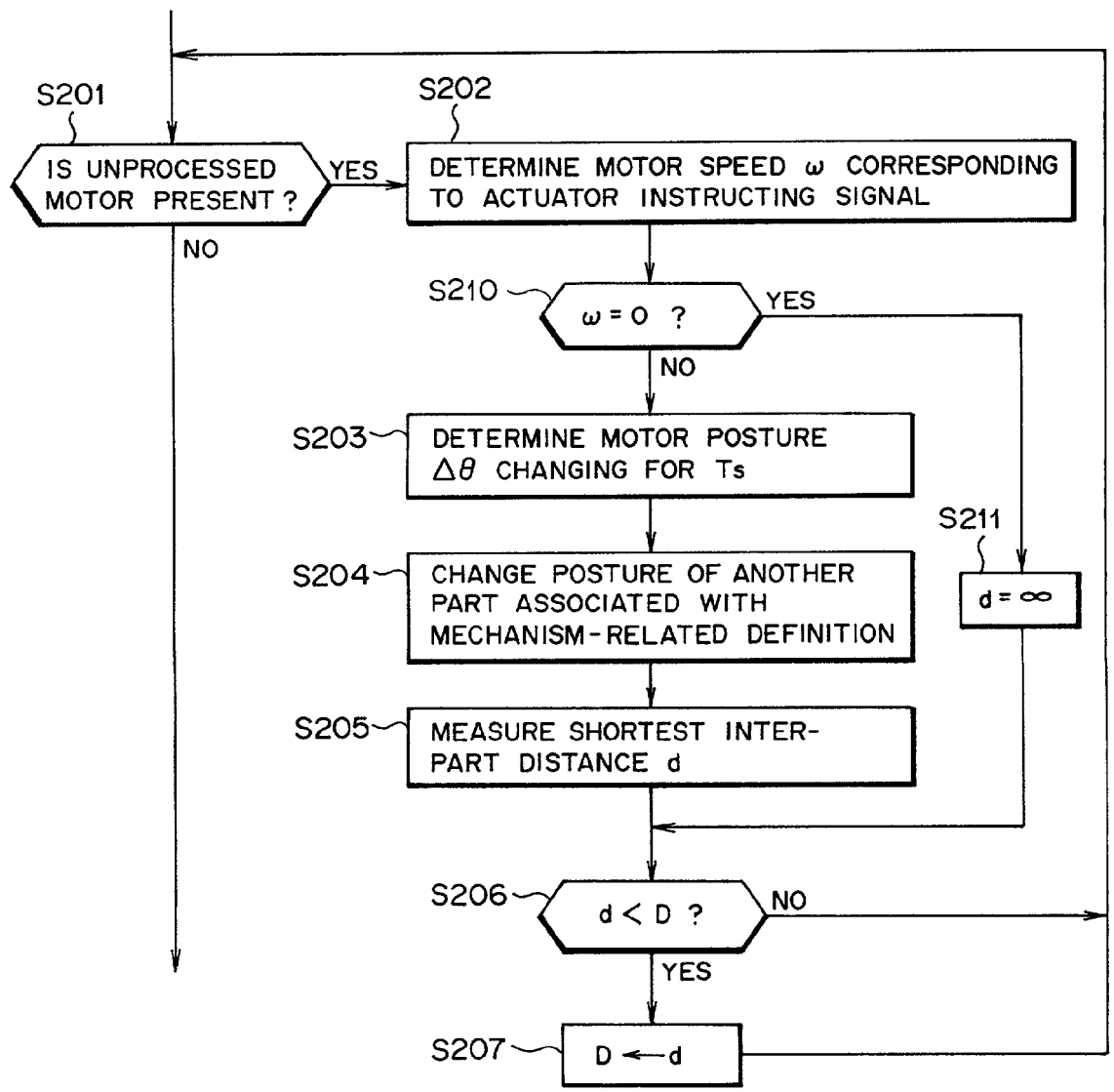
FIG. 22 is a flow diagram illustrating a partial flow to be substituted for a partial flow of simulation procedure of the simulator of FIG. 21.

FIG. 22 is a flow diagram illustrating a partial flow (a portion surrounded by a dot-and-dash line in FIG. 21) to be substituted for a partial flow of simulation procedure of the simulator of FIG. 21.

In FIG. 22, step S210 is inserted between step S202 and step S203. At this step s210, it is discriminated whether or not the rate of rotation of the motor being currently processed is zero ($\omega=0$). If ($\omega=0$ (YES route), the procedure goes to step S211 to assume the distance d=∞ without measuring the inter-part distance d for the movement of the motor, whereupon the procedure shifts to step S206. As a result, the distance d=∞ is excluded from the arithmetic operation for obtaining the distance D. Otherwise if d≠0 (NO route), the procedure shifts to step S203 where the above-mentioned process is performed.

Although a considerable amount of calculation is required to obtain the inter-part distance d, it is possible to reduce the amount of calculation by the 3D model simulator 30 to speed up the simulation, without measuring the distance d related to the motor if the motor takes no rotation.

Figure 23:
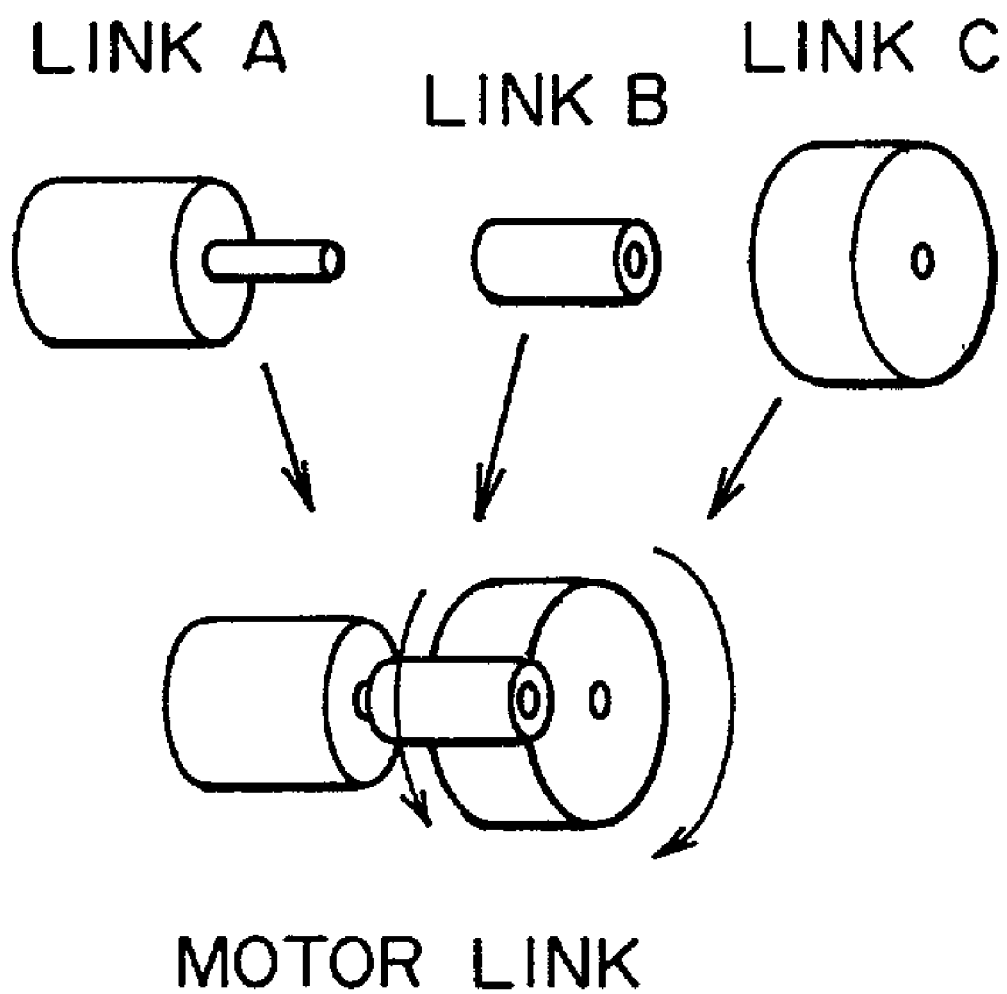
FIG. 23 is a perspective diagram showing one example of motor link to illustrate how to select a link to be defined as a motor (motor link)

FIG. 23 is a perspective diagram showing one example of motor link to illustrate how to select a link to be defined as a motor (motor link).

In FIG. 23, the original motor is shown as a link A, and the link A itself is fixed to the base. Consequently, on simulation, a link B whose posture is varied in the 3D model when driven earliest by the original motor is treated (defined) as a motor link. By defining the motor link in this way, it is possible to facilitate simulation.

Figure 24A:
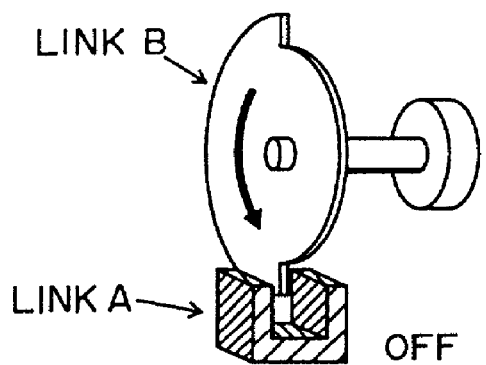
FIGS. 24A and 24B are perspective diagrams showing one example of a sensor link to illustrate how to select a link to be defined as a sensor (sensor link)
Figure 24B:
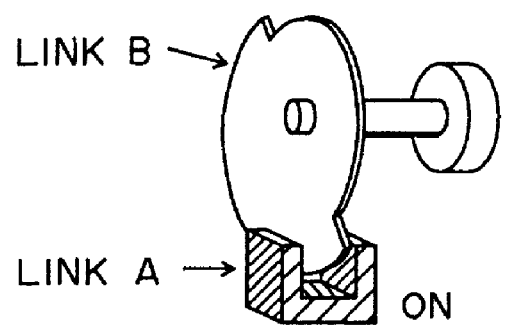
Figure 25A:
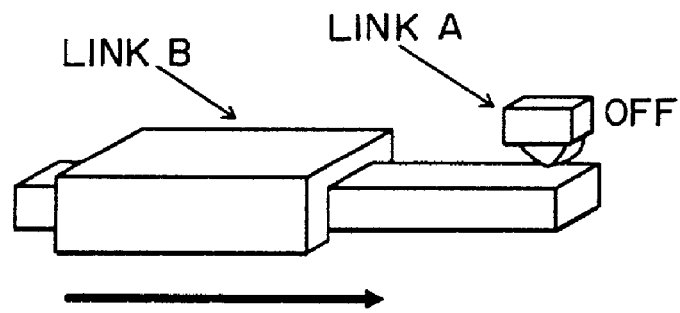
FIGS. 25A and 25B are perspective diagrams showing another example of a sensor link to illustrate how to select a link to be defined as a sensor (sensor link)
Figure 25B:
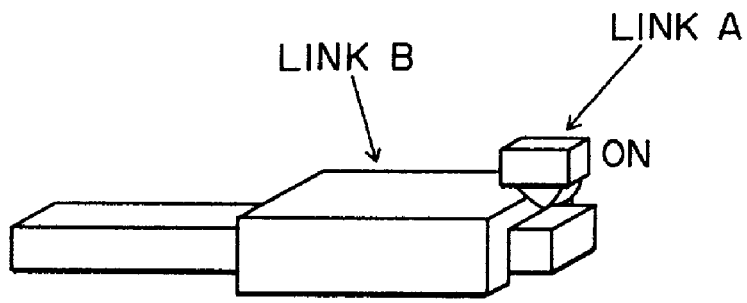

FIGS. 24A and 24B are perspective diagrams showing one example of a sensor link to illustrate how to select a link to be defined as a sensor (sensor link), and FIGS. 25A and 25B are perspective diagrams showing another example of a sensor link to illustrate how to select a link to be defined as a sensor (sensor link).

In FIGS. 24A, 24B, 25A and 25B, though the original sensor is a link A, a link B to be detected by the original sensor is defined as a sensor link. In accordance with the posture (position) of the link B, the status of FIGS. 24A and 25A is defined as the off state of the sensor, while the status of FIGS. 24B and 25B is defined as the on state of the sensor. Thus, in the case of the sensor, likewise in the case of the motor, partly since the link to be detected by the original sensor is defined as the sensor (sensor link), and partly since the on/off states are defined in accordance with the posture of the sensor link, it is possible to facilitate simulation.

Figure 26:
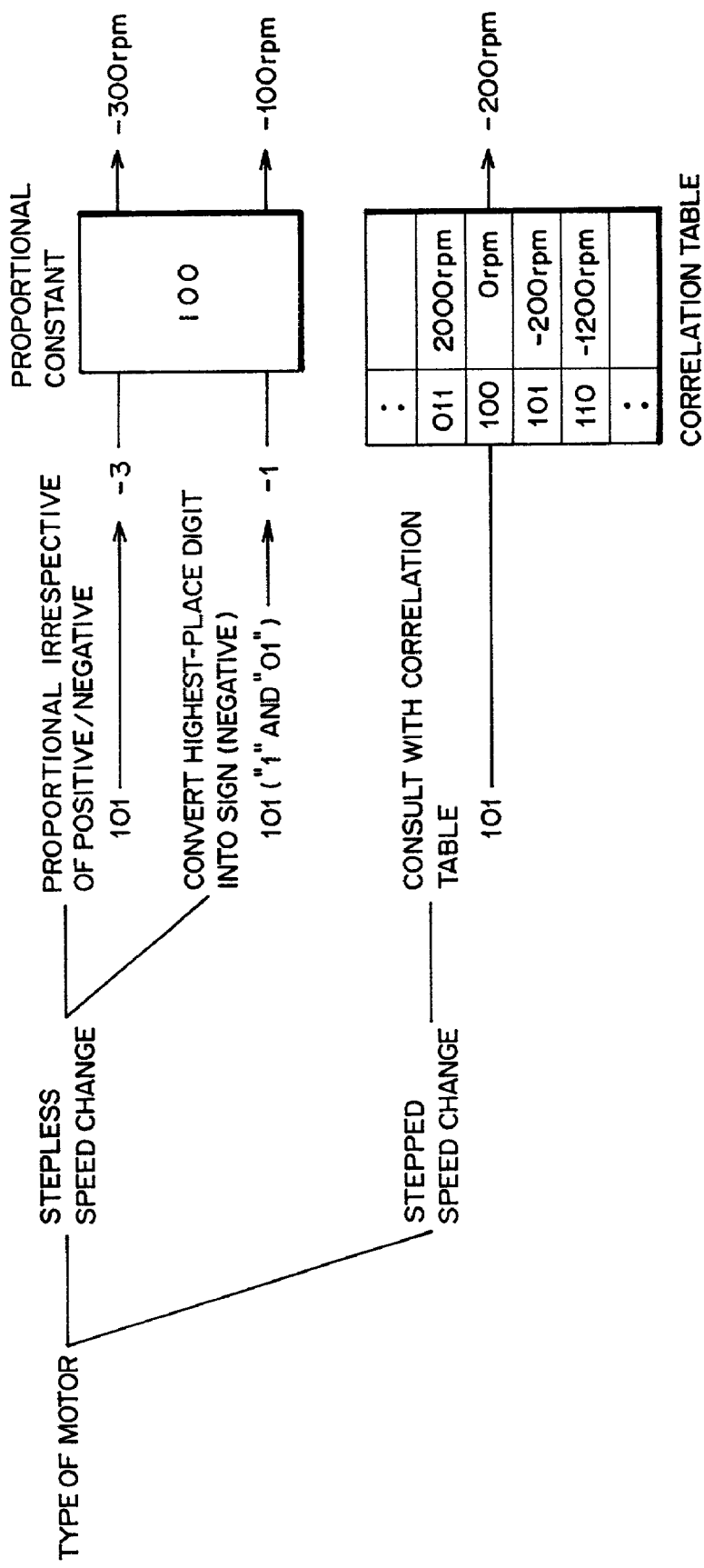
FIG. 26 is a diagram illustrating various kinds of motors.

FIG. 26 is a diagram illustrating various kinds of motors.

As shown in FIG. 26, in the present embodiment, two methods, i.e. "stepless speed change" and "stepwise speed change", are prepared to define a motor. "Stepless speed change" is a method of defining a proportional constant between a speed instruction value and a target speed. For the stepless speed change method, two more methods, i.e. a method of taking "proportion irrespective of positive/negative" and a method of regarding the "highest-position bit of a binary number as a sign", are prepared. In the former method, if a proportional constant is 100, a binary number 101 (−3 in decimal notation) is converted into −300 rpm (minus signal indicates rotation in reverse direction). And in the latter method, if a binary number 101, for example, is divided into two parts, i.e. the highest-position bit '1' and the remaining bits '01'. And the highest-position bit '1' is assumed as a minus sign ('0' is a plus sign) while the remaining string of bits '01' is assumed a numerical value (1 in decimal notation), and −1, which is the result of combination of the minus sign and the numerical value, is multiplied by a proportional constant 100 to obtain a converted value −100 (rpm).

For "stepwise speed change", a correlation table of speed instruction values and target speeds is defined. As such in the correlation table of FIG. 26, −200 rpm is defined for 101 in binary notation; if 101 in binary notation is input as a speed instruction value, −200 rpm is output as a target speed with referring to the correlation table. The correlation table may be an alternative form described later in connection with FIG. 75.

According to the present embodiment, since the above-mentioned various kinds of defining methods are prepared, it is possible to improve the degree of freedom in defining a motor.

Figure 27:
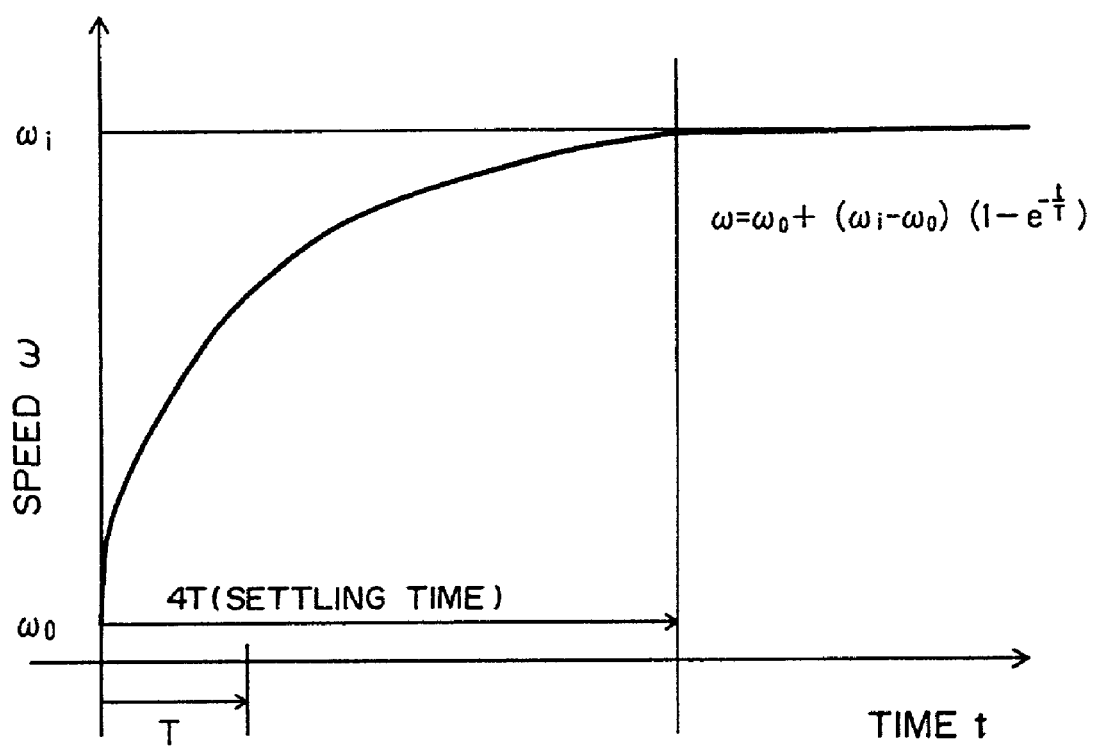
FIG. 27 is a graph showing an initial change of rotation rate of a motor when the motor is regarded as a primary delay system.

FIG. 27 is a graph showing an initial change of rotation rate $\omega$ of a motor when the motor is regarded as a primary delay system.

As the change in rotation rate of a motor is treated as a primary delay system of FIG. 27, simulation is performed with taking consideration of a delay due to the load of the motor and influence of the delay. If the motor is treated as a primary delay system, the user can designate a characteristic of the motor by only inputting a settling time 4T, thereby minimizing the labor for inputting.

Assuming that the motor is treated as a primary delay system, an extent of rotation $\Delta\theta$ of the motor in the simulation distance Ts is calculated by the following equation (1). The simulation distance Ts is represented by $\Delta t$.

The motor speed $\omega$ at time t is expressed by the following equation (1).

$$\omega = \omega_o + (\omega_i - \omega_o)\left(1 - e^{-\frac{t}{T}}\right) \tag{1}$$

where $\omega_i$ is the target speed, $\omega_o$ is the motor speed before instructing the target speed, and T is a constant proportional to the settling time 4T indicating a characteristic of the motor.

Assuming that the motor speed $\omega$ at the time t as expressed by the above equation (1) is $\omega_{k-1}$, a motor speed $\omega_k$ at the time t+$\Delta t$, i.e. at a time later than the time t by $\Delta t$ will be as expressed by the follow equation (2).

$$\omega_k = \omega_o + (\omega_i - \omega_o)\left(1 - e^{-\frac{t+\Delta t}{T}}\right) \tag{2}$$

These equations (1) and (2) yield the following equation (3).

$$\omega_k = \omega_{k-1} + (\omega_i - \omega_{k-1})\left(1 - e^{-\frac{\Delta t}{T}}\right) \tag{3}$$

The amount Δθ the motor rotates for Δt is expressed by the following equation (4) as the above equation (3) is integrated with respect to Δt.

$$\Delta\theta = \int_0^{\Delta t}\left[\omega_{k-1} + (\omega_i - \omega_{k-1})\left(1 - e^{-\frac{t}{T}}\right)\right]dt \qquad (4)$$

$$= \omega_{k-1}\Delta t + (\omega_i - \omega_{k-1})\left\{\Delta t - T\left(1 - e^{-\frac{\Delta t}{T}}\right)\right\}$$

Assuming the motor is treated as a primary delay system, the rotation amount Δθ of the motor for a period of simulation time Δt can be obtained by the target speed $\omega_i$, the simulation time Δt, the motor speed $\omega_{k-1}$, and the settling time 4T according to the above equation (4).

The motor should by no means to operate normally as expressed by the equation (4), and as an alternative, the speed may be fixed to $\omega_i$ with lapse of a settling time 4T after the target speed $\omega_i$ to be instructed to the motor has varied.

Figure 28:
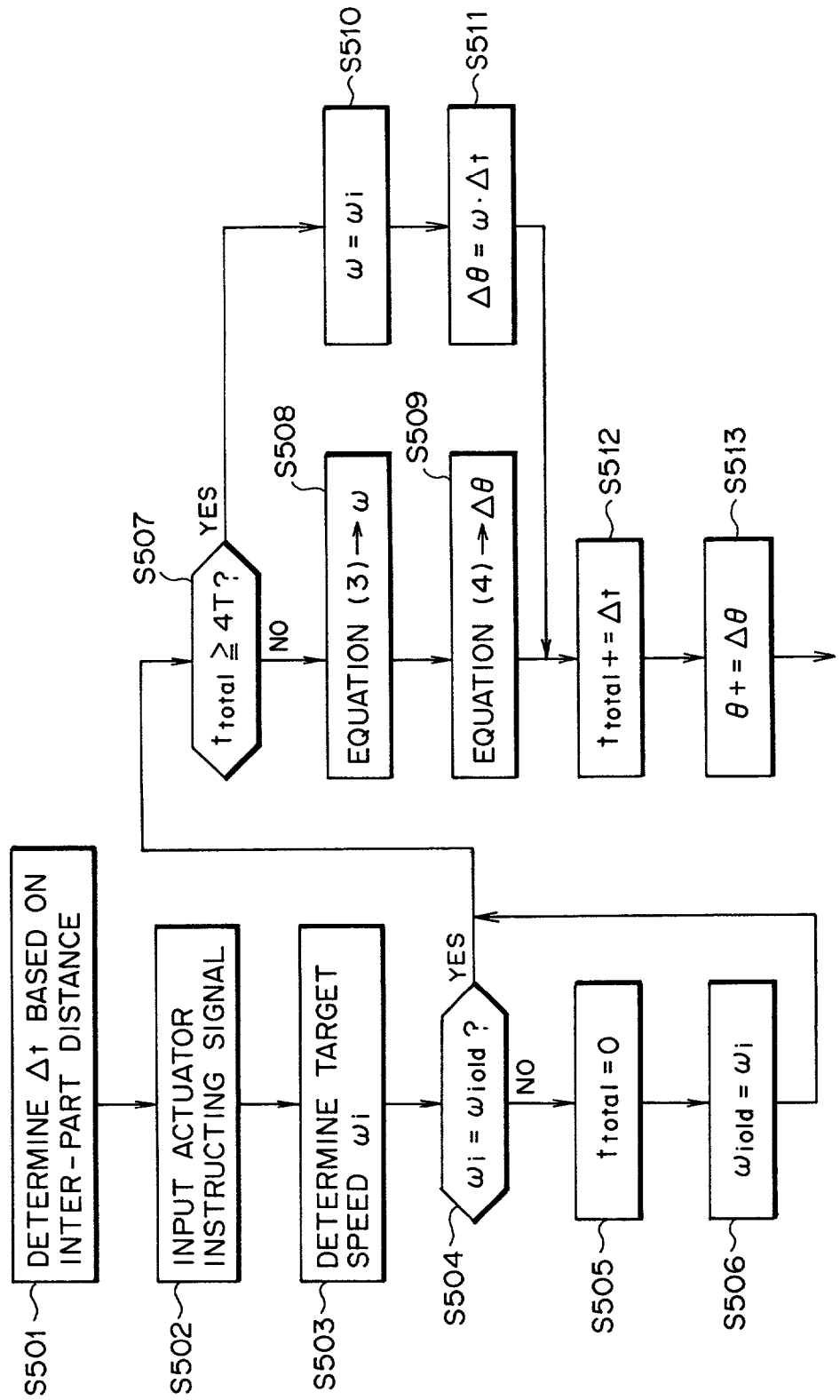
FIG. 28 is a flow diagram illustrating a motor driving process, with a primary delay considered, in the three-dimensional real-time simulator of the first embodiment.

FIG. 28 is a flow diagram illustrating a motor driving process, with a primary delay considered, in the 3D model simulator 30 of the first embodiment.

As shown in FIG. 28, when the simulation distance Δt (=Ts) is determined based on the inter-part distance (step S501) and the actuator instructing signal is input from the embedded software developing section 40 (step S502), the target speed $\omega_i$ is determined with reference to the correlation table or the proportional constant according to the definition of the motor of FIG. 26 (step S503)

At step S504, it is discriminated whether or not the target speed $\omega_i$ has varied (whether or not $\omega_i = \omega_{iold}$). If the current target speed coi has varied (NO route; $\omega_i \neq \omega_{iold}$), the procedure goes to step S505 so that $t_{total}$ indicating a lapse of time from the time point when the target speed $\omega_i$ has varied is initialized to zero. Then, for the next judgment at step S504, $\omega_i$ is stored to update $\omega_{iold}$ (step S506), and then the procedure shifts to step S507.

If $\omega_i = \omega_{iold}$ as the result of discrimination (YES route), the procedure skips over steps S505 and S506 and goes directly to step 507 to discriminate whether or not the lapse of time $t_{total}$ from the time point when the target speed $\omega_i$ has varied reaches the settling time 4T. If $t_{total}$ does not reach 4T (NO route), the procedure goes to step S508 to obtain the rotation speed ω of the motor in accordance with the equation (3), and then forward to step S509 to obtain the rotation amount Δθ of the motor in accordance with the equation (4).

Otherwise if $t_{total} \geq 4T$ as the result of discrimination (YES route), the procedure goes to step S510 to set the rotation speed ω of the motor to a value equal to the target speed$\omega_i$, and then forward to step 511 to set the rotation amount Δθ of the motor for a period of simulation time Δt can be obtained by the target speed $\omega_i$.

Even if the procedure skips over steps S508, S509 or steps S510, S511, ttotal increases by Δt subsequently at step S512 and then the total rotation amount θ increases by Δθ at step S513.

As the processes of FIG. 28 are repeatedly executed taking synchronization with the embedded software developing section 40, the motor rotates in a varying speed as treated as the primary delay system of FIG. 27.

FIGS. 29, 30 and 31A through 31C are diagrams illustrating how to define a sensor using an interference check.

Figure 29:
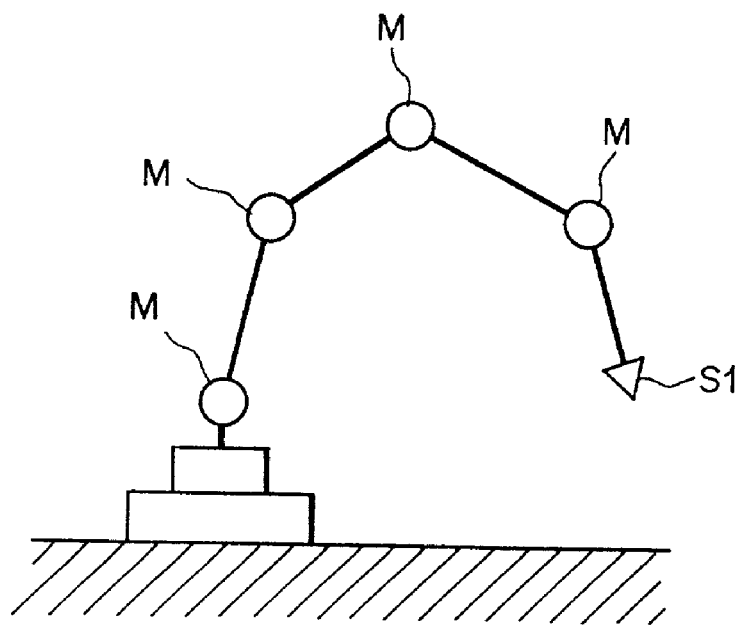
FIG. 29 is a diagram illustrating how to define a sensor using an interference check.

FIG. 29 shows an example in which the posture of a contact sensor S1 is determined by a combination of postures of plural motors M. In this illustrative example, if adopted the method described above in connection with FIGS. 24A, 24B, 25A and 25B, the on/off status of a sensor S1 would be defined by the combination of the respective postures of plural motors M, which would require a much more complicated definition. Consequently, in the example of FIG. 29, an interference check is made between the sensor S1 and the base; the sensor S1 assumes the on status or the off status, depending on presence/absence of interference between the sensor S1 and the base. With this arrangement, it is possible to determine the on/off status of the sensor S1 without requesting the user for any complicated definition.

Figure 30:
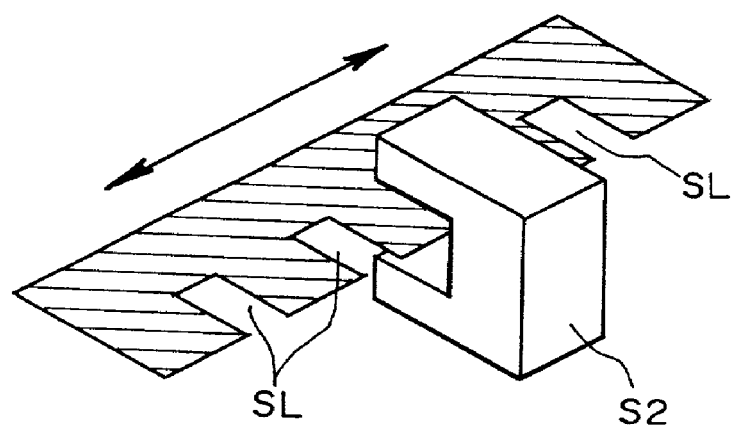
FIG. 30 is a perspective diagram illustrating how to define a sensor using an interference check.
Figure 31A:
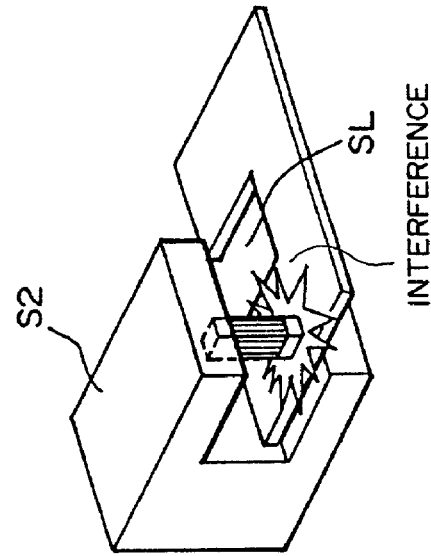
FIGS. 31A through 31C are perspective diagrams illustrating how to define a sensor using an interference check.
Figure 31B:
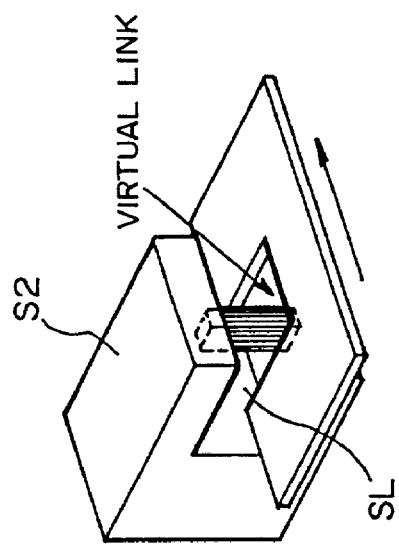
Figure 31C:
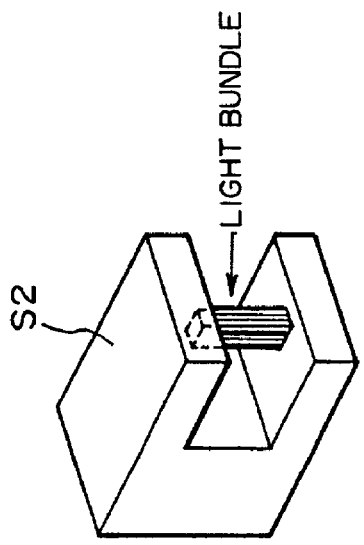

FIG. 30 shows another example in which a photoelectric sensor (phototube) S2 repeatedly assumes the on and off status as a slit SL is moved. In this illustrative example, treating an optical bundle of FIGS. 31A through 31C as a single virtual link, the on/off status of the sensor S2 is discriminated, depending on presence/absence of interference between the virtual link and the slit SL.

In checking interference between the virtual link and a companion link, such companion link may be limited if is in advance known as shown in FIG. 30. Otherwise if it is unknown, a companion link to be checked in interference is excluded since a link representing the original sensor itself is normally in interference (engagement) with the virtual link.

The sensor output determining method using the virtual link should by no means be limited to the photoelectric sensor, and may be alternatively applied to a contact-type position detecting sensor in which a contact of a micro switch, for example, is defined as a virtual link.

The sensor defining method described above in connection with FIGS. 24A, 24B, 25A and 25B is particularly effective in expressing a sensor which detects a change in single-degree freedom. Such sensor is a sensor which detects an angle of a potentiometer, encoder or the like. However, if adopted the definition method in a sensor in which the posture is determined as the result of combination of a multi-degree freedom, e.g. the above-mentioned sensor (FIG. 29), which is located so as to determine the output by the combination of the postures of plural motors, or another sensor which frequently assumes on/off statuses, e.g. the above-mentioned slit counter (FIG. 30), it would request the user for a complicated definition. Consequently it is preferable to adopt the illustrated method which can discriminate the on/off status of the sensor in terms of presence/absence of interference between the companion links.

Figure 32:
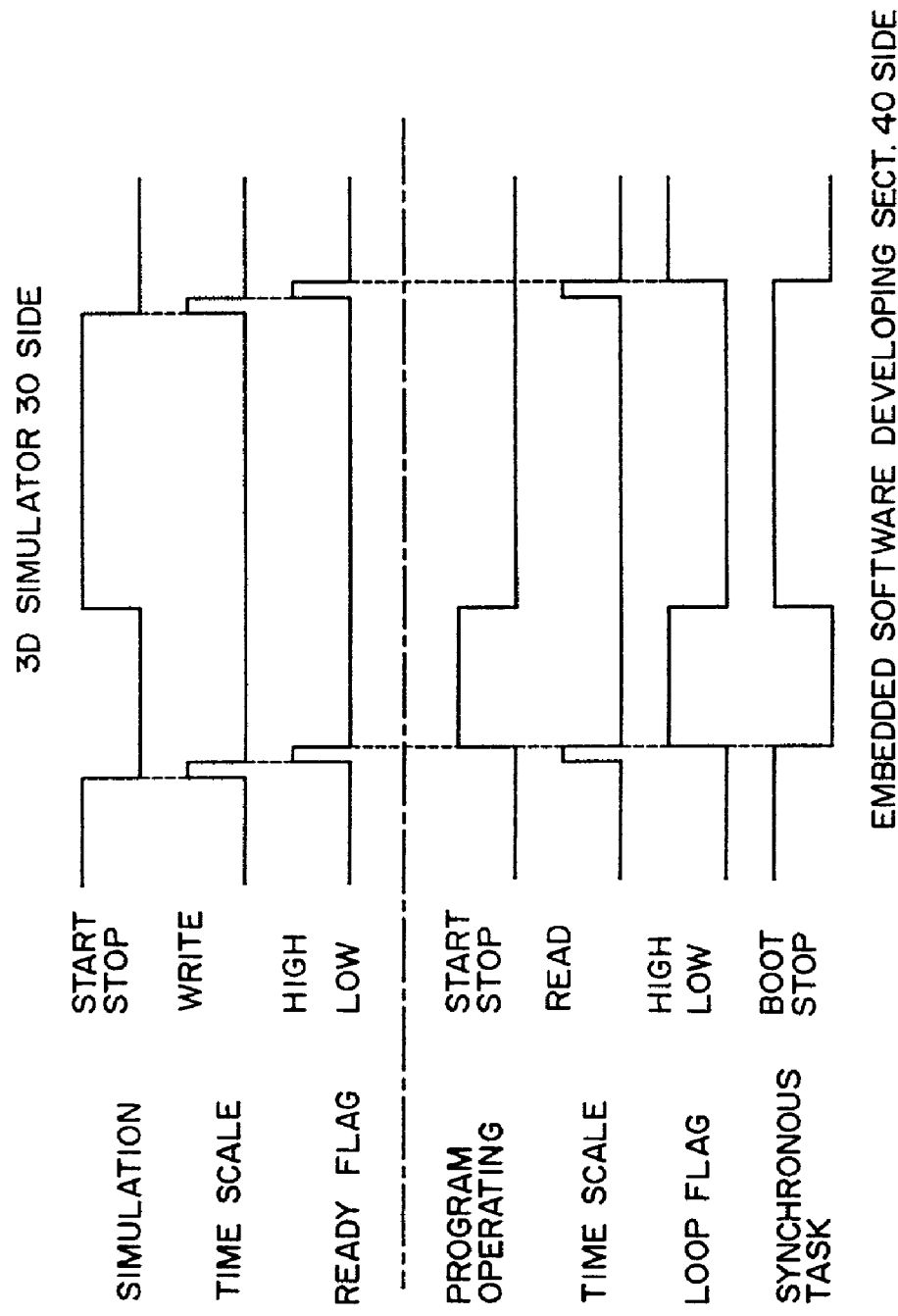
FIG. 32 is a timing diagram illustrating various signals to be transferred between the three-dimensional real-time simulator and the embedded software developing section to establish synchronization in the first embodiment.
Figure 33:
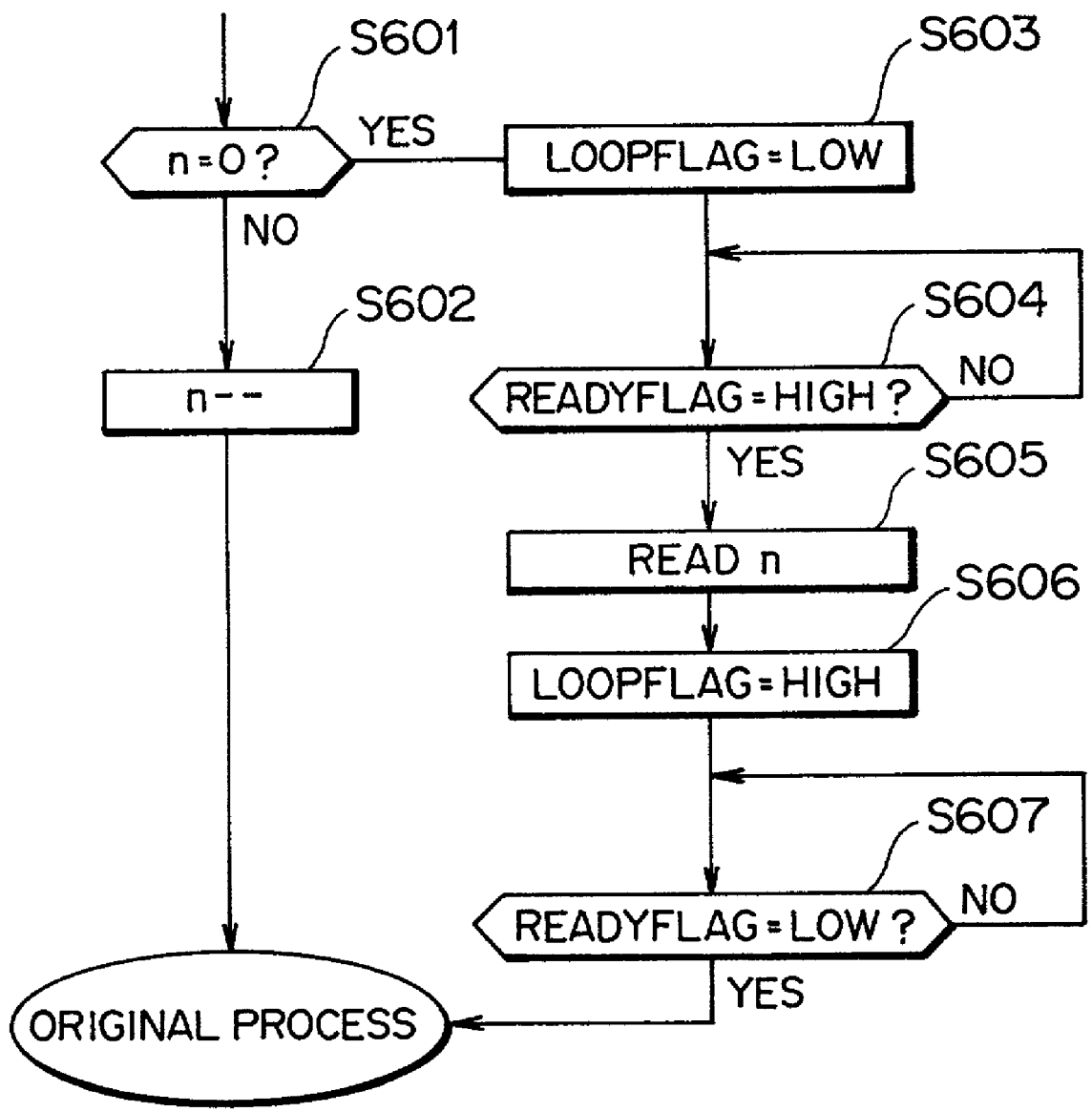
FIG. 33 is a flow diagram illustrating how to establish synchronization in operation between the three-dimensional real-time simulator and the embedded software developing section.
Figure 34:
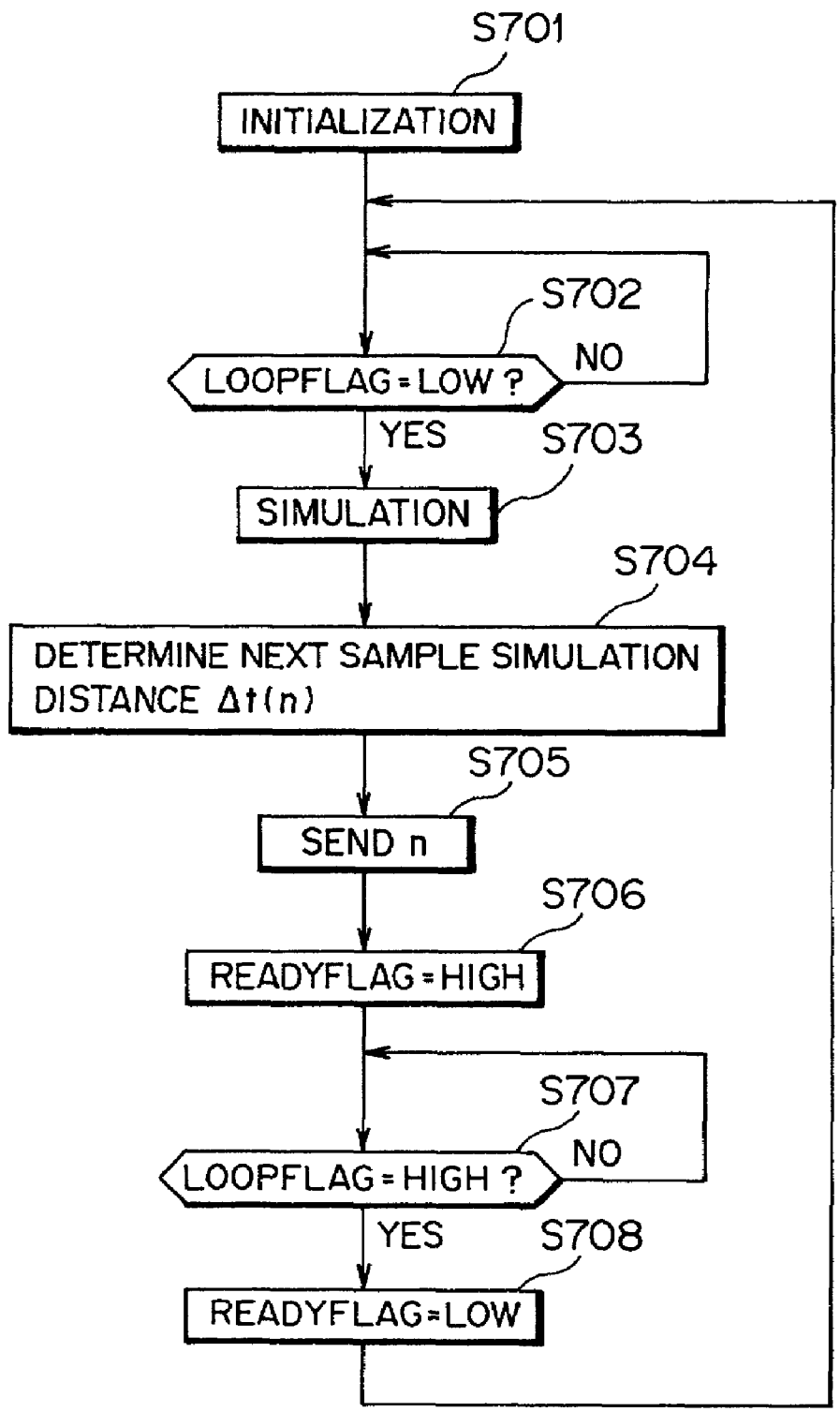
FIG. 34 is a flow diagram illustrating the processing of the three-dimensional real-time simulator to realize synchronization in operation between the three-dimensional real-time simulator and the embedded software developing section.

FIG. 32 is a timing diagram illustrating various signals to be transferred between the 3D model simulator 30 and the embedded software developing section 40 to establish synchronization in the first embodiment, FIG. 33 is a flow diagram illustrating how to establish synchronization in operation between the 3D model simulator 30 and the embedded software developing section 40, and FIG. 34 is a flow diagram illustrating the processing of the 3D model simulator 30 to realize synchronization in operation between the 3D model simulator 30 and the embedded software developing section 40. A program for realizing the synchronization method described later in connection with FIG. 33 is incorporated in the second interface program 315 for realizing the second interface sections 51, 52.

A Loop Flag, a Ready Flag and a Time Scale, all of which are shown in FIG. 32, are signals respectively having the following meanings:

(1) Loop Flag:

A signal to be transferred from the embedded software developing section 40 and the 3D model simulator 30, indicating whether or not the embedded software developing section 40 is currently in operation.

(2) Ready Flag:

A signal to be transferred from the 3D model simulator 30 to the embedded software developing section 40, indicating that simulation for a single simulation distance $\Delta t$ (=Ts) on the 3D model simulator 30 has completed.

(3) Time Scale:

A signal to be transferred from the 3D model simulator 30 to the embedded software developing section 40, representing the simulation distance $\Delta t$ (=Ts) which is determined based on the shortest inter-part distance by the 3D model simulator 30.

In the present embodiment, as a Time Scale to designate a simulation distance $\Delta t$ (=Ts), a frequency n (natural number) of passing the process routine of FIG. 33 in the period of the simulation distance $\Delta t$ (=Ts) is used, without using a specific time, such as 5 msec or 2 sec.

As shown in FIG. 32, it is discriminated whether or not n=0 at step S60. If not n=0 (NO route), the procedure goes to step S602 to decrease n by 1, shifting to execution of the original process (the transition diagram or table creating program 320 and the control program). Only when n=0 as the result of discrimination at step S61 (YES route) Loop Flag is set to 'Low' to start a synchronous task (step S603), whereupon the processes of steps S604 through S607 are executed.

For explaining FIGS. 32 through 34, assume that simulation is currently performed on the 3D model simulator 30; on the embedded software developing section 40, therefore, with Ready Flag in 'Low' level, the procedure stays at step S604 of FIG. 33 to stand by until Ready Flag is changed to 'High'. At that time, in the routine of FIG. 34 indicating the synchronization in the 3D model simulator 30, it is in the middle of simulation of step S703.

On the 3D model simulator 30, after initialization is performed (step S701), the procedure goes to step S702 to stand by until Loop Flag is changed to 'Low'. When Loop Flag is changed to 'Low' by the process of step S603 described above in connection with FIG. 32, the procedure goes to step S703 where simulation for the simulation distance $\Delta t$ takes place.

Upon completion of the simulation, the 3D model simulator 30 shifts the procedure to step S704 of FIG. 34 where the next simulation distance (Time Scale) $\Delta t$ is determined by the above-mentioned frequency n. And at step S705, this Time Scale $\Delta t$ (n) is transmitted to the embedded software developing section 40. The procedure goes further to step S706 where Ready Flag is changed to 'High' level.

In response to this, on the embedded software developing section 40, the procedure escapes from step S604 of FIG. 33 (YES route) and goes to step S605 where Time Scale n is read in. The procedure goes further to step S606 where Loop flag is changed to 'High' to stop the synchronous task. Subsequently at step S607, the procedure goes forward to the original process after Ready flag being sent from the 3D model simulator 30 is changed to 'Low'.

In the embedded software developing section 40, the transition diagram or table creating program 320 and the control program are repeatedly executed at a constant cycle. As mentioned above, at step S601, it is discriminated whether or not n=0; if n≠0 (NO route), the procedure goes to step S602 where n is decreased by 1. If n=0 as the result of discrimination at step s601 (YES route) as this routine is repeated, the procedure goes to step S603 where Loop Flag is changed to 'Low' to start the synchronous task. Subsequently at step S604, the procedure stands by until Ready Flag being transmitted from the 3D model simulator 30 is changed to 'High'.

In the meantime, on the 3D model simulator 30, after Ready Flag has been changed to 'High' at step S706 of FIG. 34, the procedure goes to step S707 to stand by until Loop Flag being transmitted from the embedded software developing section 40 is changed to 'High'. In response to the fact that Loop Flag has been changed to 'High' by the process of step S606 described above in connection with FIG. 32, the procedure goes to step S708 to change Ready Flag to 'Low', and then forward to step S702 to stand by until Loop flag is changed to 'Low'. If Loop Flag has been changed to 'Low' as mentioned above, the procedure goes to step S703 where simulation for the simulation distance $\Delta t$ takes place.

As the foregoing processes are repeated, the individual processes are executed by a multi-task while mutual synchronization is established between the 3D model simulator 30 and the embedded software developing section 40 (the transition diagram or table creating program 320 and the control program).

How to evaluate the possibility of mutual interference between the individual links (parts) will now be described.

Figure 35B:
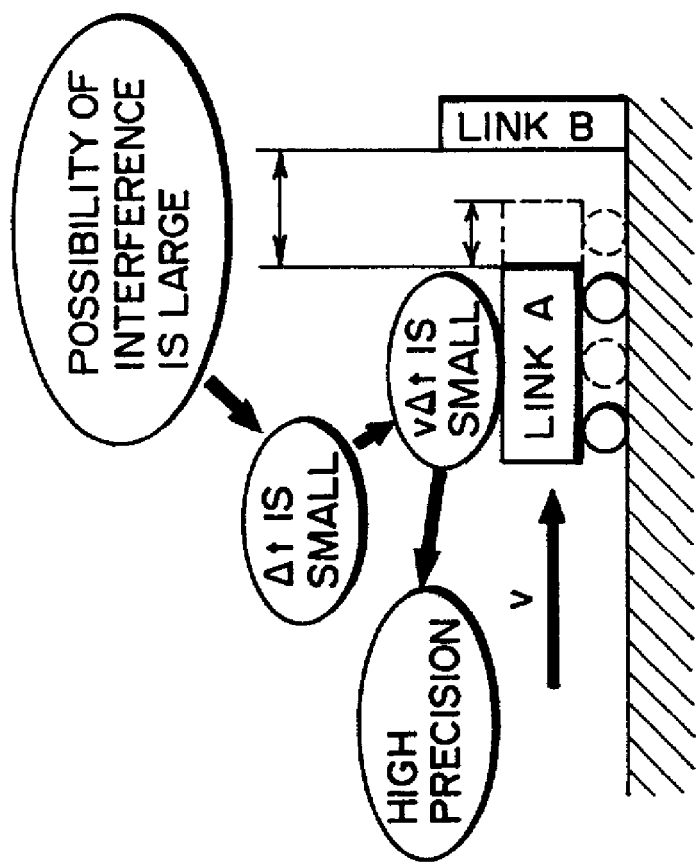
FIGS. 35A and 35B are diagrams illustrating how to evaluate the possibility of interference in the first embodiment.
Figure 35A:
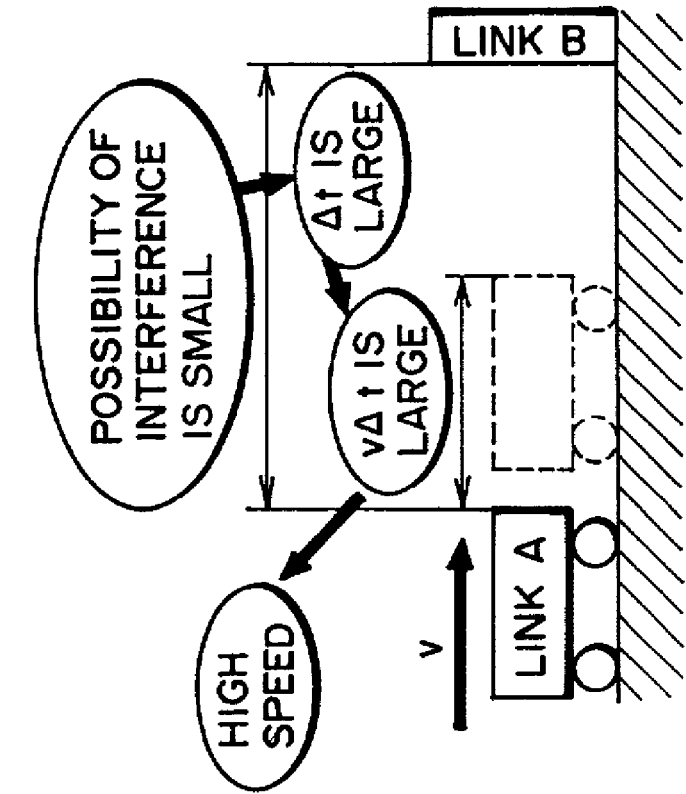

FIGS. 35A and 35B are diagrams illustrating how to evaluate the possibility of interference. In this example, a link A is moving toward a link B at a velocity v.

FIG. 35A shows two links (the link A and the link B), which can interfere with each other, as being spaced far from each other. In this case, it is judged that the possibility of interference is small, so a relatively large value is set as the simulation distance $\Delta t$ to increase the distance v$\Delta t$, i.e. a unit distance by which the link A moves in every simulation. This guarantees high-speed simulation.

FIG. 35B shows the link A and the link B being spaced only a small distance from each other. In this case, it is judged that the possibility of interference is large, so a relatively small value is set as the simulation distance $\Delta t$ to decrease the distance v$\Delta t$, i.e. a unit distance by which the link A moves in every simulation. This guarantees high-precision simulation.

Thus in the present embodiment, as the simulation distance $\Delta t$ is changed in accordance with the distance between the individual parts, an inconsistency and harmony of high-precision simulation and high-speed simulation can be achieved.

Figure 36C:
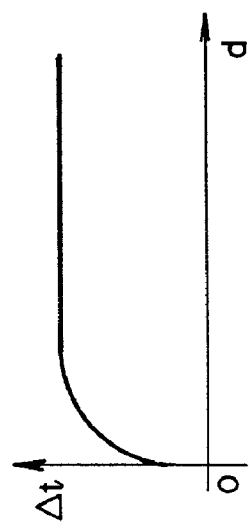
FIGS. 36A through 36C are graphs showing various kinds of relationships between the inter-part distance and the simulation distance.
Figure 36B:
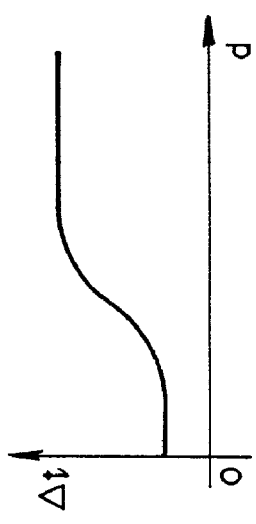
Figure 36A:
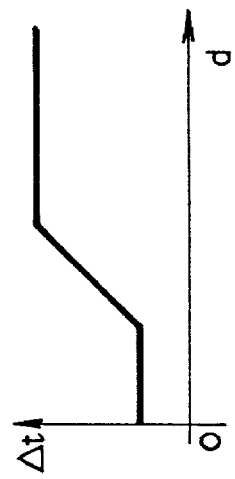

FIGS. 36A through 36C are graphs showing various kinds of relationships between the inter-part distance d and the simulation distance $\Delta t$.

In any one of the graphs of FIGS. 36A through 36C, the simulation distance $\Delta t$ is determined with respect to the inter-part distance d in such a manner that the simulation will not be reduced to a very lower rate even if the distance d is small and increased to a very higher rate even if the distance d is large.

How to divide various parts into groups for evaluation of the possibility of interference will now be described with reference to FIGS. 37A and 37B.

Figure 37A:
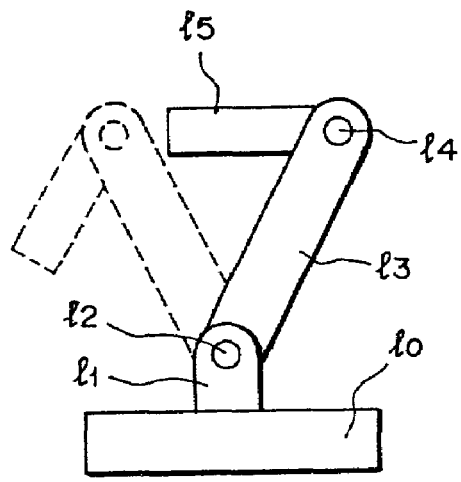
FIGS. 37A and 37B are diagrams illustrating how to divide parts into groups.
Figure 37B:
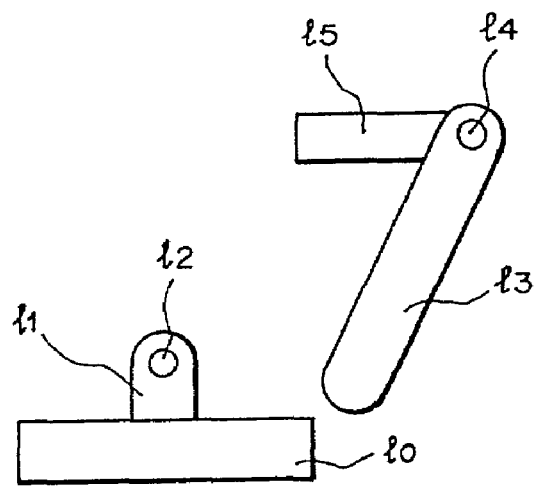

In FIGS. 37A and 37B, 6 links $l_0$ through $l_5$ are shown, a link $l_3$, which is defined as a motor link and moves, is considered.

In this case, the links to be influenced in posture due to the movement of the motor link $l_3$ are links $l_3$ through $l_5$, which can be regarded as a single rigid body with respect to the movement of the motor link $l_3$.

The links $l_0$ through $l_2$, which are not influenced in posture due to the movement of the motor link $l_3$, can be regarded as another single rigid body.

To this end, for moving the motor link $l_3$, as shown in FIG. 37B, the remaining links are divided into two groups, one group of links whose postures are influenced by moving the motor link $l_3$ and the other group of links whose postures are free of such influence, and such two groups are treated each as a single rigid body, whereupon the shortest distance between these two rigid bodies is obtained as a candidate to determine the next simulation distance Δt.

However, the link $l_3$ and the link $l_2$ (e.g., a shaft of the motor and a gear) in FIGS. 37A and 37B are separately incorporated in different groups, though they are normally in contact with each other; this is, the above-mentioned two rigid bodies virtually interfere with each other.

Consequently, in the present embodiment, after the links are divided into two groups, the distance between the parts are obtained. And among the links already in engagement or interference with one another, at least one link (i.e., the link $l_2$ in the example of FIGS. 37A and 37B) belonging to one group whose individual links do not move when a currently noteworthy motor link is moved is excluded from that group, whereupon the two groups are individually treated as rigid bodies and then a distance between these two rigid bodies.

FIGS. 38A through 38D are diagrams illustrating how to divide parts into groups (grouping) with a plurality of motor links defined in a single three-dimensional-mechanism model.

Figure 38A:
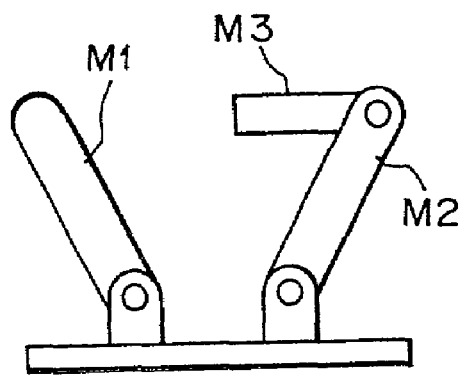
FIGS. 38A through 38D are diagrams illustrating how to divide parts into groups (grouping) with a plurality of motor links defined in a single three-dimensional-mechanism model.
Figure 38B:
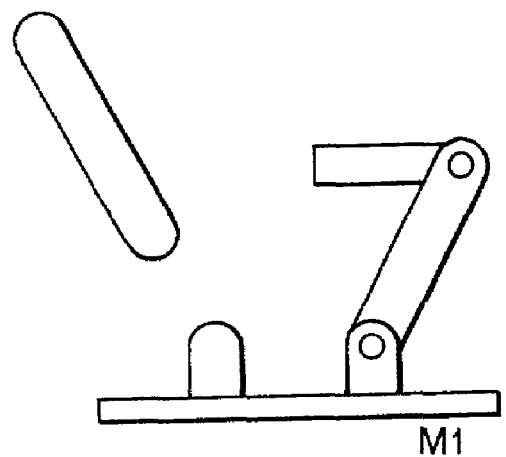
Figure 38C:
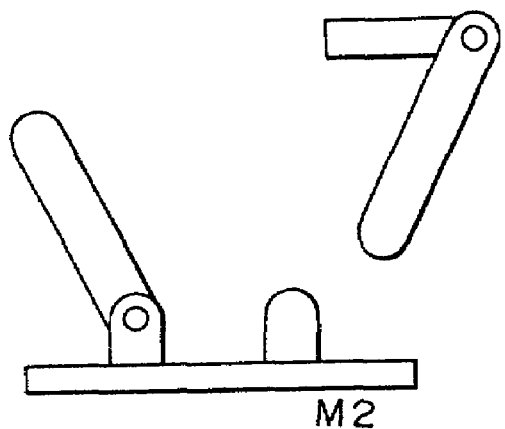

FIG. 38A shows a 3D model in which three motor links of motors M1 through M3 are defined.

Figure 38D:
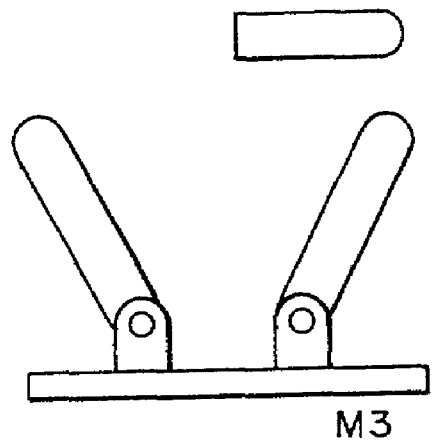

At that time, the three motor links are divided into groups, as described above in connection with FIGS. 37A and 37B, for every time when only the motor M1 is moved (FIG. 38B), when only the motor M2 is moved (FIG. 38C), and when only the motor M3 is moved (FIG. 38D).

During execution of the simulation, if an object motor link is moved, the shortest distance between the groups of the motor links is obtained, whereupon from plural candidate shortest distances obtained when the plural motor links are moved, the shortest distance is obtained (steps S201 through S207 in FIG. 21).

Figure 39:
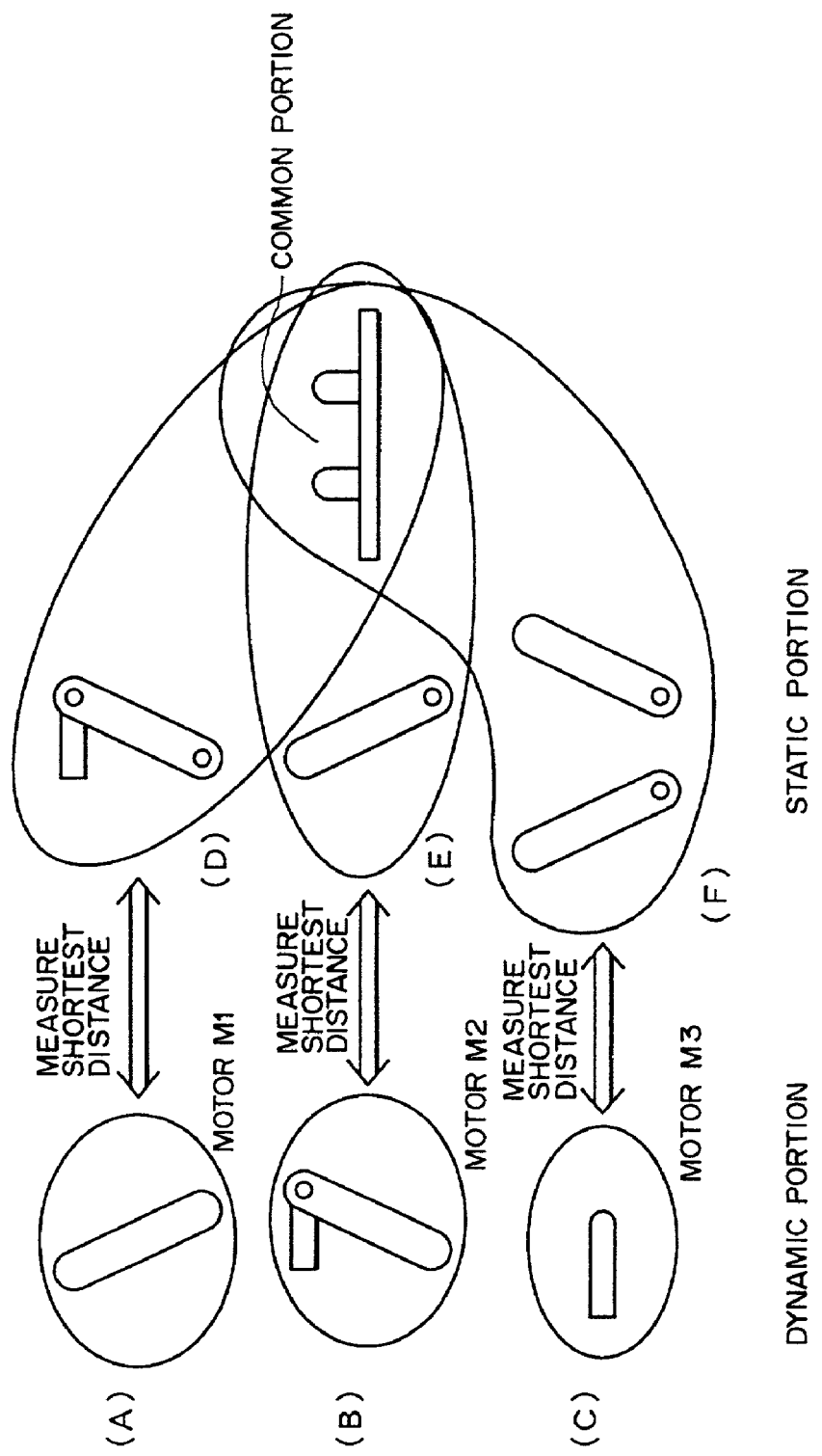
FIG. 39 is a diagram illustrating how to divide the grouped parts into new groups (regrouping)

FIG. 39 is a diagram illustrating how to divide the grouped parts into new groups (regrouping).

According to the method described above in connection with FIGS. 38A through 38D, for each motor link, substantially all of the parts constituting the 3D model would belong to either group (rigid body). As the result, the amount of data to define the individual rigid body would be huge, which would often require a very large memory capacity.

Consequently, as shown in FIG. 39, among a set of parts belonging to the group (the group (D), (E) or (F) in FIG. 39) in which the individual parts do not move when each motor link is moved, a common portion is extracted as a single rigid body, and each group (D), (E) or (F) excluded the common portion is treated as a single rigid body. And during the measuring of the distance, a rigid body of the common portion itself and a rigid body devoid of the common portion may be combined, and a distance from the companion group (i.e., the group (A), (B) or (C) corresponding to the group (D), (E) or (F)) maybe obtained. According to this alternative example, since data to define these individual groups is previously stored, it is possible to reduce the memory capacity as compared to the above-mentioned example (FIGS. 38A through 38D) in which a common portion is incorporated in each and every group.

Figure 40:
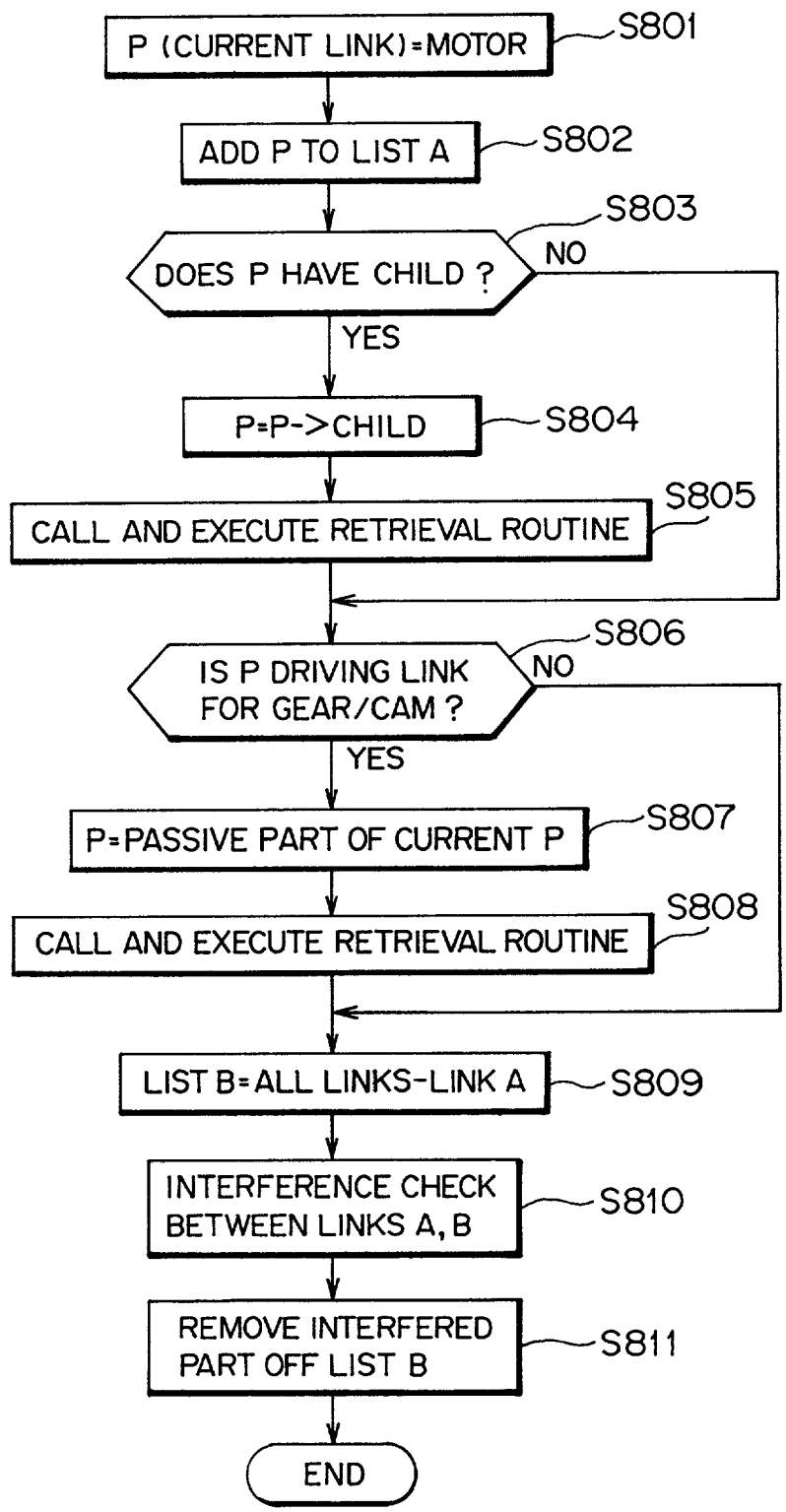
FIG. 40 is a flow diagram illustrating a routine of dividing a plurality of links into a group of those affected in posture by a movement of the motor link and a group of those free of being affected in posture by a movement of the motor link.
Figure 41:
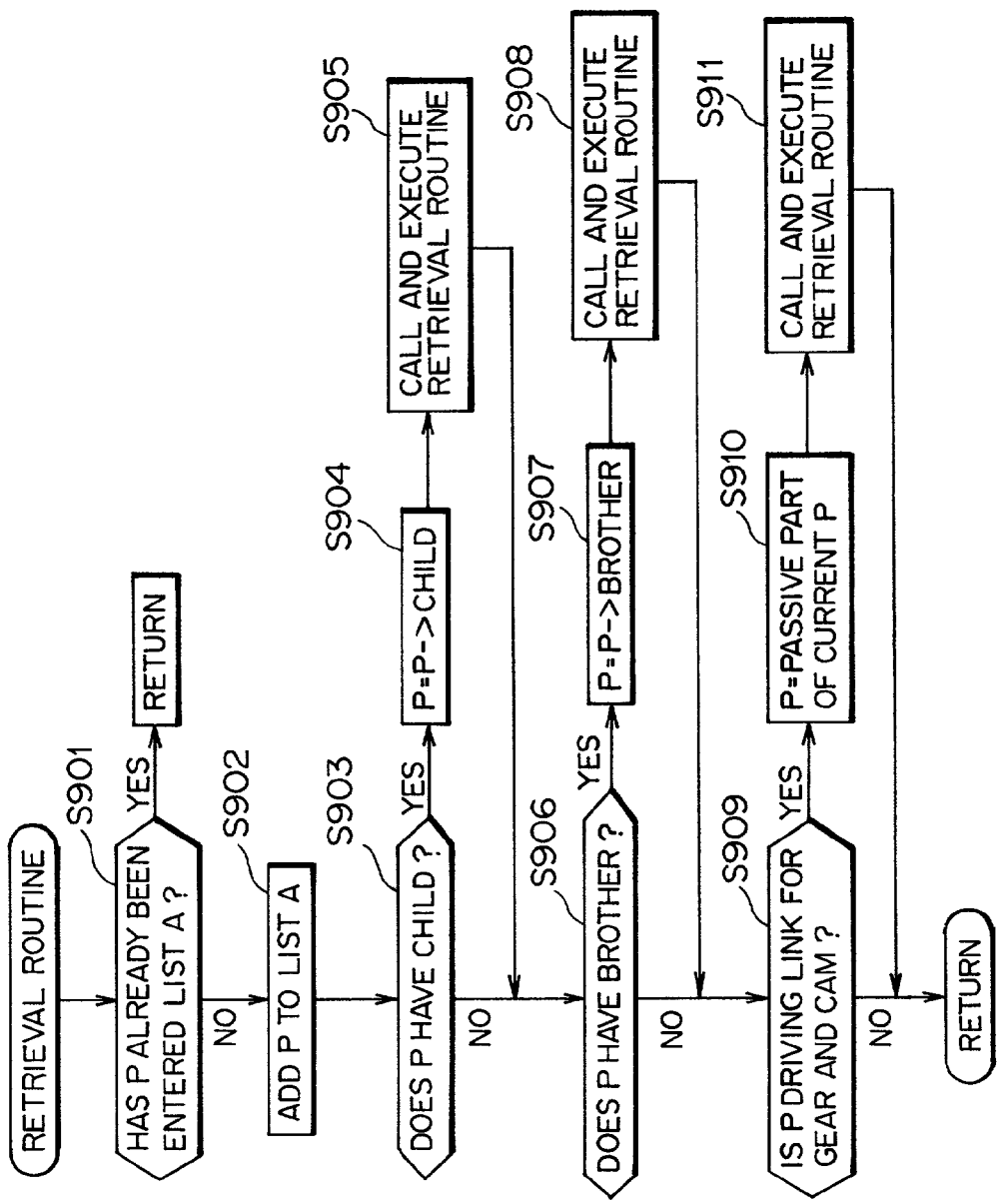
FIG. 41 is a flow diagram illustrating a routine of retrieval of FIG. 40.

FIG. 40 is a flow diagram (steps S801 through S811) illustrating a routine of dividing a plurality of links into a group of those affected in posture by a movement of the motor link and a group of those free of being affected in posture by a movement of the motor link, and FIG. 41 is a flow diagram (steps S901 through S911) illustrating a routine of retrieval of FIG. 40.

In this example, some links whose postures are influenced by the movement of a motor link are entered in a list A, while the other links are entered in a list B. These lists a and B are blanked out before executing the flow of processes being described here.

As shown in FIG. 40, firstly a motor link (current link) is designated by a pointer P (step S801), and then the pointed motor link is added to the list A (step S802).

Then it is discriminated whether or not any child link exists with the individual link designated by the pointer P (step S803).

When the pointer P designates the motor link $l_3$ in the link mechanism of FIGS. 37A and 37B, the term "a child" means one of the links (link $l_4$ here) which move together with the motor link $l_3$ in response to movement of the motor link $l_3$. In this example, even if the link $l_4$ is a motor link, the currently noteworthy motor link is the link $l_3$ and hence the link $l_4$ is regarded as a child of the link $l_3$. Even though a plurality of children identical in rank with the link designated by the pointer P could be considered, only one of the identical children is limited as being called "child", and in the meantime the remaining children are defined as "brothers" of such a single limited child.

If the link designated by the pointer P has a child (YES route of step S803), the procedure goes to step S804 where the pointer P is shifted so as to designate the child link so that a later-described retrieval routine of FIG. 41 is called (step S805). Upon completion of execution of the retrieval routine at step S805, the procedure goes to step S806. Otherwise, at step S803, if it is judged that the link designated by the pointer P has no child (NO route), the procedure goes forward directly to step S806, skipping steps S804 and S805.

At step S806, it is discriminated whether or not the link designated by the pointer P is a driving link for driving driven (passive) parts, such as gears and a cam.

If the link designated by the pointer P is the driving link (YES route), the procedure goes to step S807 where the pointer P is shifted so as to designate a driven link (passive part) that is to be driven by the link designated by the pointer P so that the retrieval routine of FIG. 41 is called at step S808. Upon completion of execution of the retrieval routine at step S808, the procedure goes to step 809. Otherwise, at step S806, it is judged that the link designated by the pointer P is not the driving link for the driven (passive) parts (NO route), the procedure goes forward directly to step S809, skipping steps S807 and S808.

At the time the procedure has went forward to step S809, the list A has already completed, and all the links except those included in the list A are stored in the list B.

Then an interference check is made between all the links included in the list A and all the links included in the list B (step S810), whereupon from a set of companion links interfering each other, one companion link included in the list B is removed from the list B (step S811).

In the retrieval routine of FIG. 41, firstly at step S901, it is discriminated whether or not the link designated by the pointer P has already been included in the list A. If it has already been included in the list A (YES route), the procedure returns directly to the original routine, in which the retrieval routine was called, skipping the retrieval routine. Otherwise, at step S901, if it is judged that the link designated by the pointer P has not been included in the list A (NO route) the procedure gores to step S902 where the link designated by the pointer P is added to the list A.

At step S903, it is discriminated whether or not the link designated by the pointer P has a child. If the link designated by the pointer P has a child (YES route), the procedure goes to step S904 where the pointer P is shifted so as to designate the child link, and then forward to step S905 wherein the retrieval routine of FIG. 41 is called again. In this manner, this retrieval routine is often repeatedly called; upon completion of execution of the retrieval routine, the procedure returns to the step (e.g., step S905 when called at step S905) in which the retrieval routine has been called. Upon completion of execution of the retrieval routine at step S905, the procedure goes to step S906. Otherwise, at step S903, if the link designated by the pointer P has no child as the result of discrimination (NO route), the procedure goes forward directly to step S906, skipping steps S904 and S905.

At step S906, it is discriminated whether or not the link designated by the pointer P has brother(s). If the designated link has brother(s) (YES route), the procedure goes to step S907 where the pointer P is shifted so as to designate the brother link(s), and then forward to step S908 where the retrieval routine is called again. Upon completion of execution of the retrieval routine, the procedure goes to step S909. Otherwise, at step S906, if the designated link has no brother as the result of discrimination (NO route), the procedure goes forward directly to step S909.

At step S909, it is discriminated whether or not the link designated by the pointer P is a driving link for driving the driven (passive) parts, such as gears and a cam. If the designated link is a driving link as the result of discrimination (YES route), the procedure goes to step S910 where the pointer P is shifted so as to designate the driving link, and then forward to step S911 where the retrieval routine is called again. Upon completion of execution of the retrieval routine at step S911, the procedure-returns to the step where the retrieval routine was called. Otherwise, at step S909, if the designated link is not the driving link as the result of discrimination (NO route), the procedure returns back directly to the step where the retrieval routine was called.

FIG. 42 is a perspective diagram of a link mechanism model for explaining operation of the routines of FIGS. 40 and 41; and FIG. 43 is a diagram illustrating a data structure of the link mechanism model of FIG. 42.

As shown in FIG. 42, the link A is a motor; the links B and C, a shift and a gear, respectively, which corotate as the link A (motor) rotates; and the link D, a gear meshing with the link C. And the link E is a shaft which corotates with the link D (gear) as the last-named link rotates, and the link F is a gear meshing with the link D (gear).

In data structure, as shown in FIG. 43, the link A, the link D and the link F are arranged in parallel; the link B is a child of the link A, the link C is a brother of the link B, and the link E is a child of the link D.

For the link mechanism model of FIGS. 42 and 43, it is considered to create the list A by executing the routine of FIGS. 40 and 41. In this example, the retrieval routine starts with the link A (motor). Namely, first of all, the pointer P makes a designation so as to select the link A at step S801 of FIG. 40. In the following explanation of the retrieval routine, each capital alphabetical letter in ( ) represents an individual link included in the list A.

(1) With the pointer P designating the link A, the retrieval routine starts off. (A)

(2) The pointer P is shifted from the link A to the link B, which is a child of the link A, and the retrieval routine is executed. (A, B)

(3) The pointer P is shifted from the link B to the link C, which is a brother of the link C, and the retrieval routine is executed. (A, B, C)

(4) The pointer P is shifted to the link D, which is a driven (passive) part of the link C, and the retrieval routine is executed. (A, B, C, D)

(5) The pointer P is shifted from the link D to the link E, which is a child of the link D, and the retrieval routine is executed. (A, B, C, D, E)

(6) The pointer P is shifted back to the link D by returning from the retrieval routine.

(7) The pointer P is shifted from the link D to the link F, which is a driven (passive) part of the link D, and the retrieval routine is executed. (A, B, C, D, E, F)

(8) The pointer P is shifted back the link D by returning from the retrieval routine.

(9) The pointer P is shifted back the link C by returning from the retrieval routine.

(10) The pointer P is shifted back the link B by returning from the retrieval routine.

(11) The pointer P is shifted back the link A by returning from the retrieval routine.

(12) The retrieval routine ends.

In the foregoing procedure, all the links (links A through F) of FIG. 42 are entered in the list A.

How to evaluate the possibility of interference in the group of links whose postures are changed due to the movement of a single motor link will now be described.

The interference due to the movement of the motor link, as described above in connection with FIGS. 37A and 37B, can occur not only between the group of the links whose postures are influenced by the movement of the motor link and the group of those whose postures are not influenced by the movement of the motor link, but also within the group of those whose postures are influenced by the movement of the motor link as shown in FIG. 42.

Consequently, for finding a set of companion links which are possible to interfere each other in the group, an interference check is made between all the individual links in the group, whose postures are influenced by the movement of the motor link, before the start of simulation, while the motor link is moved little by little. By making such interference check for each and every possible companion link sets, the companion link set will be not only a candidate, whose distance is to be obtained for the forthcoming actual simulation, but also a candidate for the shortest distance by which the simulation distance $\Delta t$ (=Ts) is determined. Precise simulation can therefore be achieved.

However, in the group in which the postures of the individual links are influenced by the movement of the motor link, yet a set of companion links normally in contact with each other exists like the motor and gear of FIG. 42. Consequently, after the interference check has made as the motor link is moved little by little, any companion link set, in which the companion links normally interfere with and are in contact with each other for every posture of the motor link, e.g., a set of companion links interconnected by a gear or the like is excluded from the object links between which distance is obtained.

FIGS. 44A through 44D are diagrams specifically illustrating how to extract combinations of links for obtaining inter-link distances during simulation in the group of the links affected in posture by a movement of the motor link.

FIG. 44A shows all parts composing a group in which the postures of the individual parts vary due to the movement of a particular single motor. In an illustrative example shown in FIG. 44B, while the motor is turned intermittently by a pitch of 36 degrees from −180 to 180 degrees, an interference check is made for each and every 36-degree movement. In this case, the individual turn of the motor and the interference check are performed eleven times.

As a result, a set of interfered links and the frequency of occurrence of interference as shown in FIG. 44C are obtained. The interference check was made eleven times; since the interference between the links B and E and that between the links D and E occurred eleven times (normally interfere or in contact with each other), these two sets are excluded from the object sets whose inter-link distances are to be measured during simulation.

A 3D model simulator 30, which constitutes the support system 10 of the present invention, according to a second embodiment will now be described with reference to FIGS. 45 through 64.

Figure 45:
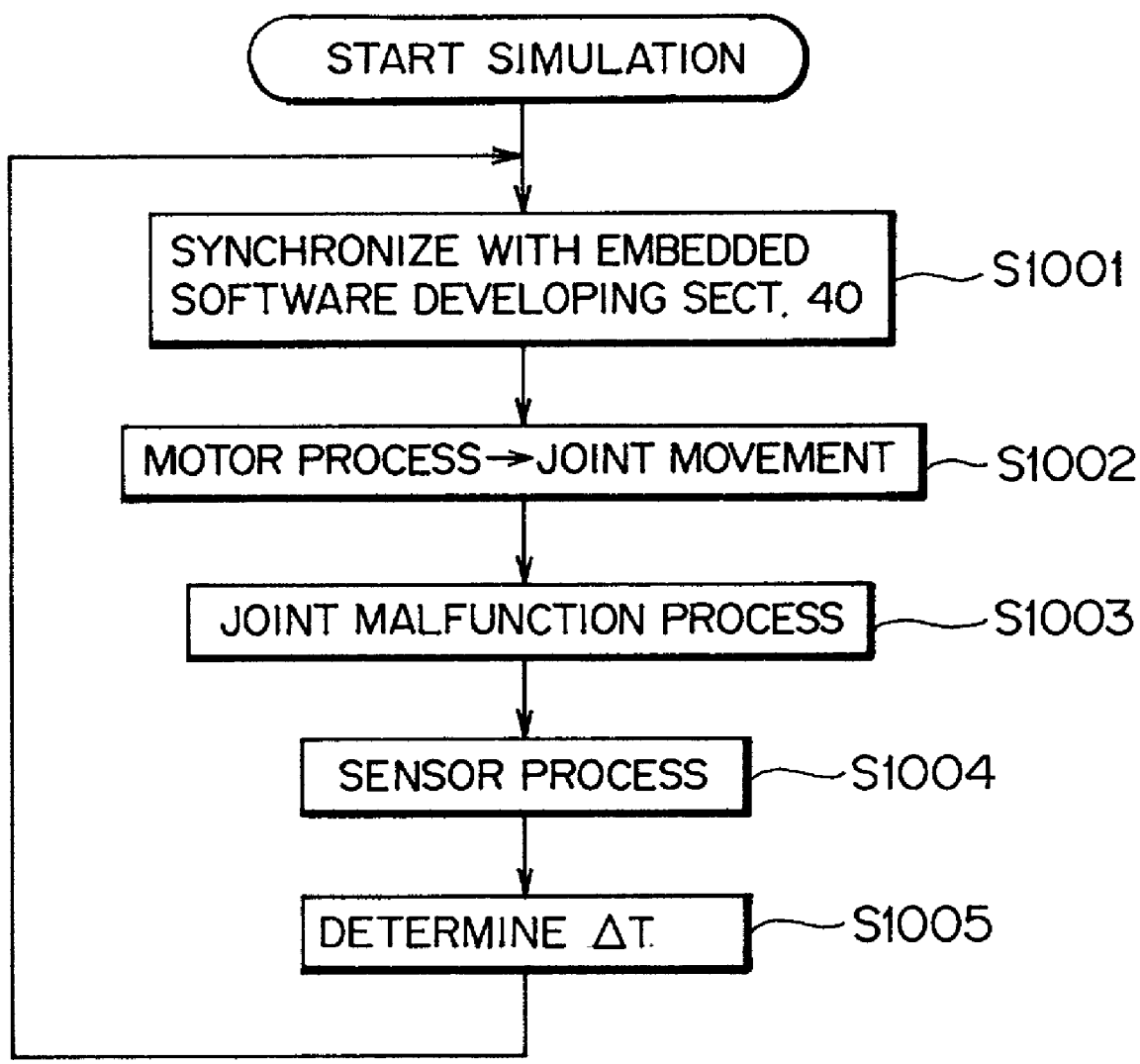
FIG. 45 is a flow diagram illustrating the whole simulation procedure by a three-dimensional real-time simulator according to a second embodiment of the present invention.

FIG. 45 is a flow diagram illustrating the whole simulation procedure by a 3D model simulator 30 according to the second embodiment of the present invention. As shown in FIG. 45, a synchronization process between the 3D model simulator 30 and the embedded software developing section 40 (step S1001), a motor process (step S1002), a joint malfunction process (step S1003), a sensor process (step S1004), and a process of determining the execution time ΔT (=Ts) of the embedded software developing section 40 (step S1005), are repeatedly executed.

The synchronization process between the 3D model simulator 30 and the embedded software developing section 40 (step S1001) is similar to the synchronization process described above in connection with FIGS. 12 through 14 and 32 through 34, so its description is omitted here. The remaining processes will now be described.

Figure 46:
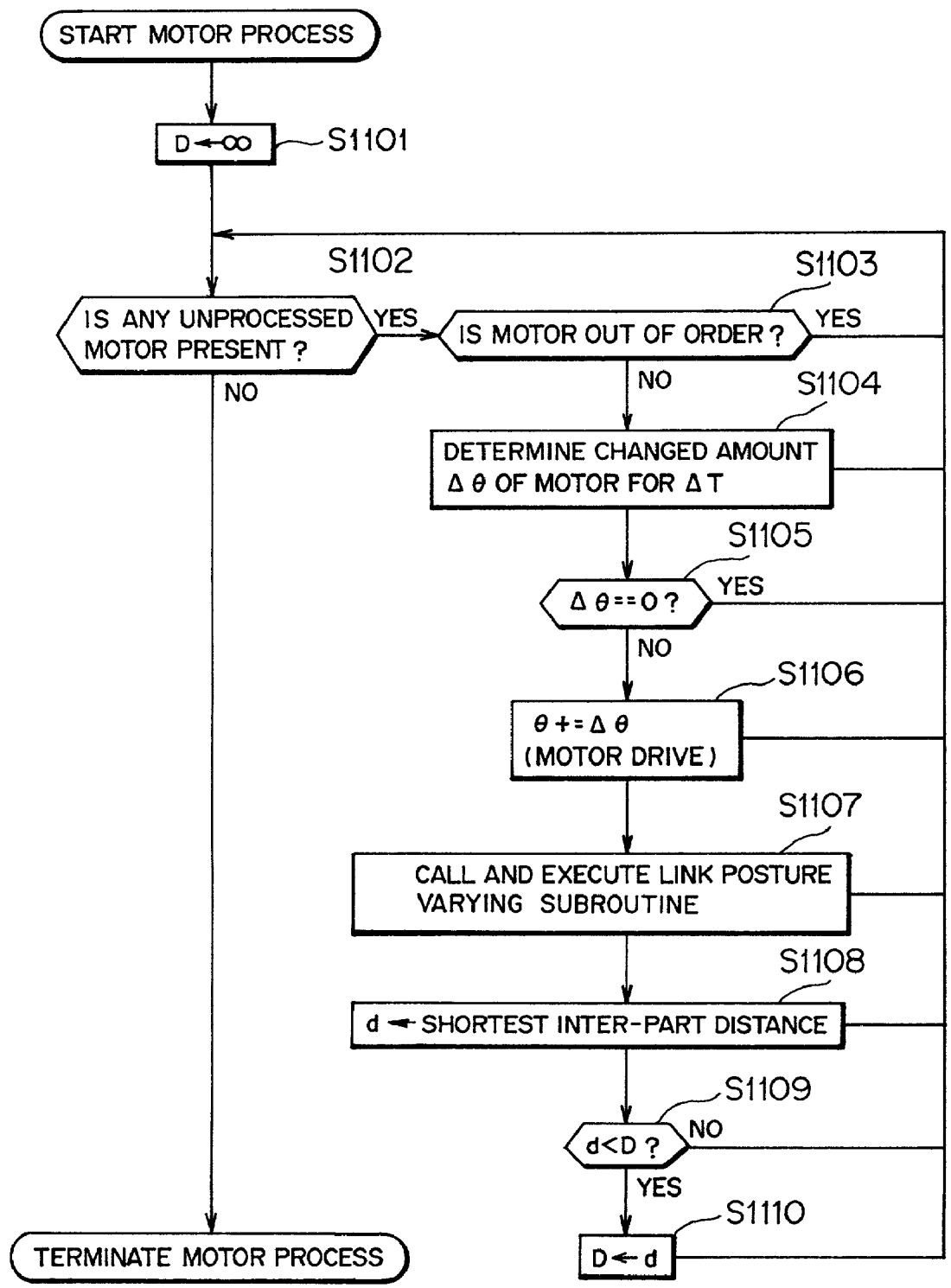
FIG. 46 is a flow diagram illustrating a motor processing routine.

FIG. 46 is a flow diagram illustrating a motor processing routine. In the flow diagram of FIG. 46, a motor-trouble concept is incorporated in the motor process of the first embodiment, which is constituted basically by a portion surrounded by a dash-and-dot line in FIG. 21.

As shown in FIG. 46, at step S1101, firstly ∞ is initially input for the shortest distance D before obtaining the shortest distance D, and then it is discriminated, at step S1102, whether or not there exist any unprocessed motors. If such unprocessed motors exist (YES route), the processes of steps S1103 through S1110 are performed for each and every unprocessed motor.

Thus, first of all, for the individual unprocessed motor, it is discriminated whether or not the motor is out of order (step S1103); presence/absence of motor troubles are previously set by the user and are preserved as flags.

No process is performed for the motor which is out of order (YES route of step 1103 to step S1102), and for the motor which is free of any trouble (NO route of step S1103), the posture change amount Δθ of the motor is determined in accordance with an actuator instructing signal related to the motor being currently processed, which signal is transmitted from the embedded software developing section 40 (step S1104).

It is discriminated whether or not Δθ=0. If Δθ=0 (YES route), the procedure returns to step S1102. Otherwise if not Δθ=0 (NO route), the current change amount Δθ is added to the preceding posture θ of the motor (step S1106). A link posture varying subroutine (described later in connection with FIG. 47) for calculating the posture change amount of the link, which is moved when the motor link is moved, is executed (step S1107).

Subsequently, the inter-part shortest distance d is obtained (step S1108), and it is discriminated whether or not d<D (step S1109). If not d<D (NO route), the procedure returns to step S1102. Otherwise if d<D (YES route), namely, when the currently obtained shortest distance d is shorter than the previously obtained shortest distance D, the currently obtained shortest distance d is substituted for the shortest distance D to update the last-named distance (step S1110).

Further, for all the motors, upon completion of posture variation during the current arithmetic time A T, this motor process is terminated.

Figure 47:
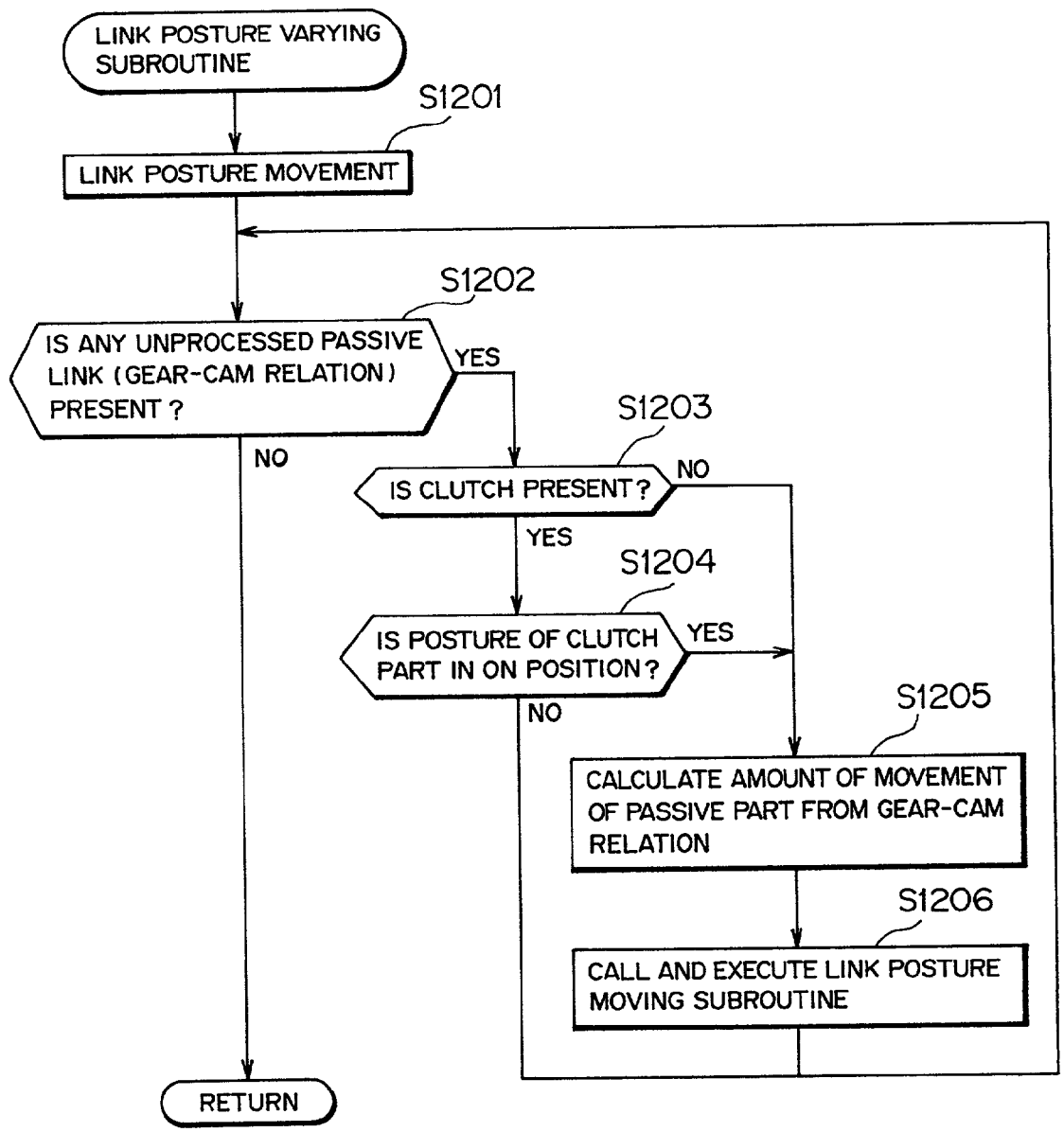
FIG. 47 is a flow diagram illustrating a link posture varying subroutine.

FIG. 47 is a flow diagram illustrating a link posture varying subroutine (step S1107) shown in FIG. 46.

As shown in FIG. 47, in the link posture varying subroutine, first of all, in response to the link posture variation (the posture variation of the motor link when called at step S1107 of FIG. 46) (step S1201), it is discriminated whether or not there exists any uncalculated driven (passive) link within the driven (passive) links that are passive with respect to the links whose postures have been varied (step S1202).

If the unprocessed driven (passive) link exists (YES route), it is discriminated whether or not a clutch exists between the link whose posture has currently varied and the driven (passive) link which is passive with respect to the posture-varied link (step S1203). If the clutch exists (YES route), it is discriminated whether or not the posture of the clutch (part) is in on position (step S1204) The presence of the clutch (part), and the relationship between the posture of the clutch (part) and the on/off of the clutch are previously defined by the user.

If no clutch (part) exists (NO route of step S1203) or if, though it exists, the clutch (part) is in on position (YES route of step S1204), the procedure goes to step S1205 where the amount of movement of a driven (passive) part is calculated based on the relationship with gears or cam. Then at step S1206, for obtaining the amount of movement of a driven (passive) part with respect to the driving (positive) part if the driven (passive) part for which the current movement amount is calculated is regarded as driven (positive) part, the link posture varying subroutine is called again, and this subroutine is executed, whereupon the procedure returns to step S1202. Otherwise, at step S1204, if the clutch (part) is not on position as the result of discrimination (NO route), the procedure returns directly to step S1202.

In this manner, the link posture varying subroutine, likewise the retrieval routine of FIG. 41, is reflexively executed so that the amount of movement of the other parts can be obtained at an increased rate when a single motor is moved.

Figure 48:
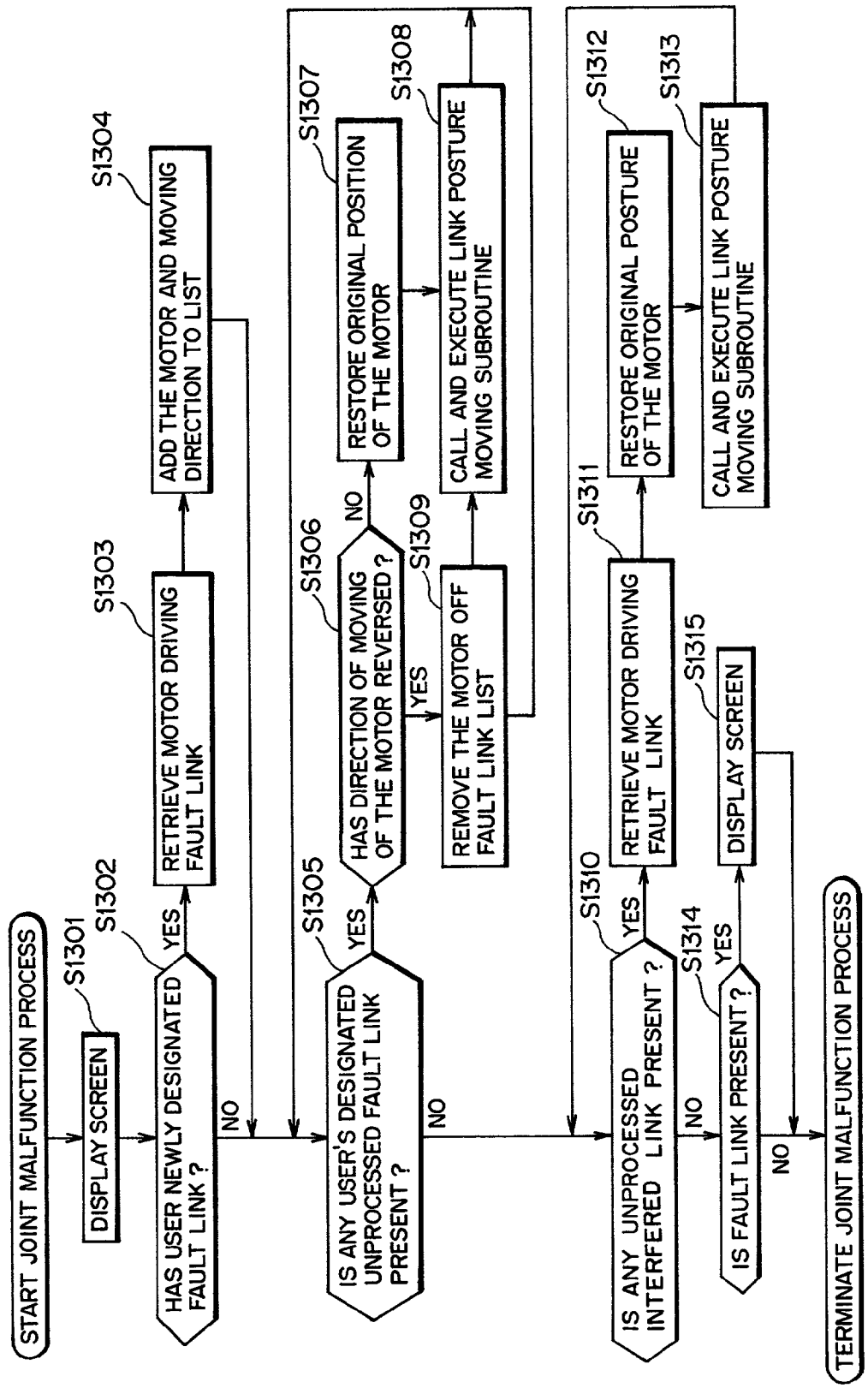
FIG. 48 is a flow diagram illustrating a joint malfunction processing routine.

FIG. 48 is a flow diagram illustrating a joint malfunction processing routine to be executed at step S1003 of FIG. 45.

As shown in FIG. 48, in the joint malfunction processing routine, first of all, after the three-dimensional-mechanism model is displayed on the screen (step S1301), it is sequentially discriminated whether or not the user has designated a newly fault link (step S1302), whether or not there exist unprocessed fault links designated by the user (step S1305), whether or not there exist unprocessed links encountered interference (step S1310), and whether or not there exists a fault link (step S1314).

At step S1302, if it is judged that the user has newly designated a fault link (YES route), the procedure goes to step s1303 where a motor driving the newly designated fault link, and the motor and the direction of movement of the motor are added to the list (step S1304), whereupon the procedure goes forward to step S1305.

If it is judged at step S1305 that the unprocessed fault link, which is designated by the user, exists (YES route), the procedure goes to step S1306 where it is discriminated whether or not the direction of movement of the motor driving the fault link has been reversed. If the direction of movement of the motor has not been reversed (NO route), the procedure goes to step S1307 where the motor recovers its original posture. To restore the original posture of the link in response to that the motor restores its original posture, the link posture varying subroutine of FIG. 47 is called and executed (step S1308), whereupon the procedure returns to S1305. Otherwise, at step S1306, it is judged that the direction of movement of the motor has been reversed (YES route), the procedure goes to step S1309 where the motor is deleted from the fault link list, and then the procedure returns to step S1305.

As a result, a movement such that the fault link becomes unable to move as caught for any cause when it is intended to move in one direction, and the fault link then restores its normal condition as released from the catch when the fault link is once moved in opposite direction, is simulated.

At step S1310, if it is judged that the unprocessed link, with which interference has occurred, exists (YES route), the procedure goes to step S1311 where a motor driving the fault link is retrieved, and the original posture of the motor is restored (step S1312). To restore the original posture of the other link to be driven by the motor, the link mechanism subroutine of FIG. 47 is called and executed (step S1313), whereupon the procedure returns to step S1310.

As a result, it is possible to simulate a situation such that a particular link becomes unable to move further as interfered with another link.

At step S1314, it is discriminated that the fault link exists (YES route), the three-dimensional mechanism model is described again on the screen (step S1315). Accordingly, by observing the result of redrawing of the three-dimensional-mechanism model, together with the drawing at step S1301, the motor, which has the fault link as the driven (passive) part, and the movements of all links, which are to be driven by the motor, are displayed in unnatural manner (e.g., non-smoothly or irregularly)

In this illustrated example, the joint malfunction status is realized by restoring the original posture of the motor. Alternatively the joint malfunction status may be realized by setting the upper limit or lower limit of the joint value temporarily to a current value.

Figure 49:
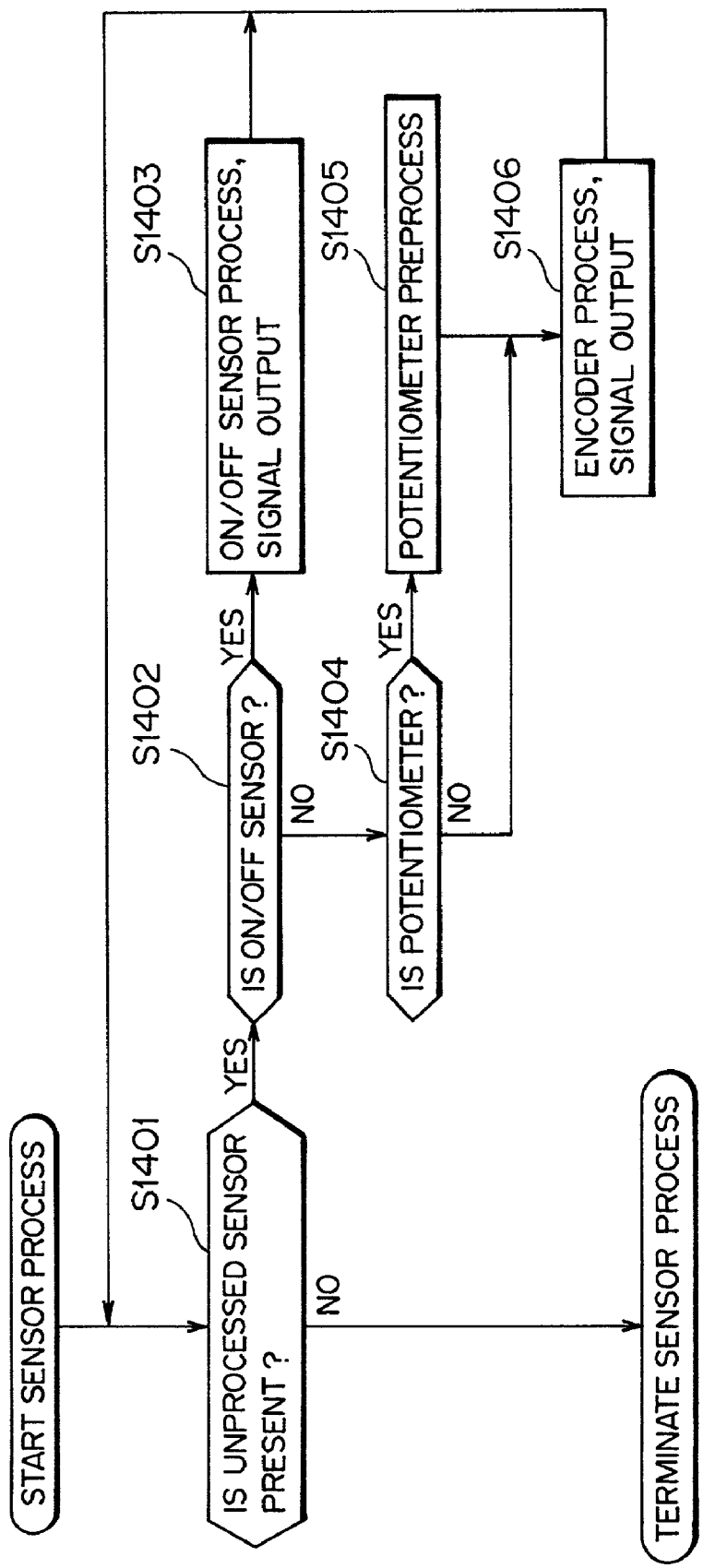
FIG. 49 is a flow diagram illustrating a sensor processing routine.

FIG. 49 is a flow diagram illustrating a sensor processing routine to be executed at step S1004 of FIG. 45.

In the foregoing embodiment, the sensor is an on/off sensor which outputs on and off signals. In this example, the sensor should by no means be limited to such on/off sensor, and may be in the form of a potentiometer or an encoder. Also the sensor trouble is considered.

As shown in FIG. 49, first of all, in step S1401, presence/absence of an unprocessed sensor is discriminated. If an unprocessed sensor exists (YES route), the procedure goes to step S1402 where it is discriminated whether or not the unprocessed sensor is an on/off sensor. If the unprocessed sensor is an on/off sensor (YES route), the on/off sensor process is performed at step S1403, and a sensor value (on or off), as the result of processing the on/off sensor is output, whereupon the procedure returns to step S1401.

At step S1402, if it is judged that the unprocessed sensor is not an on/off sensor (NO route), the procedure goes to step S1404 where it is judged whether or not the sensor is a potentiometer. If it is a potentiometer (YES route), the procedure goes to step S1405 where a potentiometer preprocess is performed. Then at step S1406 an encoder process is performed and a sensor value as the result of the encoder process is output, whereupon the procedure returns to step S1401.

Otherwise if it is judged that the sensor is not a potentiometer (NO route), namely, if it is judged that the sensor is an encoder, the procedure goes forward directly to the encoder process of step S1406, and a sensor value as the result of the encoder process is output, whereupon the procedure returns step S1401.

Figure 50:
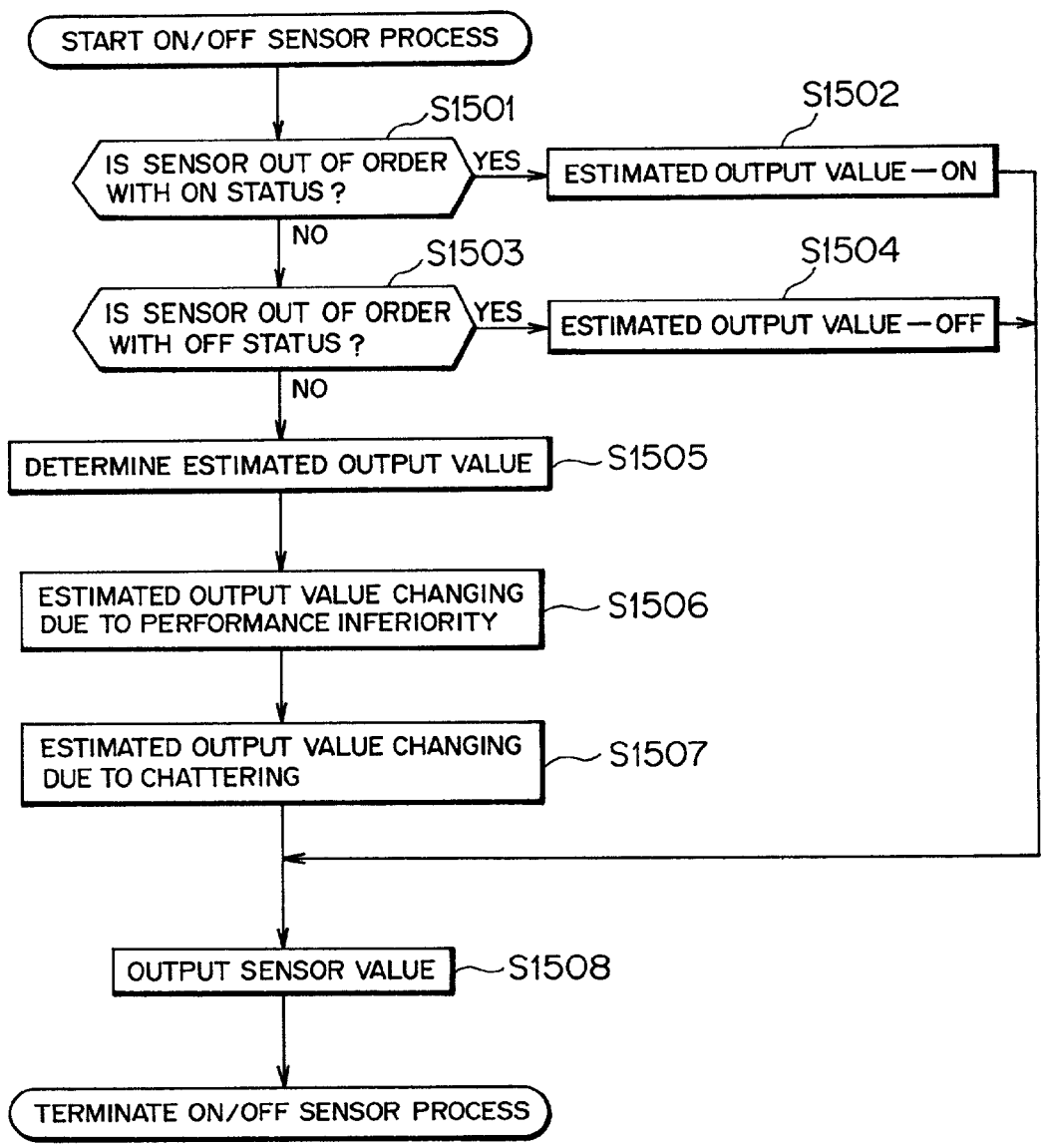
FIG. 50 is a flow diagram illustrating an on/off sensor processing routine.

FIG. 50 is a flow diagram illustrating an on/off sensor processing routine to be executed at step S1403 of FIG. 49.

In this on/off sensor process routine, the on/off sensor trouble also is simulated. As shown in FIG. 50, first of all, it is discriminated, at step S1501, whether or not the on/off sensor is out of order with keeping in the on status, and it is discriminated, at step S1503, whether the on/off sensor is out of order with keeping in the off status.

If the on/off sensor is out of order with keeping in the on status (YES route of step S1501), on is set as an estimated output value (step S1502). If the on/off sensor is out of order with keeping in the off status (YES route of step S1503), off is set as an estimated output value (step S1504), and the procedure goes to step S1508 where the estimated output value is output as a sensor value. It is previously set by the user whether or not the on/off sensor is out of order with keeping in the on status or the off status.

If the on/off sensor is not out of order (NO route of steps S1501 and S1503), the procedure goes to step S1505 where the estimated output value (on or off) is determined from the posture of the sensor link (step S1505). Subsequently an estimated output value change process due to performance inferiority (step S1506) and an estimated output value change process by chattering (step S1507) are executed, whereupon the procedure goes forward to step S1508.

Figure 51:
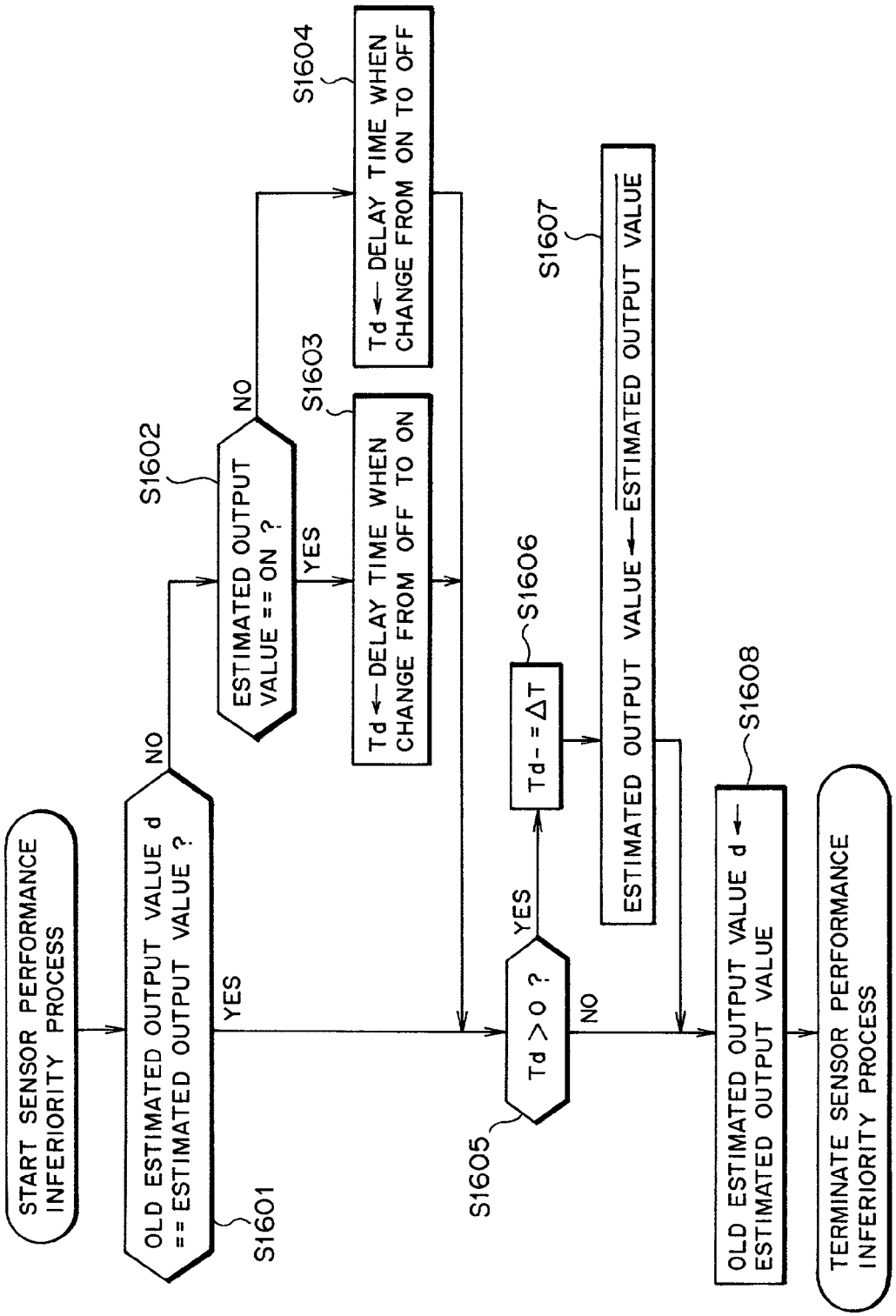
FIG. 51 is a flow diagram illustrating a sensor performance inferiority processing routine.

FIG. 51 is a flow diagram illustrating a sensor performance inferiority processing routine which is to be executed at step S1506 of the on/off sensor process routine of FIG. 50. In this sensor performance inferiority processing routine, the following situation is simulated: when there happens to occur an abnormal status such as to change the output of the on/off sensor from off to on, or vice versa due to inferior response performance, the previous status (off or on) is kept for a while, namely, the output of the on/off sensor delays to change the on/off status.

As shown in FIG. 51, first of all, at step S1601, it is discriminated whether or not an estimated output value is equal to an estimated original output value d. If a change has occurred (NO route), the procedure goes to sep S1602 where it is discriminated whether or not the estimated output value is on. If the estimated output value is on (YES route), the procedure goes to step S1603 where a delay time when the sensor output changes from off to on is set to Td, whereupon the procedure goes forward to step S1605. Otherwise if the estimated output value is off (NO route of step S1602), the procedure goes to step S1604 where a delay time when the sensor output changes from on to off is set, whereupon the procedure goes forward to step S1605.

At step S1601, if it is judged that the estimated output value is equal to the original estimated output value d (YES route), or upon completion of the processes of steps S1603 and S1604, then it is discriminated at step S1605 whether Td>0. If Td>0 (YES route), the procedure goes to step S1606 where an execution time $\Delta T$ of the embedded software developing section 40 is subtracted from Td, and then forward to step S1607 where the estimated output value is inverted (off when the estimated output value is off, and on when the estimated output value is off), whereupon the procedure goes forward to step S1608.

At step S1605, if not Td>0 (NO route), or upon completion of the process of step S1607, the procedure goes to step S1608 where the current estimated output value is stored to update the original estimated value d.

As shown in FIG. 45, the sensor process of S1004 is repeatedly executed, and the sensor performance inferiority process of FIG. 1 also is repeatedly executed. And when Td>0, ΔT is subtracted from Td each time this process is repeated; the sensor will not be varied until Td≦0.

Figure 52:
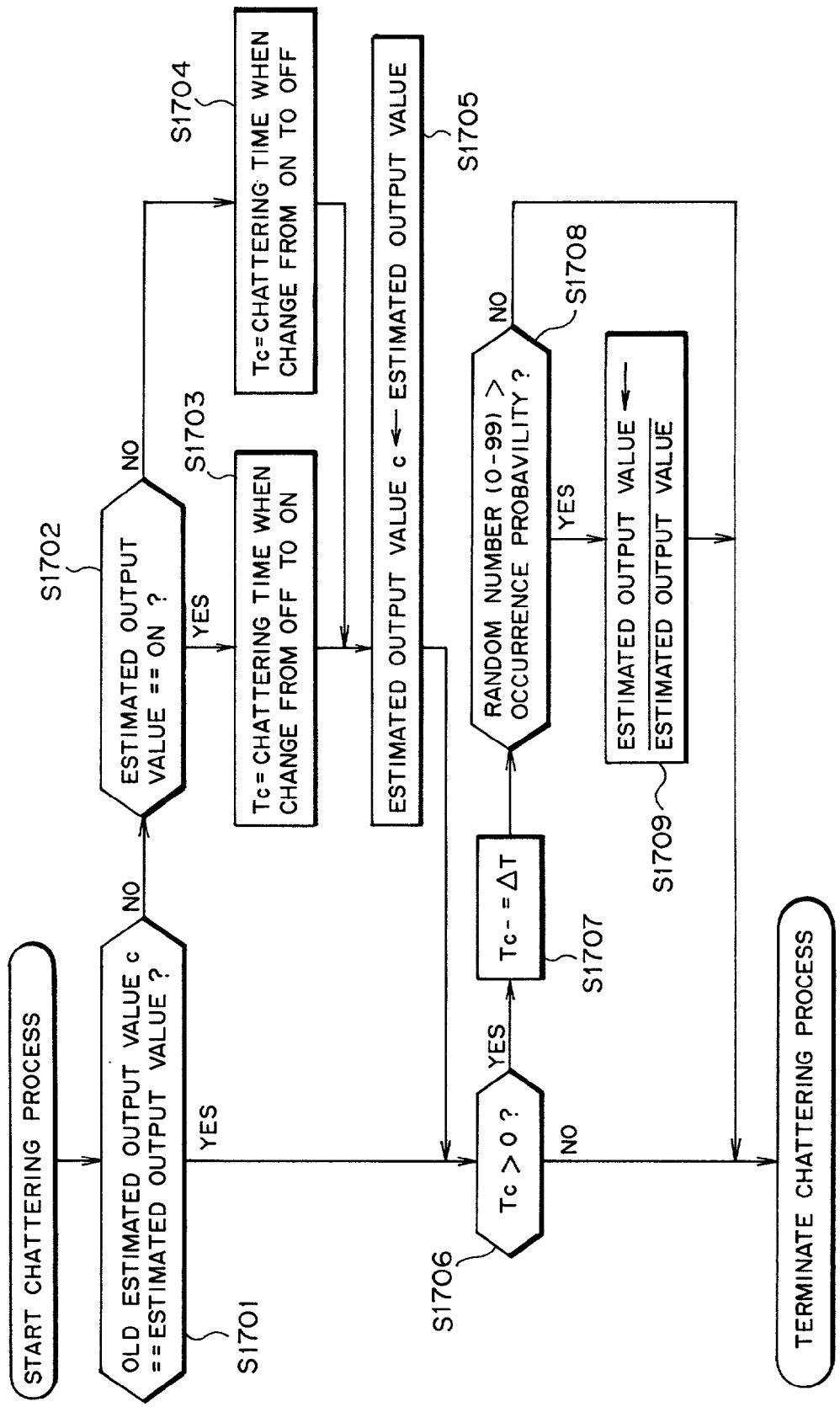
FIG. 52 is a flow diagram illustrating an estimated output value change processing routine by chattering.

FIG. 52 is a flow diagram illustrating an estimated output value change processing routine, which is to be executed by step S1507 of the on/off sensor processing routine of FIG. 50, by chattering. In this estimated value change processing routine, chattering when the on/off sensor changes from on to off, or vice versa, is simulated.

As shown in FIG. 52, first of all, at step S1701, it is discriminated whether or not the estimated output value is equal to the original estimated output value. If a change has occurred (NO route), the procedure goes to step S1702 where it is discriminated whether or not the estimated output value is on. If the estimated output is on (YES route), the procedure goes to step S1703 where a chattering time when the sensor output changes from off to on is set to Tc, whereupon the procedure goes forward to step S1705. Otherwise if the estimated output value is off (NO route of step S1702), the procedure goes to step S1704 where a chattering time when the sensor output changes from on to off set to Tc, whereupon the procedure goes forward to step S1705.

At step S1705, the estimated output value is set to update the original estimated output value c. After completion of this process or if it is judged at step S1701 that the estimated output value is equal to the original estimated output value c (YES route), the procedure goes to step S1706 where it is discriminated whether or not Tc>0.

If Tc>0 (YES route), the procedure goes to step S1707 where the execution time ΔT of the embedded software developing section 40 is subtracted from Tc, and then forward to step S1708 where a random number representing one of 0 to 99, which has occurred, is compared with a preset possibility of occurrence (a value representing one of 0 to 99). As the result, if random number>possibility of occurrence (YEST route), the estimated output value (on or off) is inverted (step S1709), whereupon the process is terminated. Otherwise, at step S1708, if not random number>possibility of occurrence (NO route) or if not Tc>0 (NO route) at step S1706, whereupon the process is terminated without advancing to another step.

Thus, while Tc>0, chattering such as to change from on to off, or vice versa in possibility is simulated.

The encoder process to be executed at step S1406 of FIG. 49 will now be described.

Figure 53:
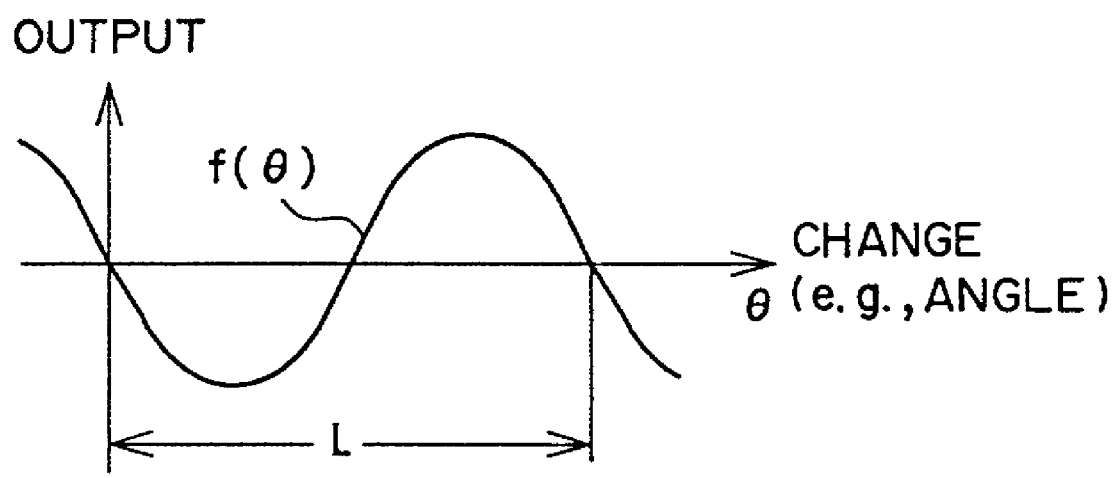
FIG. 53 is a graph showing one example of output waveform with respect to the variation (e.g., angle) of an encoder.
Figure 54A:
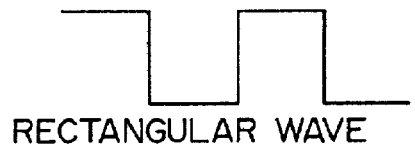
FIGS. 54A through 54E are diagrams showing various output waveforms of an encoder.
Figure 54B:
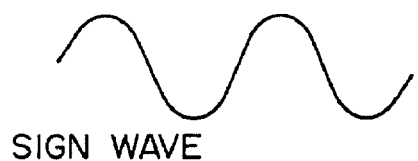
Figure 54C:
Figure 54D:
Figure 54E:

FIG. 53 is a graph showing one example of output waveform with respect to the variation (e.g., angle) of an encoder, and FIGS. 54A through 54E are diagrams showing various output waveforms of an encoder.

Now, as shown in FIG. 53, assume a situation that the output waveform of an encoder is a periodic function f(θ) having a wavelength L. The function f(θ) can have selectively various kinds of waveforms such as shown in FIGS. 54A through 54E. The wavelength L corresponds to a single cycle of the function f(θ); assuming that this encoder is a rotary encoder and outputs a single-period signal every turn of 1.0 degree, L=1.0 (degrees).

If the change θ is converted into an electrical angle $\phi=2\pi\theta/L$, the function f(θ) is assumed to be expressed as function g(φ); the principle of the encoder function will now be described.

Assuming that the electrical angle of the encoder during the previous simulation is $\phi_0$, namely, the electrical angle at the time advanced from the previous simulation by the arithmetic time ΔT of the embedded software developing section 40 is φ, and the electrical angular velocity of the encoder is ω, the amount of movement of the encoder in a simulation cycle from the previous simulation to the current simulation will be ω ΔT, thus establishing $$\phi=\phi_0+\omega\Delta T.$$

However, in measuring the number of pulses, the encoder has to output g(φ) after outputting a predetermined number of pulses because it cannot merely output g(φ) if ωΔT in the current simulation cycle is larger than 2π.

Figure 55:
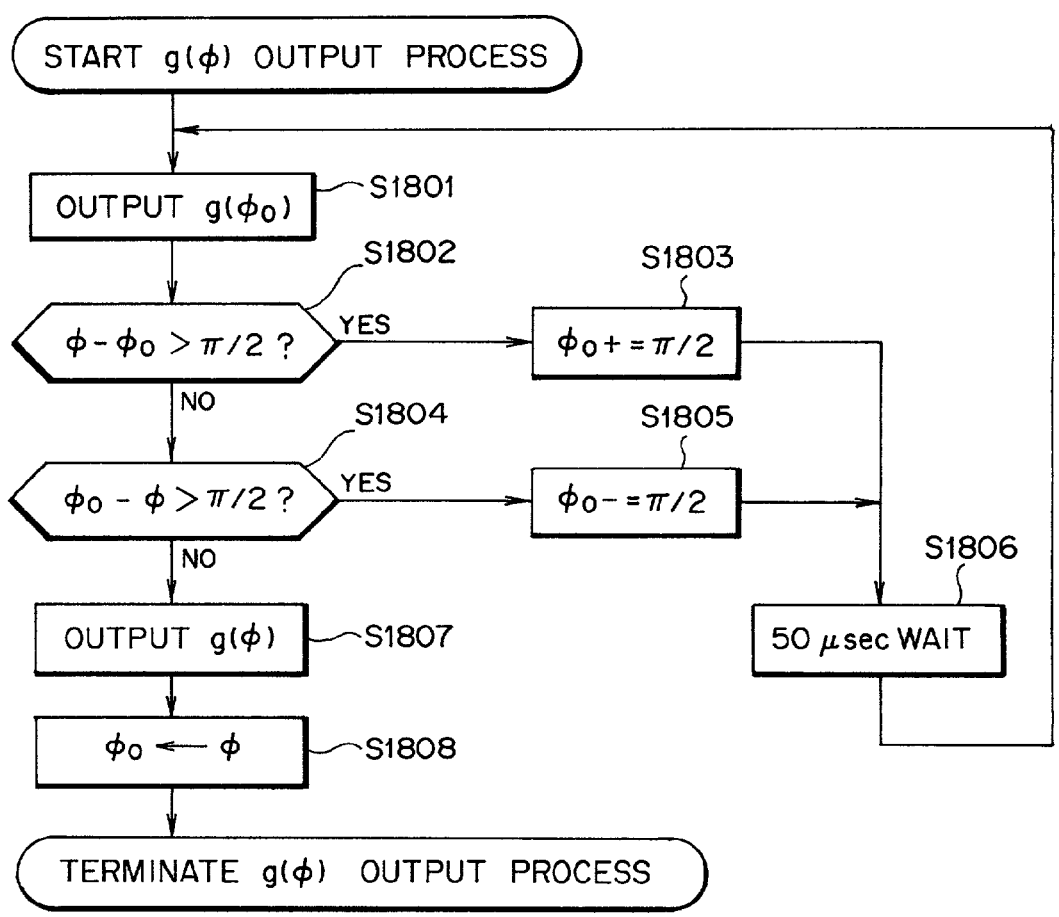
FIG. 55 is a flow diagram illustrating an output processing routine of an encoder.

FIG. 55 is a flow diagram illustrating an output processing routine of an encoder.

In the encoder output processing routine, as shown in FIG. 55, firstly the encoder output $g(\phi_0)$ upon termination of the previous simulation is output (step S1801). Then it is discriminated whether or not a difference $\phi-\phi_0$ between the electrical angle φ upon termination of the current simulation and the previous electrical angle $\phi_0$ is $\phi-\phi_0>\pi/2$ (step S1802), or it is discriminated whether or not $\phi_0-\phi>\pi/2$ (step S1804).

If $\phi-\phi_0>\pi/2$ (YES route of step S1802), the procedure goes to step S1803 where π/2 is added to $\phi_0$, and then forward to step S1806 where the procedure stands by for 50 μsec, whereupon the procedure returns to step S1801 where $g(\phi_0)$ for new $\phi_0$ is output. If $\phi_0-\phi>\pi/2$ (YES route of step S1804), the procedure goes to step S1805 where π/2 is subtracted from $\phi_0$, and then forward to step S1806 where the procedure stands by for 5 μsec, whereupon the procedure returns to step S1801 where $g(\phi_0)$ for new $\phi_0$ is output.

Namely, if $|\phi_0-\phi|>\pi/2$, a dispersing periodic signal when φ varies at a pitch of π/2 until $|\phi_0-\phi|\neq\pi/2$ with the upper limit set to a frequency of 5 kHz (step S1806).

If $|\phi_0-\phi|\leq\pi/2$ (NO route of steps S1802 and S1804), the procedure goes to step S1807 where g (φ), which is the final value of the encoder in the previous simulation, is output so that φ of the current simulation is updated as current $\phi_0$ for the next simulation (step S1808).

It is assumed that this encoder signal is received by a counter circuit which operates independently of the embedded software developing section 40 so that no problem would occur even when the embedded software developing section 40 is stopped during the transmitting of the encoder signal.

The flow diagram of FIG. 55 shows an encoder of the type of outputting only a single pulse signal g(φ) Alternatively, g(φ+π/2) may be output so that an encoder of the type of outputting a two-phase signal of A phase and B phase can be expressed.

As another alternative, a positive/negative signal of $\phi-\phi_0$ maybe output in terms of on/off so that an encoder of the type of outputting an up/down signal can be expressed.

For preparation of the above-mentioned simulation, an offset indicating a zero position, in which a waveform of pulse (FIGS. 54A through 54E), resolution or electrical angle φ becomes zero (0), so that the characteristics of an encoder can be defined by the user.

Figure 56:
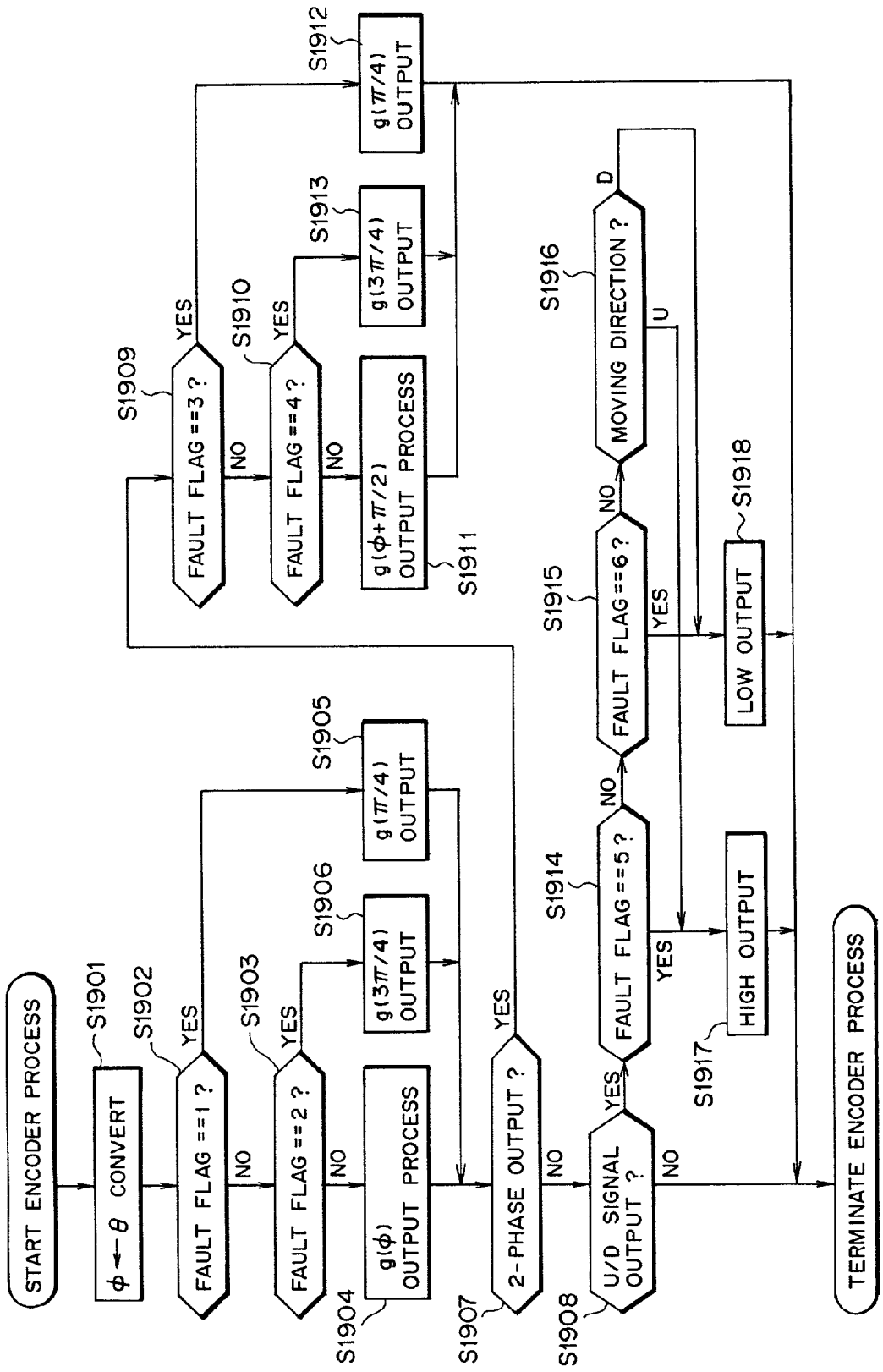
FIG. 56 is a flow diagram illustrating an encoder processing routine.

FIG. 56 is a flow diagram illustrating an encoder processing routine which is to be executed at step S1406 of the process routine of FIG. 49.

Here the encoder trouble also is considered; for simulating a three-dimensional-mechanism model when the encoder is out of order, the following fault flags 0 through 6 are previously set:

Fault flag 0: normal
Fault flag 1: A phase trouble at $V_{max}$
Fault flag 2: A phase trouble at $V_{mix}$ Fault flag 3: B phase trouble at $V_{max}$
Fault flag 4: B phase trouble at $V_{mix}$
Fault flag 5: up/down signal trouble (fixed to High)
Fault flag 6: up/down signal trouble (fixed to Low)

As shown in FIG. 56, first of all, at step S1901, the change θ is converted into an electrical angle φ, and then it is discriminated whether or not the fault flag is 1 (step S1902), and it is discriminated whether or not the fault flag is 2 (step S1903). If the fault flag is neither 1 nor 2, the procedure goes forward to step S1904 where the g (φ) output process routine of FIG. 55 is executed.

Otherwise, at step S1902, if it is judged that the fault flag is 1, the procedure goes to step S1905 where g(π/4), which corresponds to the phase trouble at $V_{max}$, is output. In the meantime, at step S1903, if it is judged that the fault flag is 2, the procedure goes to step S1906 where g(3π/4), which corresponds to the phase trouble at $V_{mix}$, is output.

Subsequently, at step S1907, it is discriminated whether or not the encoder is an encoder of the two-phase-output type, and at step S1908, it is discriminated whether or not the encoder is an encoder of the type of outputting an up/down signal. If the encoder is neither type, namely, if the encoder is an encoder of the type of merely outputting only g(φ) this routine is skipped.

At step S1907, it is judged that the encoder is the two-phase-output-type encoder, the procedure goes to step S1909 where it is discriminated whether or not the fault flag is 3, and then forward to step S1910 where the fault flag is 4. If the fault flag is neither 3 nor 4, the procedure goes to step S1911 where the output processing routine in which φ+π/2 is substituted for φ in FIG. 55 is executed.

At step S1909, if it is judged that the fault flag is 3, the procedure goes to step S1912 where g(π/4), which corresponds to B phase trouble at $V_{max}$, is output. Likewise, at step S1910, if it is judged that the fault flag is 4, the procedure goes to step S1913 where g(3 π/4), which corresponds to B phase trouble at $V_{mix}$, is output.

Further, at step S1908, if it is judged that the encoder is an encoder of the type of outputting an U/D (up/down) signal, the procedure goes to step S1914 where it is discriminated whether or not the fault flag is 5, and then forward to step S1915 where it is discriminated whether or not the fault flag is 6.

If the fault flag is neither 5 nor 6, the procedure goes to step S1916 where it is discriminating in which direction the encoder is moved. If the moving direction is upward (U route), the procedure goes to step S1917 where 'High' is output. Otherwise if the moving direction is downward (D route), the procedure then goes to step S1918 where 'Low' is output.

At step S1914, if it is judged that the fault flag is 5, the procedure goes to step S1917 where 'High' is output, irrespective of the direction of moving of the encoder. Likewise, at step S1915, if it is judged that the fault flag is 6, the procedure goes to step S1918 where 'Low' is output, irrespective of the direction of moving of the encoder.

Thus not only the encoder type but the encoder trouble can be expressed. In the case of encoder, unlike the case of on/off sensor, when outputting a sensor signal, judging and processing of fault flags are performed when outputting a sensor signal, instead of showing "occurrence of trouble" immediately after the processing has been started.

Figure 57:
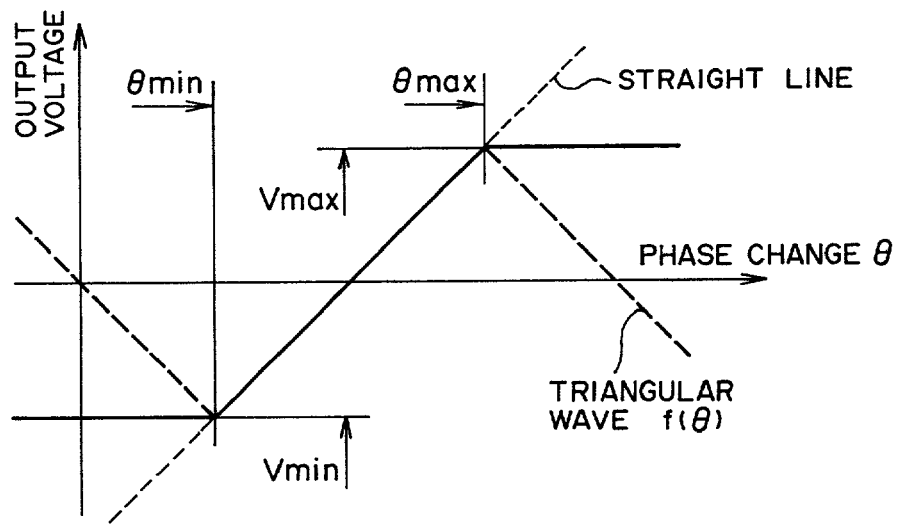
FIG. 57 is a diagram illustrating one example of function value of a potentiometer.

FIG. 57 is a diagram illustrating one example of function value of a potentiometer. Here the potentiometer is in the form of an encoder which outputs a triangular wave of FIG. 54D and is very low in resolution. Assuming that the wavelength L of FIG. 53 is set to 360 degree, it is possible to express a potentiometer which converts the output voltage V of varying range of $\theta_{max}-\theta_{min}=180$ degrees from the minimum value $V_{min}$ from the maximum value $V_{max}$, as shown in FIG. 57.

Figure 58:
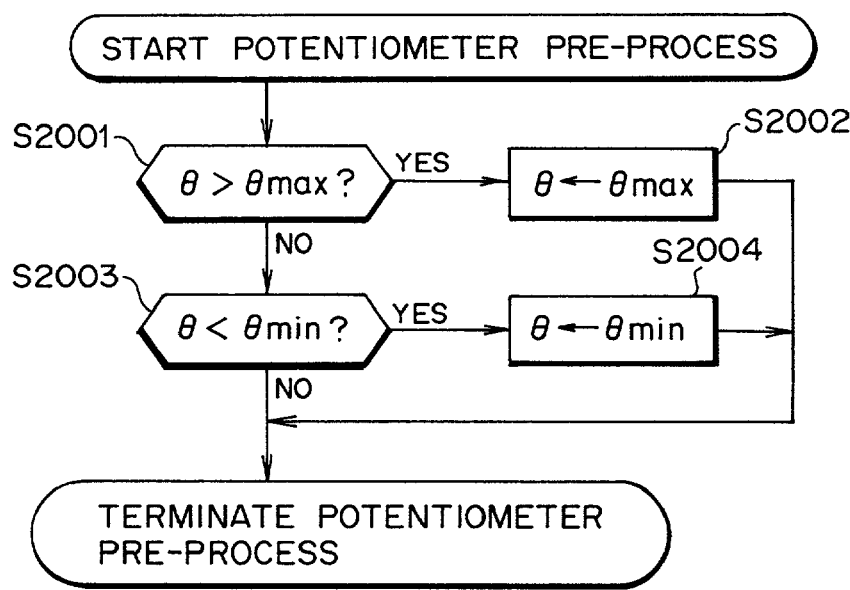
FIG. 58 is a flow diagram illustrating a potentiometer preprocessing routine.

FIG. 58 is a flow diagram illustrating a potentiometer preprocessing routine to be executed at step S1405 of the sensor process routine shown in FIG. 49.

In the case of potentiometer, as indicated by a solid line in FIG. 57, a potentiometer is realized such that, for θ equal to or smaller than $\theta_{min}$, the output voltage V is fixed to the minimum value, and for θ equal to or larger than $f_{max}$, the output voltage V is fixed to the maximum value, as shown in FIG. 58.

Namely, as shown in FIG. 58, at step S2001, it is discriminated whether or not $\theta>\theta_{max}$ is satisfied; if it is satisfied, the procedure goes to step S2002 where θ is fixed to $\theta_{max}$.

Likewise, at step S2003, it is discriminated whether or not $\theta<\theta_{min}$ is satisfied; if it is satisfied, the procedure goes to step S2004 where θ is fixed to $\theta_{min}$.

In the case of potentiometer, after the foregoing preprocess has been performed, the encoder process of FIG. 56 is executed (FIG. 49).

In this type potentiometer, when the user inputs $\theta_{max}$, $\theta_{min}$, $V_{max}$, $V_{min}$, the support system automatically converts each of these input values into a wavelength, an amplitude and an offset of a triangular wave f(θ).

A potentiometer, such as a stopper-less potentiometer, whose output periodically varies, is treated as an encoder which outputs a triangular wave and a sawteeth wave which are low in resolution.

FIG. 59 is a flow diagram illustrating a ΔT determination processing routine (inter-simulation distance determination processing routine) to be executed at step S1005 of FIG. 45.

As shown in FIG. 59, first of all, at step S2101, it is discriminated whether or not there exists any sensor in which performance inferiority (response delay or chattering) has occurred. If no such sensor exists, ΔT corresponding to the shortest inter-part distance D obtained by the process of FIG. 46 is determined (step S2102). Otherwise if such sensor exists, a possible minimum value for ΔT is set (step S2103)

Thus by setting ΔT to a minimum value when a sensor in which performance inferiority has occurred exists, it is possible to increase the degree of precision in expressing performance inferiority and hence to realize accurate simulation. In the case of a normal sensor, since a delay time is previously set to zero, the sensor operates without any problem.

Figure 60A:
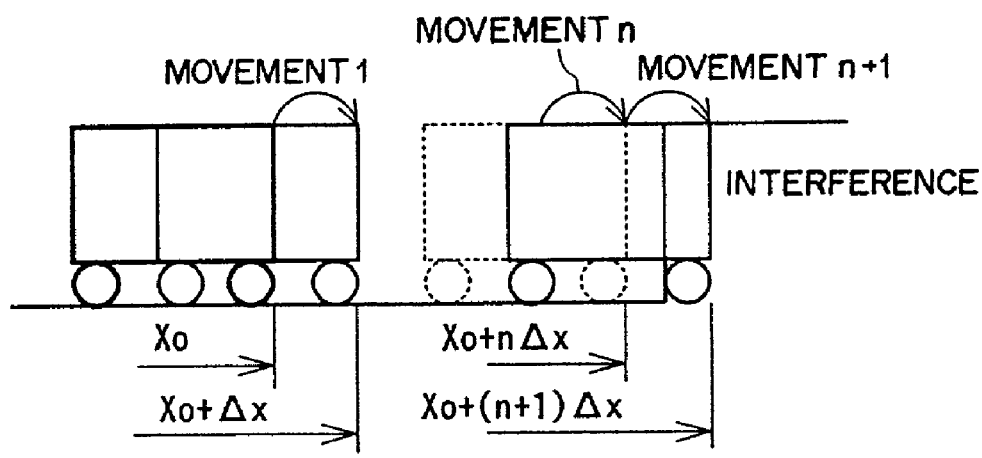
FIGS. 60A and 60B are diagrams illustrating how to retrieve a joint movement range by an interference check.
Figure 60B:
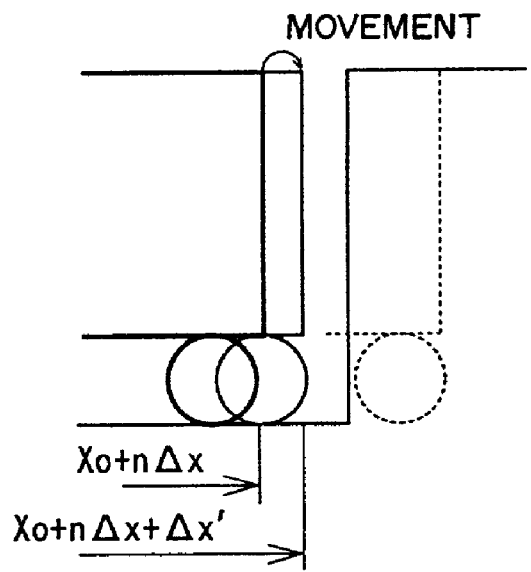

FIGS. 60A and 60B are diagrams illustrating how to retrieve a joint movement range by an interference check.

First of all, the user selects as to which direction the user intends to set a restricting value or as to which set of parts will cause a restriction to occur as they contact each other, whereupon a joint movable range is retrieved.

In retrieving this joint movable range, the joint posture x is increased from the initial value $x_0$ intermittently by a pitch of Δx, and an interference check is made for every increment. As a result, as shown in FIG. 60A, when $x=x_0+n\Delta x$, no interference occurs, and when the next $x=x=x_0+(n+1)\Delta x$, it turns out a position an interference occurs.

Subsequently, by using an amount of movement Δx' smaller than Δx, e.g. Δx'='x/10, as shown in FIG. 60B, x is increased from $x_0+\Delta x$ intermittently by a pitch of Δx'. When $x=x_0+n\Delta x+n'\Delta x'$, no interference occurs, and when the next $x=x=x_0+n\Delta x+(n'+1)\Delta x'$, it turns out a position an interference occurs.

By repeating the foregoing process several times, it is possible to obtain a restricting value next $x_0+n\ \Delta x+n'\Delta x'+n''\Delta x''\ldots$ at high speed with desired precision. But, two parts designated by the user might be in such a position relationship as not to interfere each other in whichever way the joints are moved consequently, it is preferable to set the upper limit for the frequency of retrievals n when performing the first interference position retrieval, so that an infinite loop can be prevented.

Figure 61A:
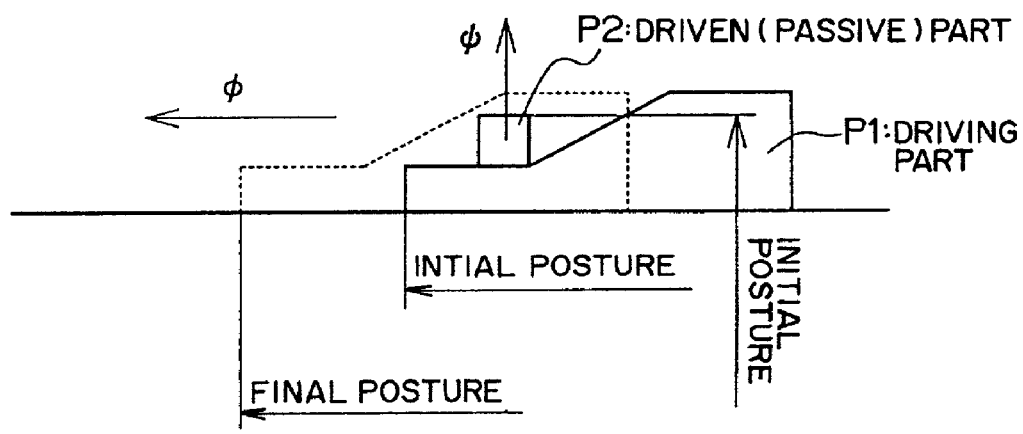
FIGS. 61A through 61C are diagrams illustrating how to retrieve a cam relation by an interference check.
Figure 61B:
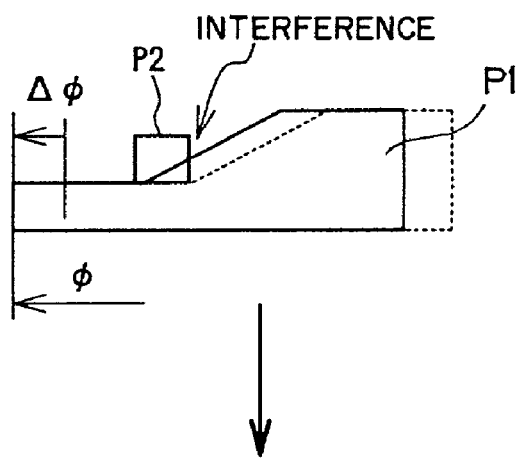
Figure 61C:
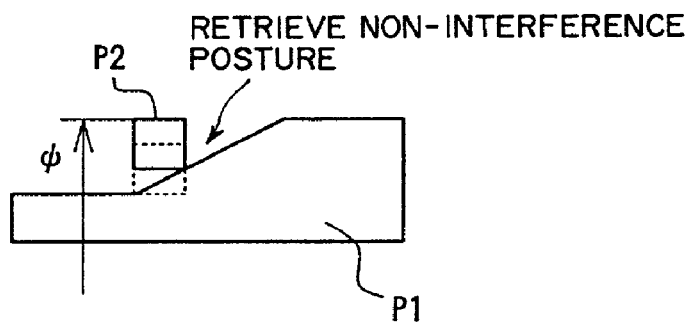
Figure 62:
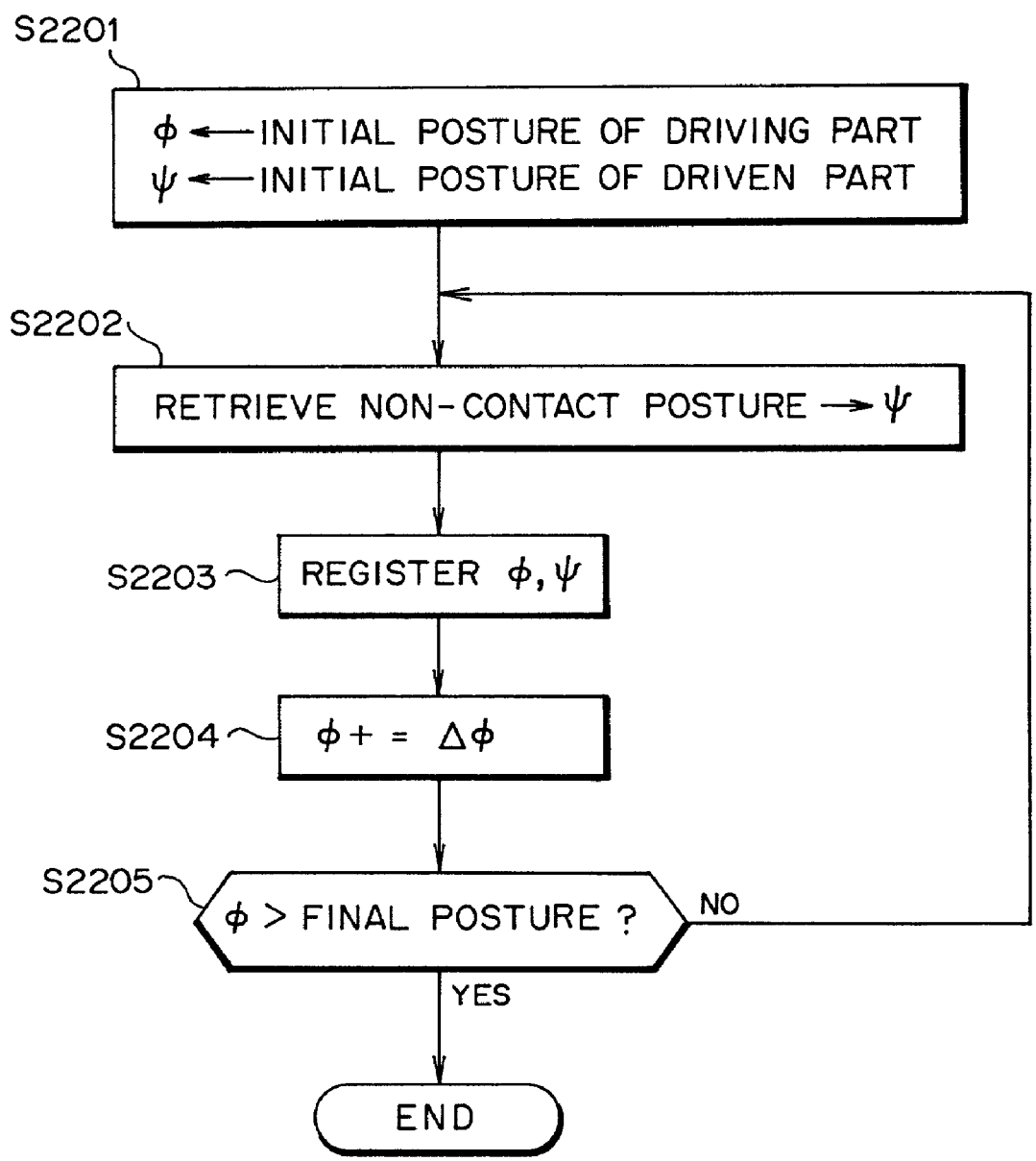
FIG. 62 is a flow diagram illustrating a cam relation retrieving routine by an interference check.

FIGS. 61A through 61C are diagrams illustrating how to retrieve a cam relation by an interference check, and FIG. 62 is a flow diagram illustrating a cam relation retrieving routine by an interference check.

Here, such as shown in FIGS. 61A, a driving (positive) part P1, a driven (passive) part P2, an initial posture of the driving part P1, an initial posture of the driven part P2, and a final posture of the driving part P1 are previously designated by the user.

In the routine of FIG. 62, first of all, the initial posture of the driving part P1 and the initial posture of the driven part P2 are set to $\phi$ and $\phi$, respectively (step S2201), and then a non-contact posture of the driven part P2 is retrieved and is stored as $\phi$ (step S2202).

Subsequently, at step S2203, a set of the posture $\phi$ of the driving part P1, the non-contact posture $\phi$ of the driven part P2, which have currently obtained, are registered so that the posture $\phi$ of the driving part P1 is moved by $\Delta\phi$ such as shown in FIG. 61B (step S2204).

Further, the process of retrieving and arithmetic-operating the non-contact posture $\phi$ (FIG. 61C) of the driven part P2 with respect to the driving part P1 moved intermittent at a pitch of $\Delta\phi$ (step S2202), the process of registering the postures $\phi$, $\phi$(step S2203), and the process of moving the driving part P1 (step S3204), are repeated until the posture $\phi$ of the driving part P1 assumes a final posture (until YES is judged at step S2205).

Figure 63:
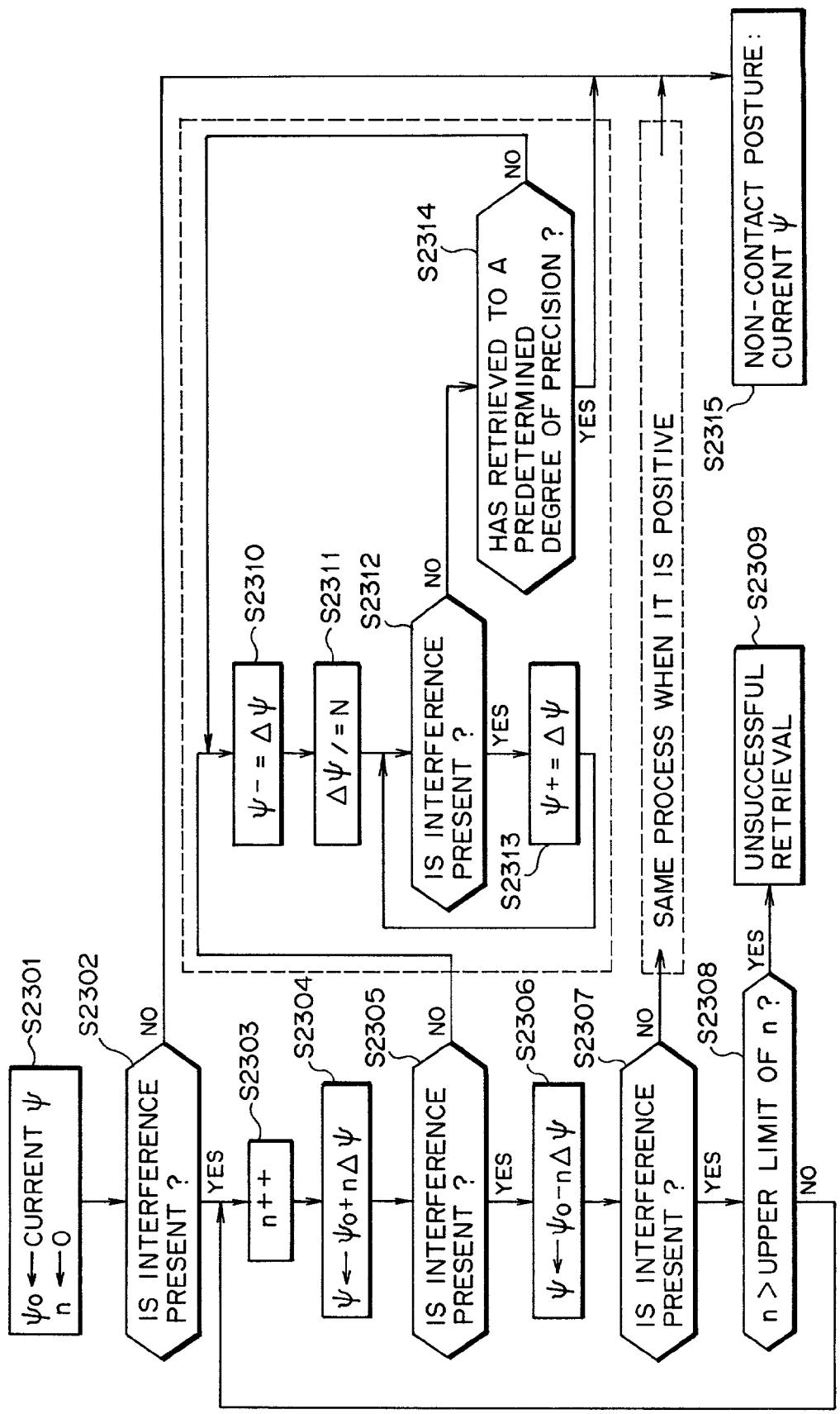

FIG. 63 is a flow diagram illustrating a non-contact posture retrieving routine, which is to be executed by step S2202 of the cam-relation retrieving routine of FIG. 62, for retrieving the non-contact posture of the driven part P2.

As shown in FIG. 63, first of all, at step S2301, the current posture $\phi$ of the driven part P2 is set to $\phi$ so that the initial value 0 is set for the count value n of a counter.

At step S2302, it is discriminated whether or not the driven part P1 and the driven part P2 interfere with each other; if no interference, the current posture $\phi$ is regarded as a non-contact posture (step S2315).

If it is judged at step S2302 that an interference has occurred, the procedure goes to step S2303 where the count value n is increased by 1, and then forward to step S2304 where $\phi_0+n\Delta\phi$ is set as the posture $\phi$ of the driven part P2, whereupon the procedure goes forward to step S2305 where it is discriminated again whether or not interference is still present. If interference is still present, the procedure goes to step S2306 where ) $\phi_0-n\Delta\phi$ is set as the posture $\phi$ of the driven part P2, whereupon the procedure goes forward to step S2307 where it is discriminated again whether or not interference is still present. If interference is still present, the procedure goes to step S2308 where it is discriminated whether or not the count value n is the upper limit of n. If it is the upper limit of n, it is judged that the retrieval has been unsuccessful (step S2309). If the count value n has not yet reached the upper limit, the procedure returns to step S2303 where the count value n is increased by 1. In the same manner, an interference check is performed.

If it is judged at step S2305 that no interference occurs, the procedure goes to step S2310 where $\phi$ is decreased by $\Delta\phi$, and then forward to step S2311 where $\Delta\phi$ is divided by a suitable integer N and is set to a value smaller than previous.

Then, while $\phi$ is increased by $\Delta\phi$, which has been set to the smaller value as mentioned above (step S2313), it is discriminated whether or not an interference is present (step S2312). If a change has occurred from the interfered status to the no-interfered status, the procedure goes to step S2314 where it is discriminated whether or not retrieval is performed to a predetermined degree of precision. If the degree of precision is inadequate, the procedure returns to step S2310 where $\Delta\phi$ is subtracted from $\phi$, and then forward to step S2311 where a further smaller value is set as $\Delta\phi$, whereupon an interference check is performed while $\phi$ is increased intermittently by a pitch of a further smaller value $\Delta\phi$ (steps S2312 and S2313).

Thus when retrieval is performed to a predetermined degree of precision (step S2314), a non-contact posture is thereby determined (step S2315).

Also when it is judged at step S2307 that no interference is present, the same processes as those of steps S2310 through S2314 so that a non-contact posture of the driven part P2. When it is judged at step S2307 that no interference is present, $\phi$ is increased by $\Delta\phi$ in a step corresponding to step S2310, and $\phi$ is decreased by $\Delta\phi$ in a step corresponding to step S2313.

FIG. 64 are flow diagrams illustrating a non-contact posture retrieving routine, which is to be executed by step S2202 of the cam-relation retrieving routine of FIG. 62, for retrieving a non-contact posture of the driven part. The routine of FIG. 64 is a routine to be executed when gravity or resiliency of a spring acts on the driven part. The direction in which gravity or resiliency of a spring acts on the driven part is previously set; in FIG. 64, a force is exerted in a negative direction.

In the routine of FIG. 64, first of all, at step S2401, the current posture $\phi$ of the driven part is set to $\phi_0$, and the count value n of a counter is set to an initial value 0.

At step S2402, it is discriminated whether or not the driving part and the driven part currently interfere with each other. If an interference has occurred, the procedure goes to step S2403 where the count value n is increased by 1. In this case, since the interference of the driven part is due to the current posture change of the driving part, the posture of the driven part is changed against gravity or the resiliency of a spring (steps S2404 through S2407). After the posture being devoid of interference is found, $\Delta\phi$ is subtracted from $\phi$ to temporarily restore the interfered posture (step S2408) The processes of steps S2403 through S2408 of FIG. 64 respectively correspond to those of steps S2303 through S2305, S2308, S2309, and S2310 of FIG. 63.

Otherwise if it is judged at step S2402 that no interference is present, the procedure goes to step S2409 where the count value n is increased by 1. In this case, since the posture of the driven part has changed off the interference is due to the current posture change of the driving part, the action of gravity or resiliency of a spring is simulated to fine a status in which the driven (passive) part has interfered the driving (positive) part (steps S2410 through S2413). The processes of steps S2409 through S2413 of FIG. 64 respectively correspond to those of steps S2303 and S2306 through S2309 of FIG. 63.

When the procedure goes forward to step S2414 from step S2408 or S2411, the bare interference has occurred in $\Delta\phi$. Consequently, by dividing $\Delta\phi$ by a suitable integer N and setting the result of division as $\Delta\phi$ so that $\Delta\phi$ is set to a smaller value as previous. After that, a non-interference posture is retrieved while φ is increased intermittently by a pitch of Δφ (steps S2415 and S2416).

At step S2417, it is discriminated whether retrieval has been performed to a predetermined degree of precision. If the resulting degree of precision is still inadequate, the procedure goes to step S2408 where Δφ is subtracted from φ to restore the interfered posture, and then forward to step S2414 where Δφ is divided by an integer N and the result of division is set as Δφ so that Δφ is set to a smaller value as previous for repeating the retrieval.

Thus when the retrieval has been performed to a predetermined degree of precision (step S2414), a non-contact position is determined (step S2418). The processes of steps S2408, S2414 through S2418 of FIG. 64 respectively correspond to those of steps S2310 through S2315 of FIG. 63.

It is thereby possible to determine the cam relationship, irrespective of whether or not gravity or the resiliency of a spring acts in the driven (passive) part.

Figure 65A:
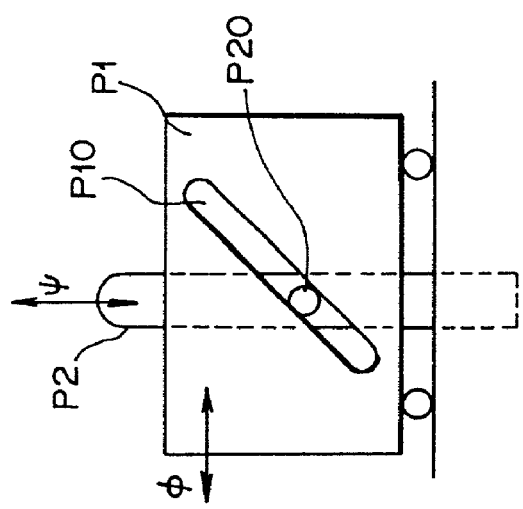
FIGS. 65A through 65C are diagrams illustrating how to set a groove-pin relationship between a groove formed in a driving member and a pin projecting from a driven member and inserted in the groove.
Figure 65B:
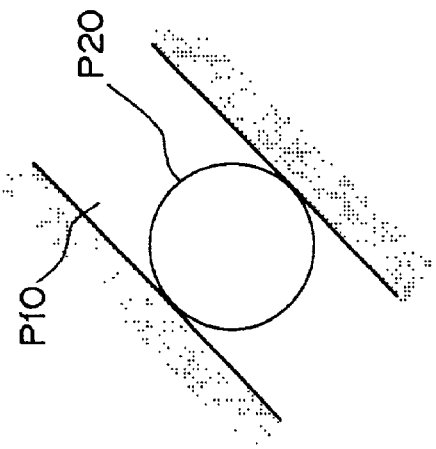
Figure 65C:
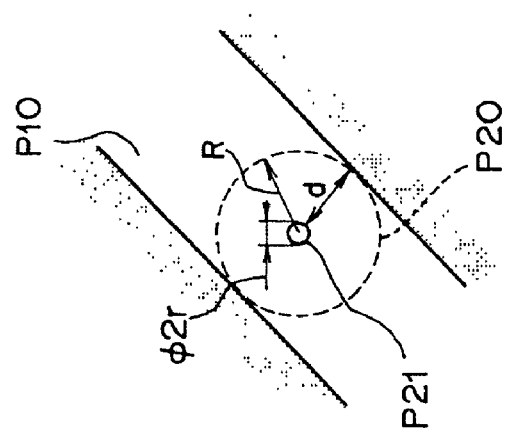

FIGS. 65A through 65C are diagrams illustrating how to set a groove-pin relationship between a groove P10 formed in a driving member P1 and a pin P20 projecting from a driven member P2 and inserted in the groove P10. FIGS. 65B and 65C are fragmentary, enlarged views of FIG. 65A.

When the groove-pin relationship of FIGS. 65A and 65B is set, the pin P20 is normally in contact with the groove P10. Therefore, a non-interference position cannot be obtained, and such groove-pin relationship is difficult to obtain using the above-mentioned cam-relation retrieving method.

Consequently, as shown in FIG. 65C, for obtaining the groove-pin relationship, a very small cylindrical tube P21 having a radius r is temporarily attached centrally to the pin P20, and a distance d between the very small cylindrical tube P21 and the groove P10 is measured. Namely, at steps S2302, S2305, S2307 and S2312 of FIG. 63, discrimination on "d<R−r?" is performed instead of discrimination on "interference is present?", so that the groove-pin relationship can be retrieved.

How to simulate various kinds of mechanisms (such as roller, ratchet, motor, sensor) on the 3D model simulator 30 of the present embodiment will now be described with reference to FIGS. 66 through 82.

Figure 66:
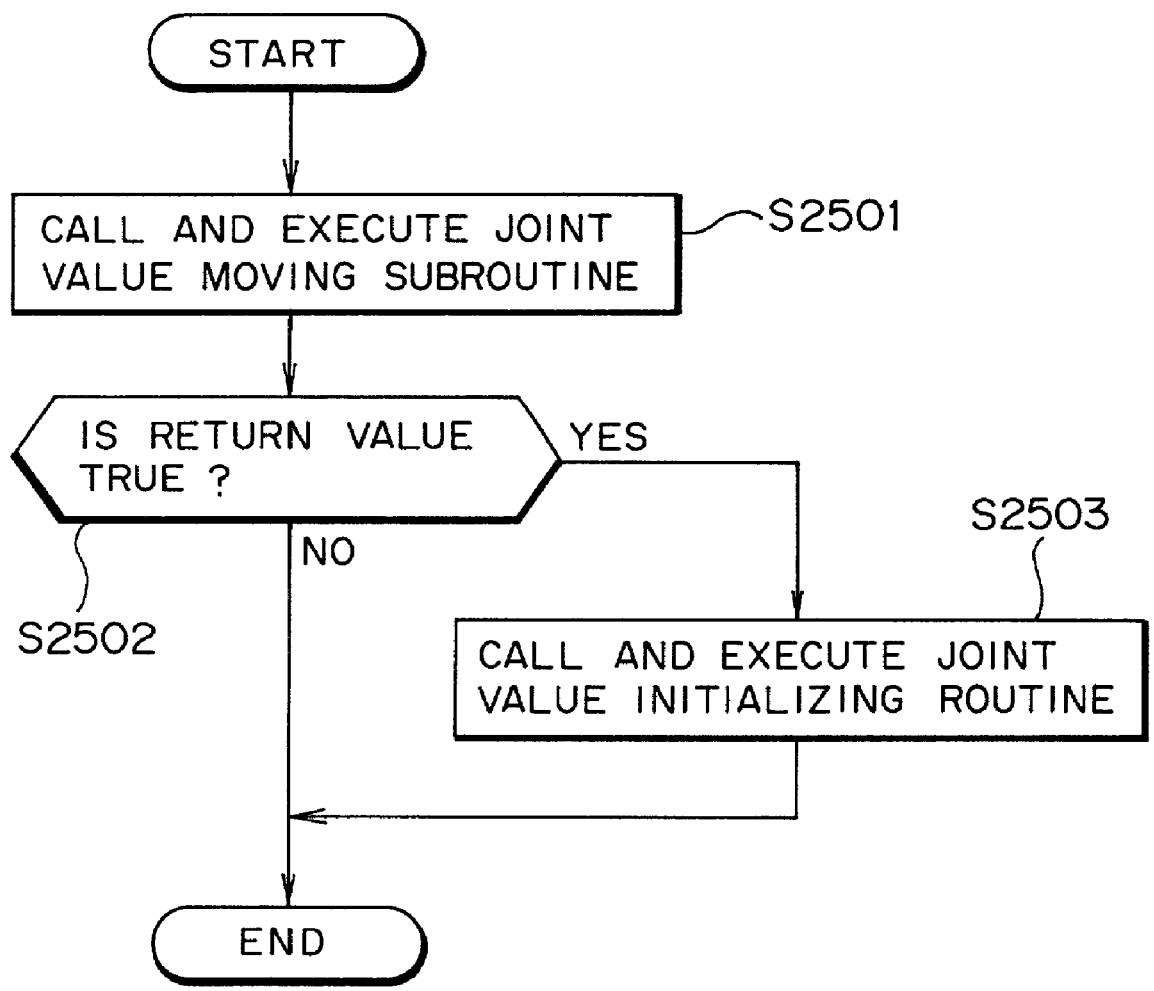
FIG. 66 is a flow diagram illustrating a link posture varying routine if the mechanism includes gears and a roller as links.
Figure 67:
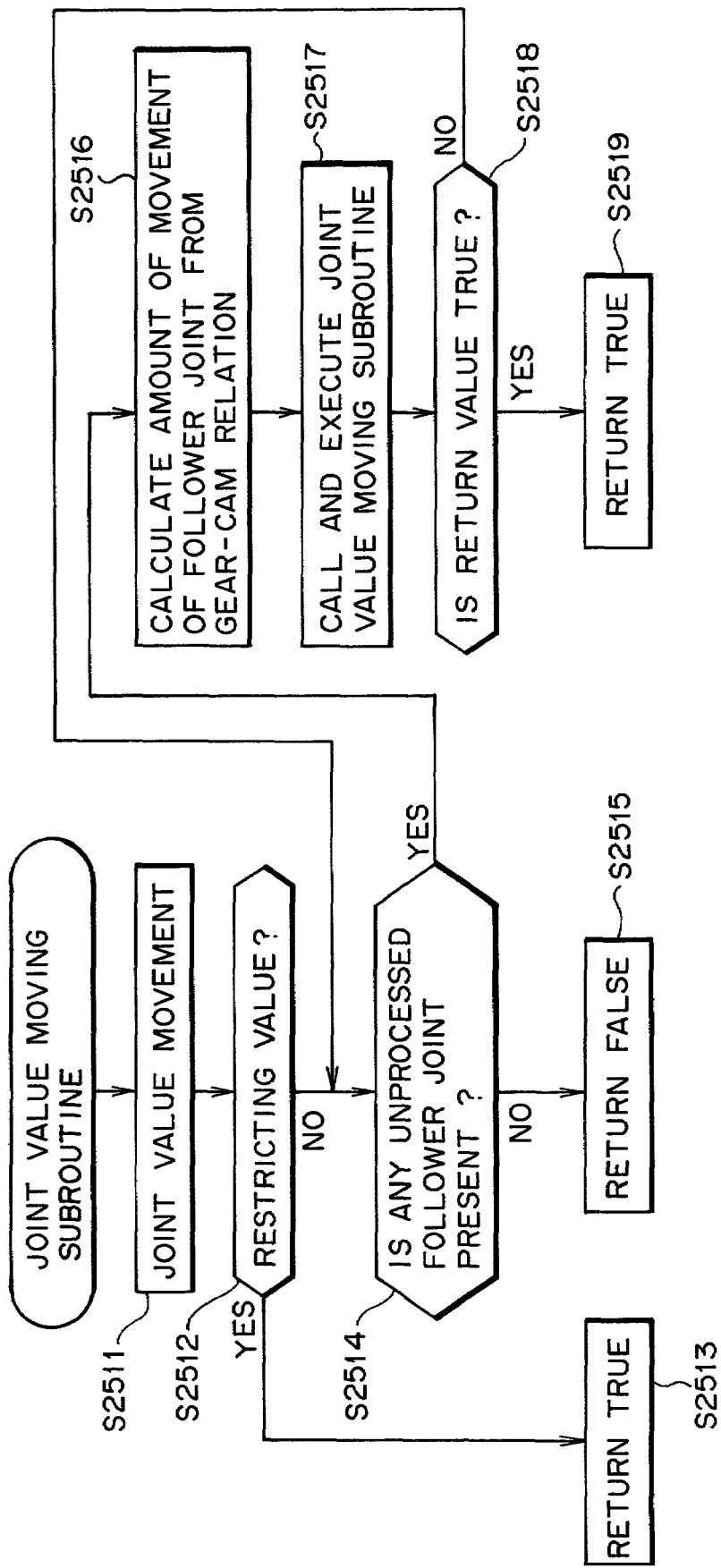
FIG. 67 is a flow diagram illustrating a joint value moving subroutine.
Figure 68:
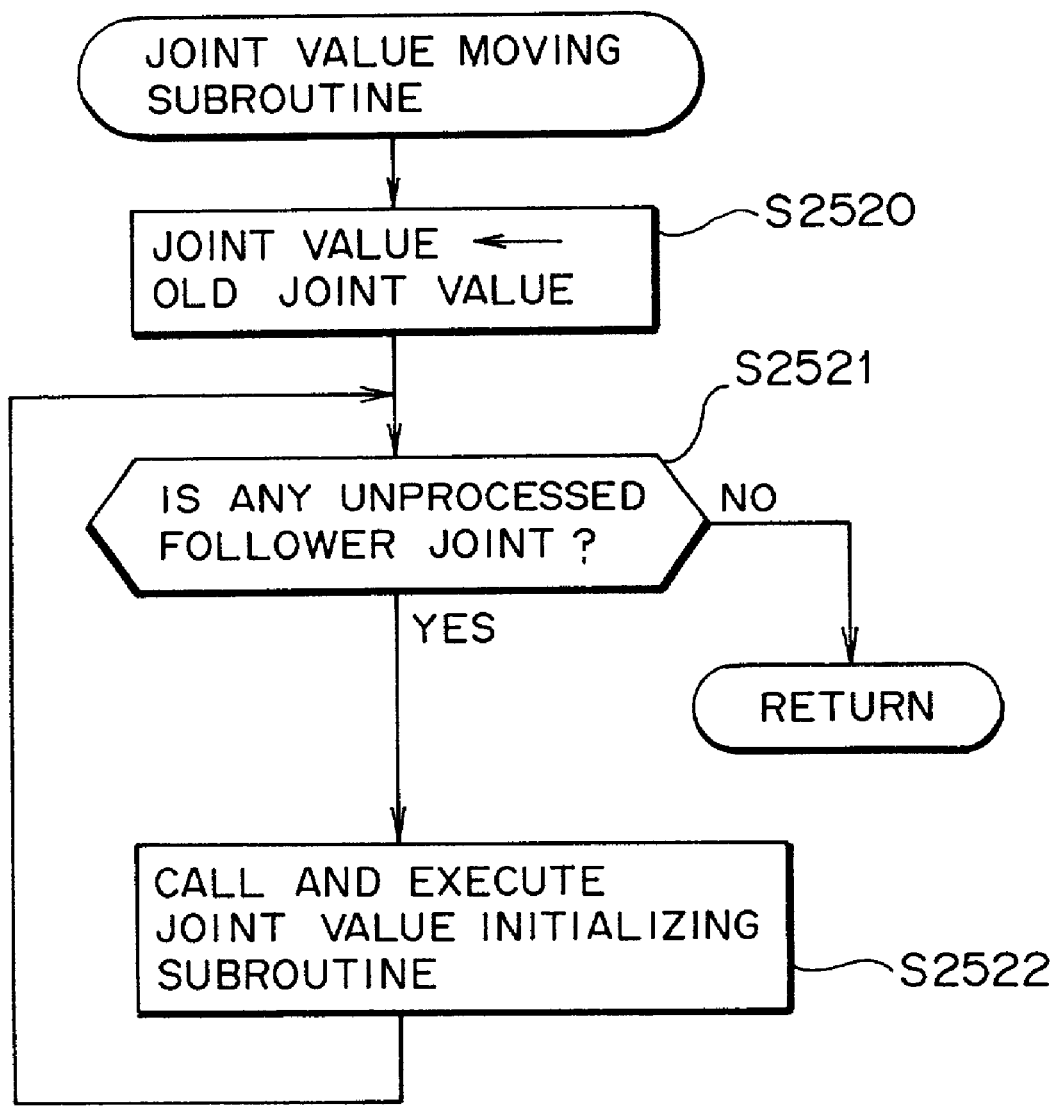
FIG. 68 is a flow diagram illustrating a joint value initializing subroutine.

FIG. 66 is a flow diagram illustrating a link posture varying routine if the mechanism includes gears and a roller as links. The routine of FIG. 66 corresponds to a link posture varying subroutine (FIG. 47) to be executed by the above-mentioned motor processing routine (step S1107 of FIG. 46). FIG. 67 is a flow diagram illustrating a joint value moving subroutine, and FIG. 68 is a flow diagram illustrating a-joint value initializing subroutine. The link(s) will hereinafter also called "the joint(s)".

Here, a roller is one of various function of a gear. In the following routine, as shown in flow diagram of FIGS. 66 through 68, by reflectively calling and executing the joint value moving subroutine of FIG. 67, follower joints (passive joints), which move depending on the movement of a current joint is moved. During this moving, if one of the follower joints has reached a restricting value, the joint value initializing subroutine of FIG. 68 is reflectively called and executed in order that the joint value restores a preset initial value.

As shown in FIG. 66, if this routine is called in response to the link posture movement (e.g., the posture movement of the motor link), the joint value moving subroutine of FIG. 67 is called and executed in order to move the current joint in response to the movement of the motor link (step S2501). Then it is discriminated whether or not a return value from the joint value moving subroutine at step S2501 is "TRUE" (step S2502). If the return value is "TRUE" (YES route), the joint value initializing subroutine of FIG. 68 is called or executed for the current joint (step S2503), whereupon the procedure of this routine is terminated. If it is judged at step S2502 that the return value is not "TRUE" (NO route), the procedure of this routine is terminated without advancing to another step.

In the joint value moving subroutine, as shown in FIG. 67, after the joint value moving is performed (step S2511), it is discriminated whether or not the joint value has reached a restricting value (step S2512). If it has reached the restricting value (YES route), "TRUE" is output as the return value (step S2513). Otherwise if it has not reached the restricting value (NO route), it is discriminated whether or not an unprocessed follower joint is present (step S2514). If no unprocessed follower joint is present (NO route), "FALSE" is output as the return value (step S2515).

Otherwise if it is judged at step S2514 that an unprocessed follower joint is present (YES route), the amount of movement of the follower joint is calculated from the gear, cam relationship (step S2516), whereupon the joint value moving subroutine is called and executed for the follower joint (step S2517). Then it is discriminated whether or not the return value from the subroutine executed at the step S2517 is "TRUE" (step S2518). If the return value is "TRUE" (YES route), "TRUE" is output as the return value (step S2519). Otherwise if it is judged that the return value is not "TRUE" (NO route), the procedure returns to step S2514.

In the joint value initializing subroutine, as shown in FIG. 68, after the previous joint value is set as the joint value (step S2520), it is discriminated whether or not an unprocessed follower joint is present (step S2521). If no unprocessed follower joint is present (NO route), the procedure returns to the step where this joint value initializing subroutine was called. Otherwise if an unprocessed follower joint is present (YES route), the joint value initializing subroutine is called and executed for the follower joint (step S2522), whereupon the procedure returns to step S2521.

Figure 69A:
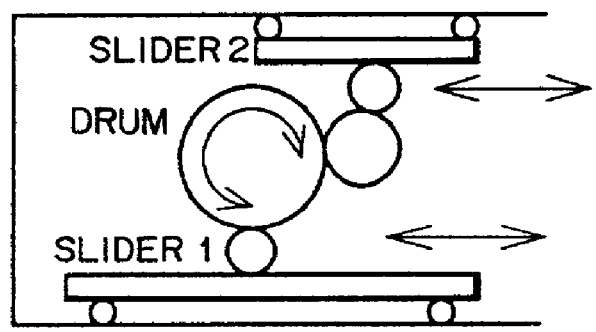
FIGS. 69A through 69C are diagrams illustrating the motions of the gears and roller.
Figure 69B:
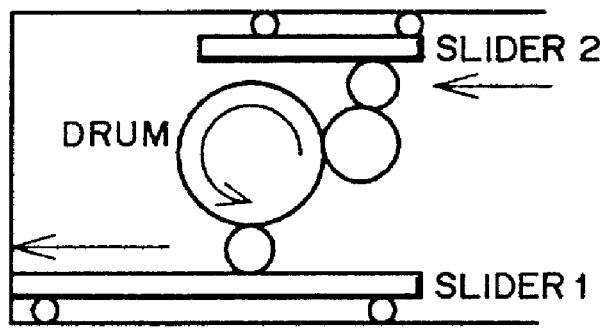
Figure 69C:
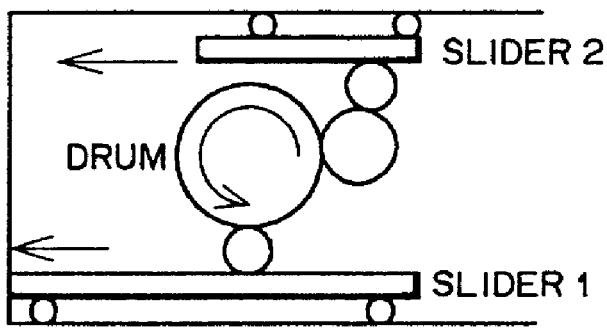

FIGS. 69A through 69C are diagrams illustrating the motions of the gears and roller.

Here, as shown in FIG. 69A, when a drum, as a driving part, is rotated, the driving force is transmitted to two sliders 1 and 2, as follower parts (passive parts); a mechanism for moving these sliders 1 and 2 horizontally will now be described.

Assume that the mechanism of FIG. 69A is composed of gears, as shown in FIG. 69B, when the left end of the slider 1 hits a left wall surface in response to the counterclockwise rotation of the drum (namely, when the slider 1 has reached a restricting value), the drum or slider 2 will make no further movement.

In the mechanism of FIG. 69A, assume that the gear between the drum and the slider 1 is a roller which allows a slip. Even if the slider 1 has become unable to move as reached a restricting value, as shown in FIG. 69C, the drum continues rotating counterclockwise while the slider 2 is still horizontally moving leftwardly.

Figure 70:
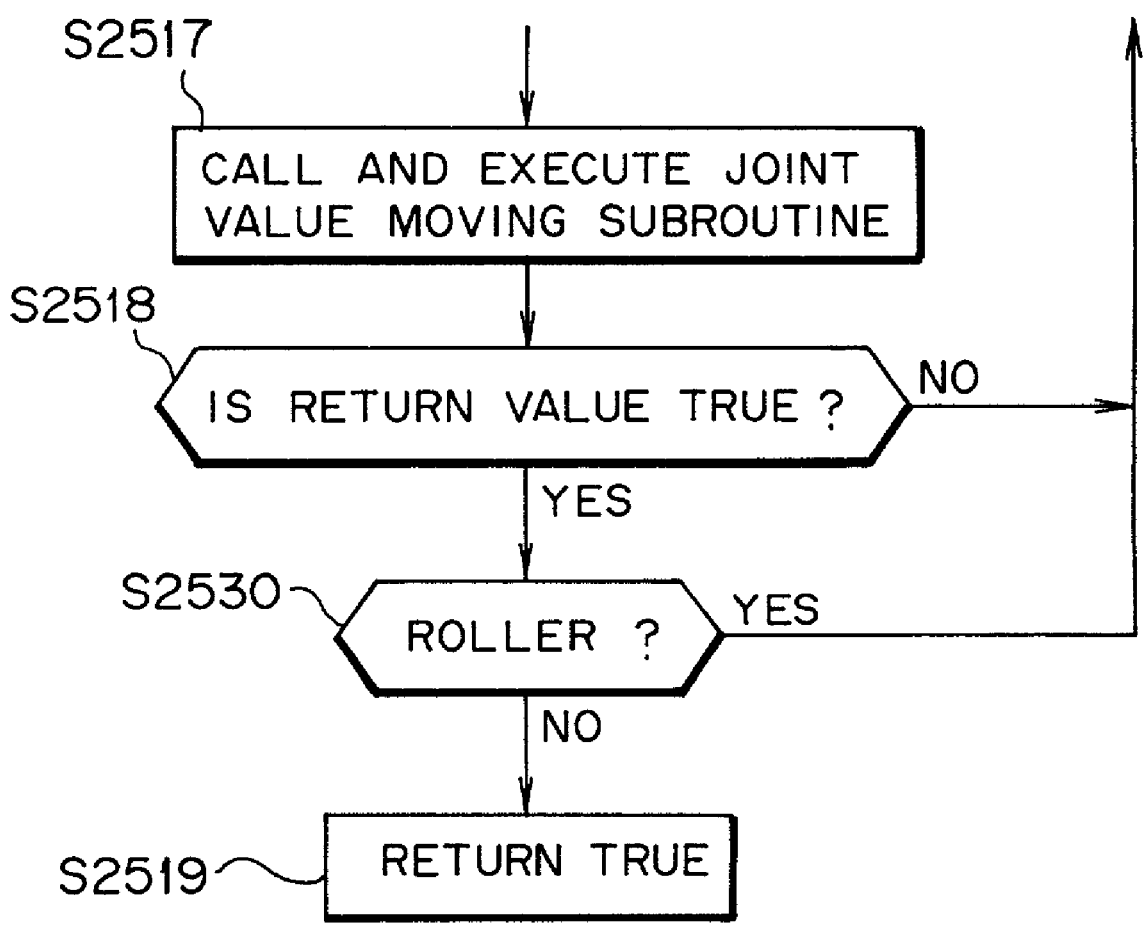
FIG. 70 is a flow diagram illustrating a modified portion of the joint value moving subroutine if the mechanism includes a roller as a link.

FIG. 70 is a flow diagram illustrating a modified portion of the joint moving subroutine if the mechanism includes a roller as a link.

In simulating this roller on the 3D model simulator 30, as shown in FIG. 70, step S2530 of discriminating whether or not the follower joint is a roller is added between step S2518 and step S2519 of FIG. 67. If it is a roller (YES route), the procedure returns to step S2514. Otherwise if it is not a roller (NO route), the procedure goes forward to step S2519. Namely, it is checked whether or not the follower joint to be processed is a roller; if it is a roller, the restricting value process is performed, and then restricting value information is prevented from flowing upstream of the follower joint.

How to simulate a ratchet on the 3D model simulator 30 will now be described in brief.

The ratchet, like a pulley or a ratchet trench of a bicycle, transmits a power force in a direction designated by the user, and does not transmit a driving force in a direction opposite to the designated direction.

The ratchet is simulated on the 3D model simulator 30 in the same manner as the clutch simulating method described above in connection with FIG. 47. If the mechanism to be simulated has a ratchet; when the direction of moving the driving part being a ratchet is the user's designated direction, the driving force is transmitted to execute the moving process (joint value moving process) for the passive part. And otherwise when it is a direction opposite to the user's designated direction, the driving force is not transmitted.

Figure 72:
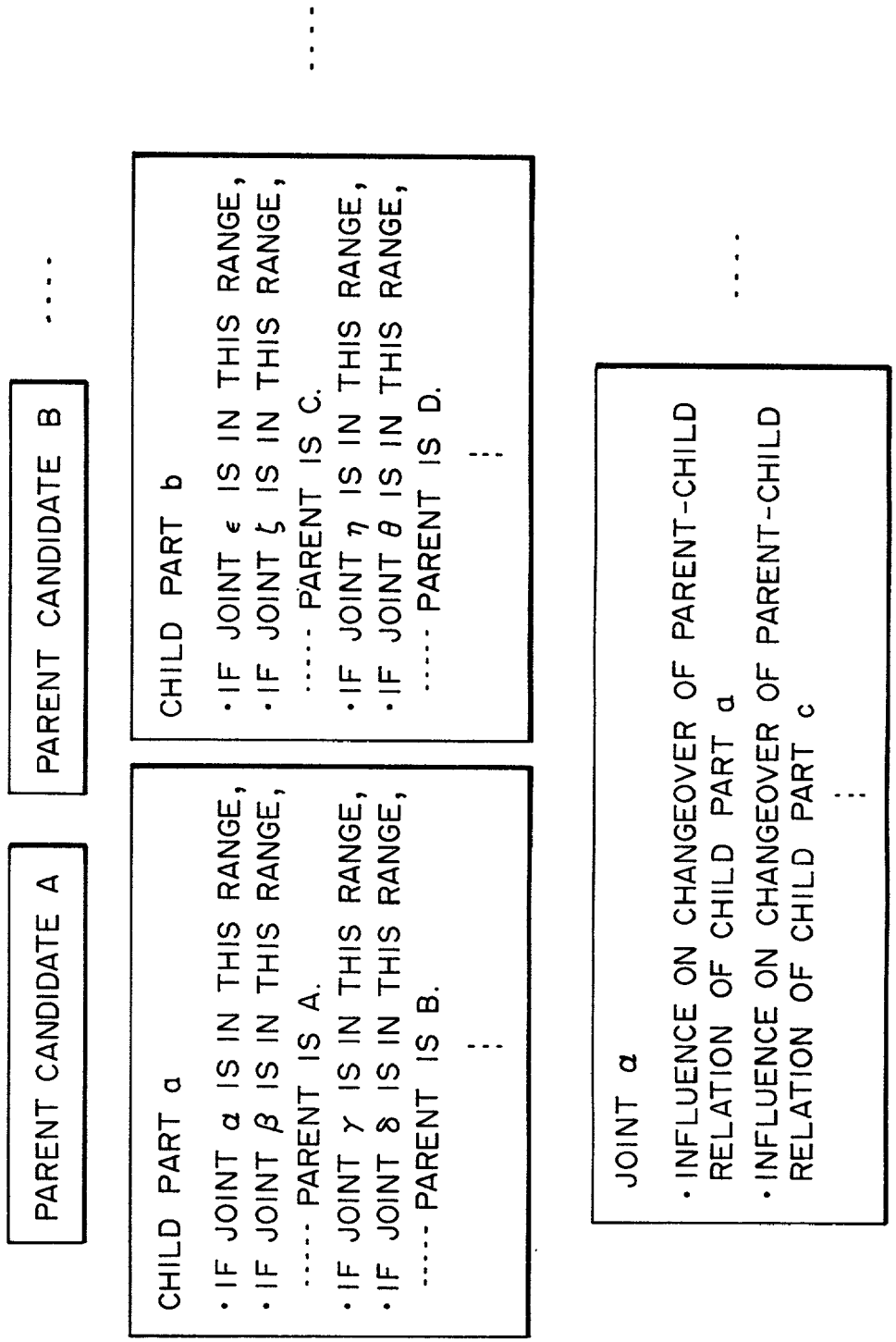
FIG. 72 is a diagram showing a parent-child relationship changeover information to be assigned to the individual links.
Figure 73:
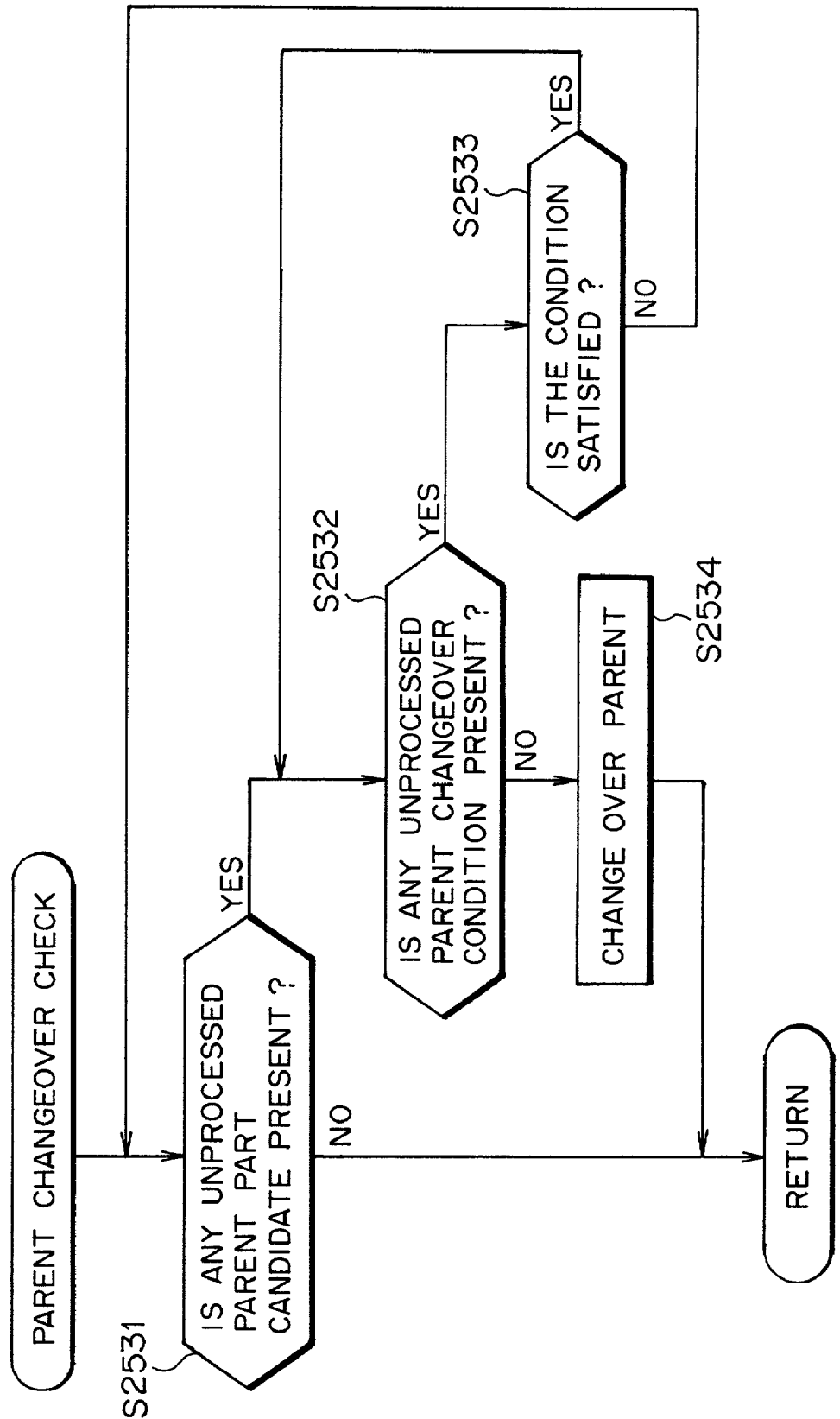
FIG. 73 is a flow diagram illustrating a parent changeover check subroutine.

FIGS. 71A through 71F are diagrams illustrating an elevator as a mechanism model, and a tree-structure link constituting the elevator, FIG. 72 is a diagram showing a parent-child relationship changeover information to be assigned to the individual links, and FIG. 73 is a flow diagram illustrating a parent changeover check subroutine.

The individual links (joints) constituting a mechanism model are generally connected in a tree form. When an arbitrary link is moved children of the link are all moved in the same way. In this data structure, it is difficult to express an elevator of FIGS. 71A through 71F. Consequently, in the present embodiment, like the case of clutch, a function of changing over the parent by any condition (e.g., a third joint value) is added.

The elevator of FIGS. 71A through 71C moves a horizontally movable car C between two bases B, B of different heights using a vertically movable table T. The elevator whose posture is shown in FIG. 71A is expressed in a tree structure in which the car C and the table T are children of the base B as shown in FIG. 7D. The elevator whose posture is shown in FIG. 71B is expressed in a three structure in which the car C is a child of the base B while the table T is a child of the base B as shown in FIG. 71E. And the elevator whose posture is shown in FIG. 71C is expressed in a three structure in which the car C and the table T are children of the base B as shown in FIG. 71F.

For simulating a mechanism (such as an elevator) in which a parent-child relationship is changed over, parent-child-relationship changeover information such as shown in FIG. 72 is previously assigned to the individual link (joint), and subsequently in simulation on the 3D model simulator 30 as the joint value is changed (after the joint value is moved), the parent is recalculated and changed over, based on the information of FIG. 72, for a particular child part that is possibly influenced in parent-child relationship due to the change of the joint value.

For example, after the joint value movement is performed at step S2511 of FIG. 67, it is discriminated whether or not a parent-child changeover part is present. If a parent-child changeover part is present, a parent changeover check subroutine of FIG. 73 is called and executed.

As shown in FIG. 73, in the parent changeover check subroutine, first of all, it is discriminated whether or not an unprocessed parent part candidate is present (step S2531). If no unprocessed parent part candidate is present (NO route), it is discriminated whether or not an processed, parent changeover condition is present (step S2532).

If such an unprocessed condition is present (YES route of step S2532), it is discriminated whether or not the condition is satisfied (step S2533). If it is satisfied (YES route), he procedure returns to step S2532. Otherwise if it is not satisfied (NO route), the procedure return to step S2531. And if it is judged at step S2532 that no unprocessed condition is present (NO route), parent changeover is performed (step S2534), whereupon the processes of this subroutine are terminated.

How to simulate a relative clutch on the 3D model simulator 30 will now be described in brief.

A clutch plays a key role in determining the on/off status of power transmission of a gear-cam relationship by any condition (e.g., a joint value of a third joint). A relative clutch plays a key role in determining the on/off status of power transmission of a gear-cam relationship by relative positions of arbitrary two parts, realizing a placement mechanism using the parent-child changeover.

In ordinary simulation, it is checked as to "whether the position of a clutch part is in the on position" (step S1204 of FIG. 47). In relative clutch simulation, it is checked as to "whether a part B is in the on position with respect to (as viewed from) a part A" with all the remaining processes being identical with those of ordinary simulation.

The position of the part B as viewed from the part a can be obtained from $R_A^{-1}(P_A-P_B)$ where RA is a matrix angularly moved from the absolute coordinates of local coordinates of the part A, and $P_A$ and $P_B$ are the respective positions of the parts A and B as viewed from the absolute coordinates.

Figure 74:
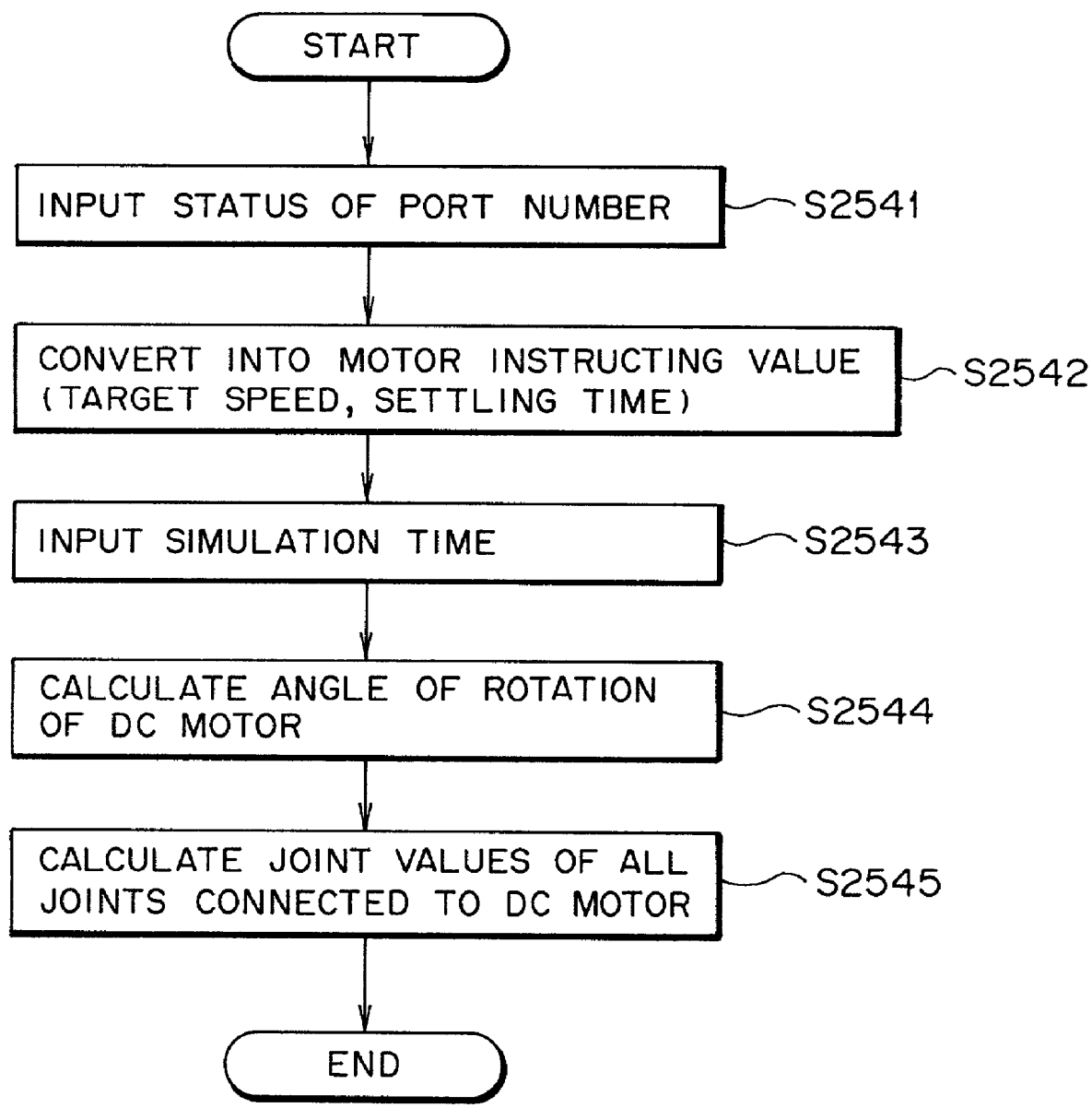
FIG. 74 is a flow diagram illustrating the simulation procedure of a DC motor.

How to simulate a DC motor on the 3D model simulator 30 will now be described with reference to FIGS. 74 and 75. FIG. 74 is a flow diagram illustrating the simulation procedure of a DC motor, and FIG. 75 is a table showing input values of the DC motor and motor instruction values in correspondence with one another.

For simulating a DC motor, a correlation between input values of the DC motor and motor instructing values are previously registered as a table such as shown in FIG. 75. This table is similar to the table described above in connection with FIG. 26, except that correlation of values (actuator instructing signals) to be input to two ports (port numbers 11, 12) of the DC motor with target speeds (deg/sec) and settling times (msec).

With the table of FIG. 75, if 0 and 1 are input to the ports 11, 12, respectively, the target speed +100 deg/sec and the settling time 500 sec are output as motor instructing values. And if 0 and 1 are input to the ports 11, 12, respectively, the target speed −100 deg/sec and the settling time 500 sec are output as motor instructing values.

This table is set and registered, whereupon simulation of the DC motor is performed on the 3D model simulator 30 in accordance to the procedure of FIG. 74. Namely, actuator instructing signals from the embedded software developing section 40 are recognized as respective status input of the port numbers (step S2541), and then the input values are converted into motor instructing values (target speed and settling time) (step S2542).

Then, the already calculated current simulation time Ts (=Δt) is input (step S2543) to calculate an angle of rotation of the DC motor from the current simulation time Ts (=Δt) (step S2544). In this specification, the term "rotation" is defined to read on not only "moving through 360 degrees or more about the axis" but also "turning through less than 360 degrees about the axis". At that time, though the angle of rotation can be calculated as by (the target speed X the simulation time), it can alternatively calculated using the equation (4) as mentioned above, if the total simulation time from the inputting of the motor instructing values is equal to or less than the settling time. Subsequently the joint values of all the joints (links) connected to the DC motor are calculated to complete the processes (step S2545).

Figure 76:
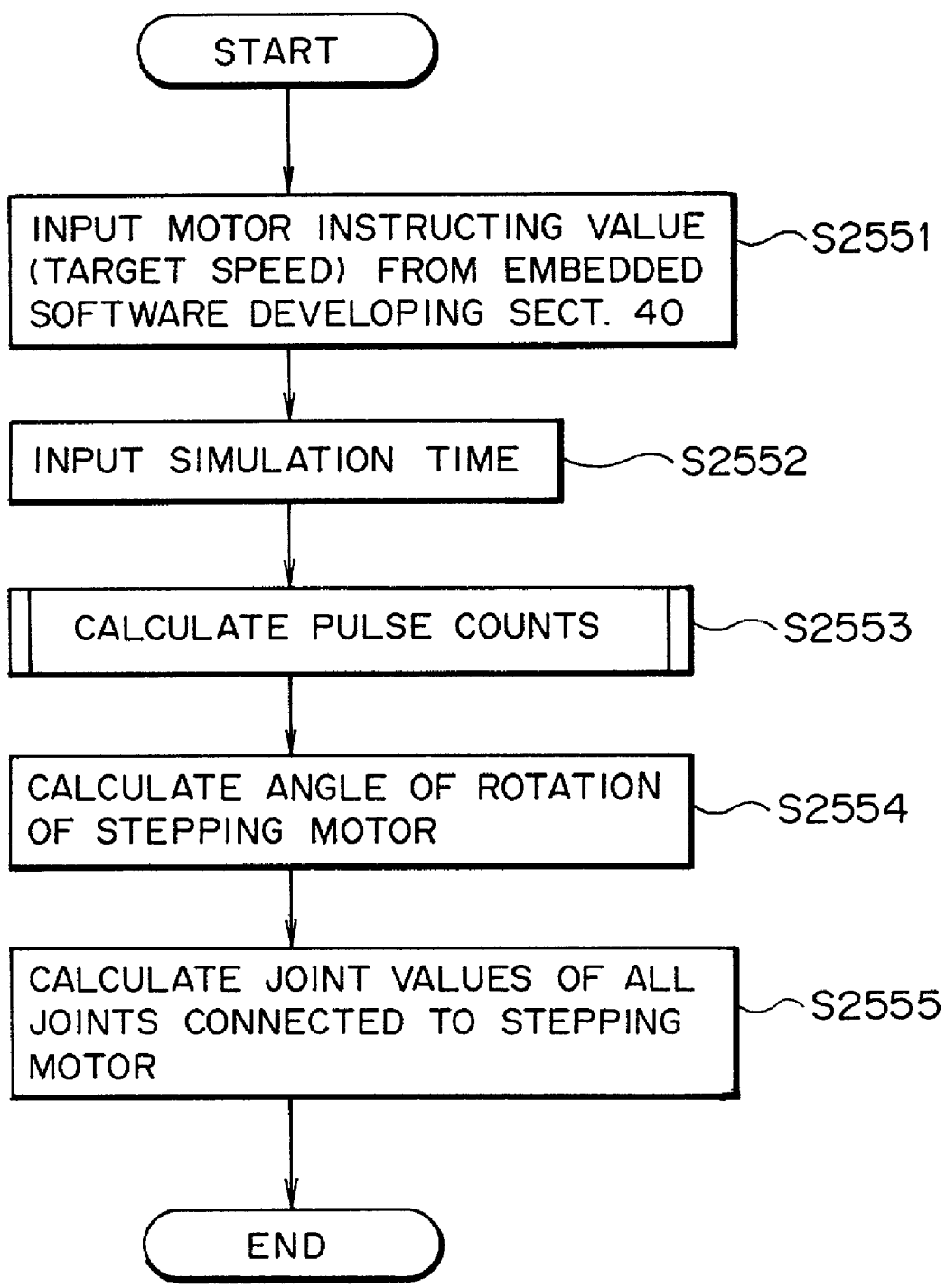
FIG. 76 is a flow diagram illustrating the simulation procedure of a stepping motor.

How to simulate a stepping motor on the 3D model simulator 30 will now be described with reference to FIGS. 76 through 78. FIG. 76 is a flow diagram illustrating the simulation procedure of a stepping motor, FIG. 77 is a diagram illustrating an accelerating pattern of the stepping motor, and FIG. 78 is a flow diagram illustrating a pulse counts calculating subroutine.

Figure 77:
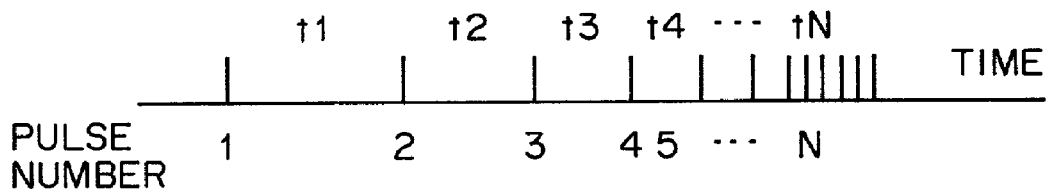
FIG. 77 is a diagram illustrating an accelerating pattern of the stepping motor.
Figure 78:
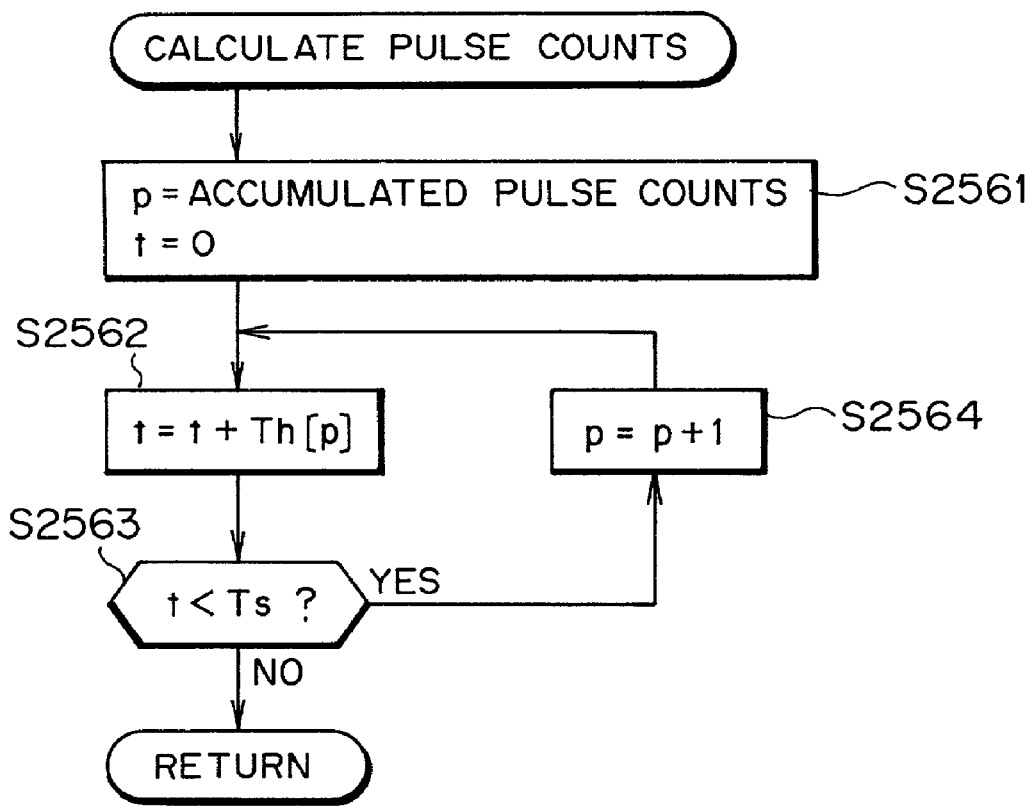
FIG. 78 is a flow diagram illustrating a pulse counts calculating subroutine.

For simulating a stepping motor, as shown in FIG. 77, an acceleration pattern Th (N) of the stepping motor is in advance registered in terms of ti, which is a time interval of an i-th pulse from the start of the acceleration.

With this acceleration pattern Th (N) registered, simulation of the stepping motor is performed on the 3D model simulator 30 in accordance with the procedure of FIG. 76. Namely, from the embedded software developing section 40, not only the motor instructing value (target speed), as an actor instructing signal) but also the already calculated current simulation time Ts (=Δt) is input (steps S2551 and S2552) to obtain the number of pulses output to the stepping motor within the current simulation time Ts (=Δt) in accordance with the pulse counts calculating subroutine of FIG. 78 (step S2553).

Then based on the pulse counts calculated at step S2553, the angle of rotation of the stepping motor is calculated (step S2554), and the joint values of all the joints (links) connected to the stepping motor is calculated to complete the processes (step S2555).

In the pulse count calculating subroutine, as shown in FIG. 78, first of all, the number of accumulated pulses is set as a pulse count p, and 0 is set as the simulation time t (step S2561), and t+Th (p) is set as t (step S2562), whereupon it is discriminated whether or not the resultant time t is smaller than the simulation time Ts (step S2563) If t<Ta (YES route), p+1 is set as p (step S2564), and the procedure returns to step S2562). If the simulation time t reaches Ts, this pulse counts calculating subroutine is terminated, and as a result, the pulse counts p is output as the result of calculation.

Figure 79:
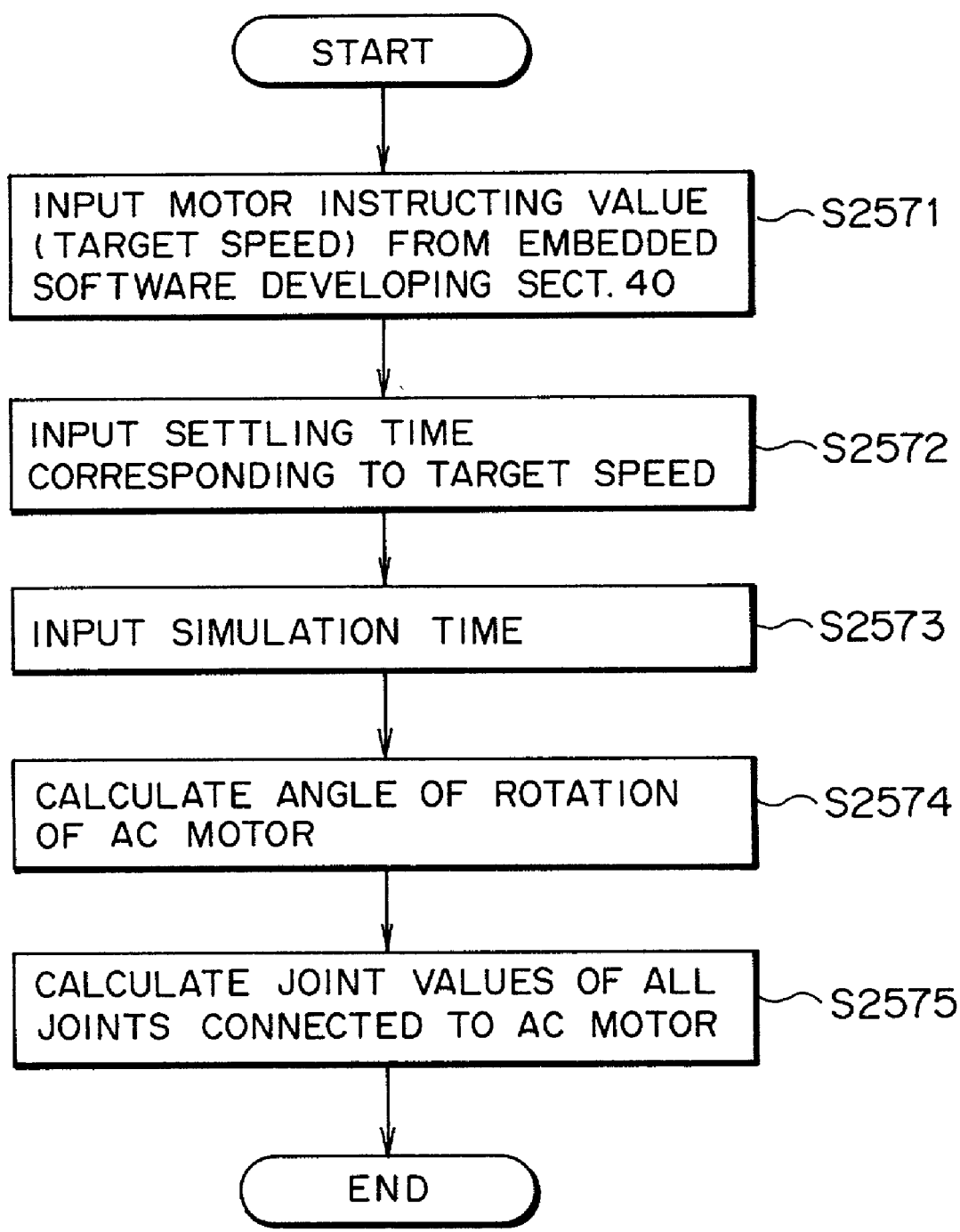
FIG. 79 is a flow diagram illustrating the simulation procedure of an AC motor.

How to simulate an AC motor on the 3D model simulator 30 will now be described with reference to FIG. 79. FIG. 79 is a flow diagram illustrating the simulation procedure of an AC motor.

As shown in FIG. 79, for simulating a stepping motor on the 3D simulator 30, first all, a motor instructing value (target speed) as an actuator instructing signal (step S2571), a settling time corresponding to the target speed (the correlation is previously registered) (steps S2571 and 2572), and the already calculated current simulation time Ts (=Δt) are input (steps S2571, S2572 and S2573), whereupon the angle of rotation of the AC motor for the current simulation time Ts (=Δt) is calculated (step S2574).

At that time, basically the angle of rotation can be calculated by (the target speed X the simulation time), but acceleration is considered in calculation if the total simulation time from the inputting of the motor instructing value is equal to or less than the settling time. Then the joint values of all the joints (links) connected to the AC motor are calculated to complete the processes (step S2575).

Figure 80:
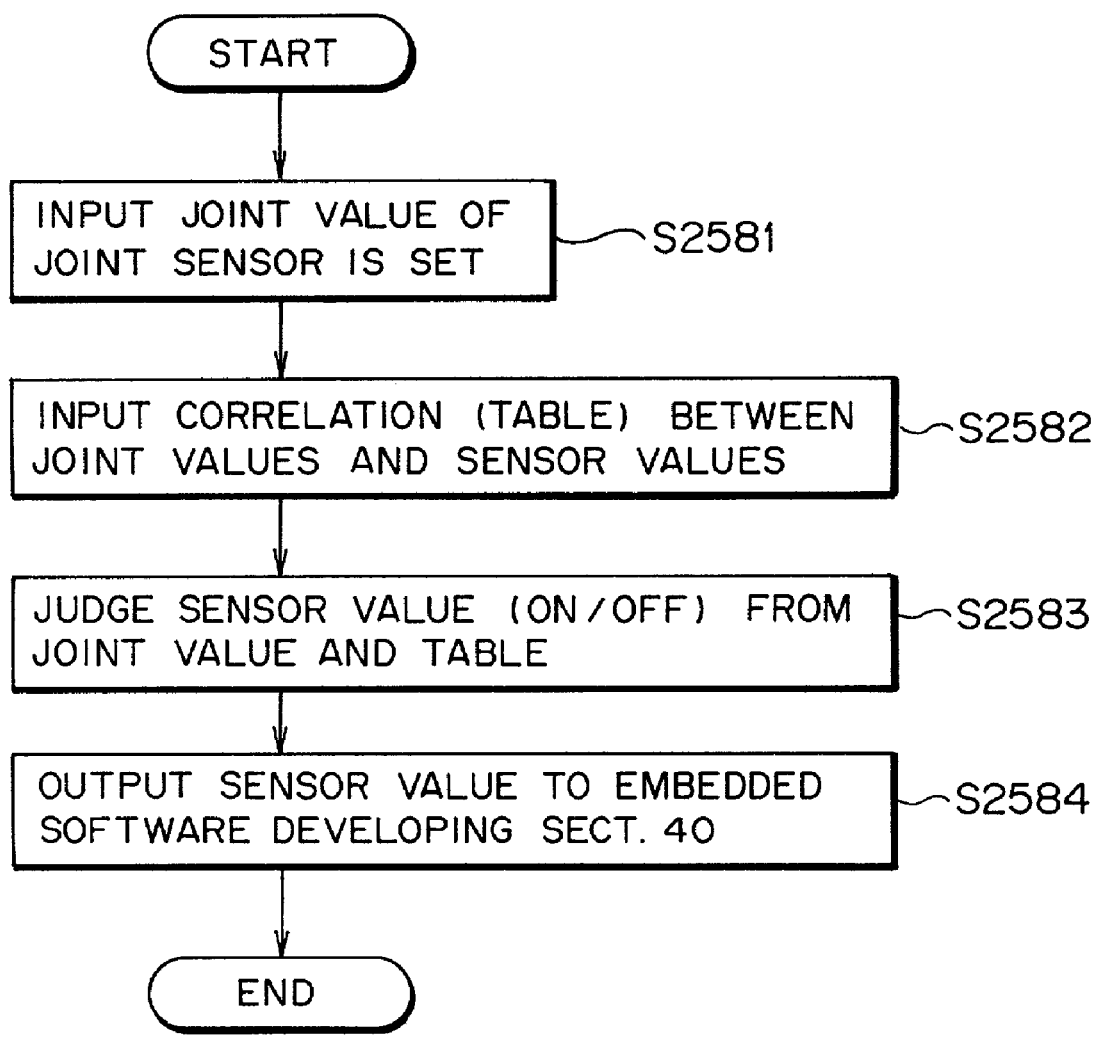
FIG. 80 is a flow diagram illustrating the simulation procedure of a micro switch.

How to simulate a micro switch on the 3D model simulator 30 will now be described with reference to FIG. 80. FIG. 80 is a flow diagram illustrating the simulation procedure of a micro switch.

As shown in FIG. 80, for simulating a micro switch on the 3D model simulator 30, first of all, the joint value of the joint, with the micro switch set as a sensor, and the correlation (table) between the joint value and the sensor value are input (steps S2581 and S2582), whereupon the sensor value (on/off) is judged based on the joint value and the table (step S2583) and is output to the embedded software developing section 40 (step S2584).

Figure 81:
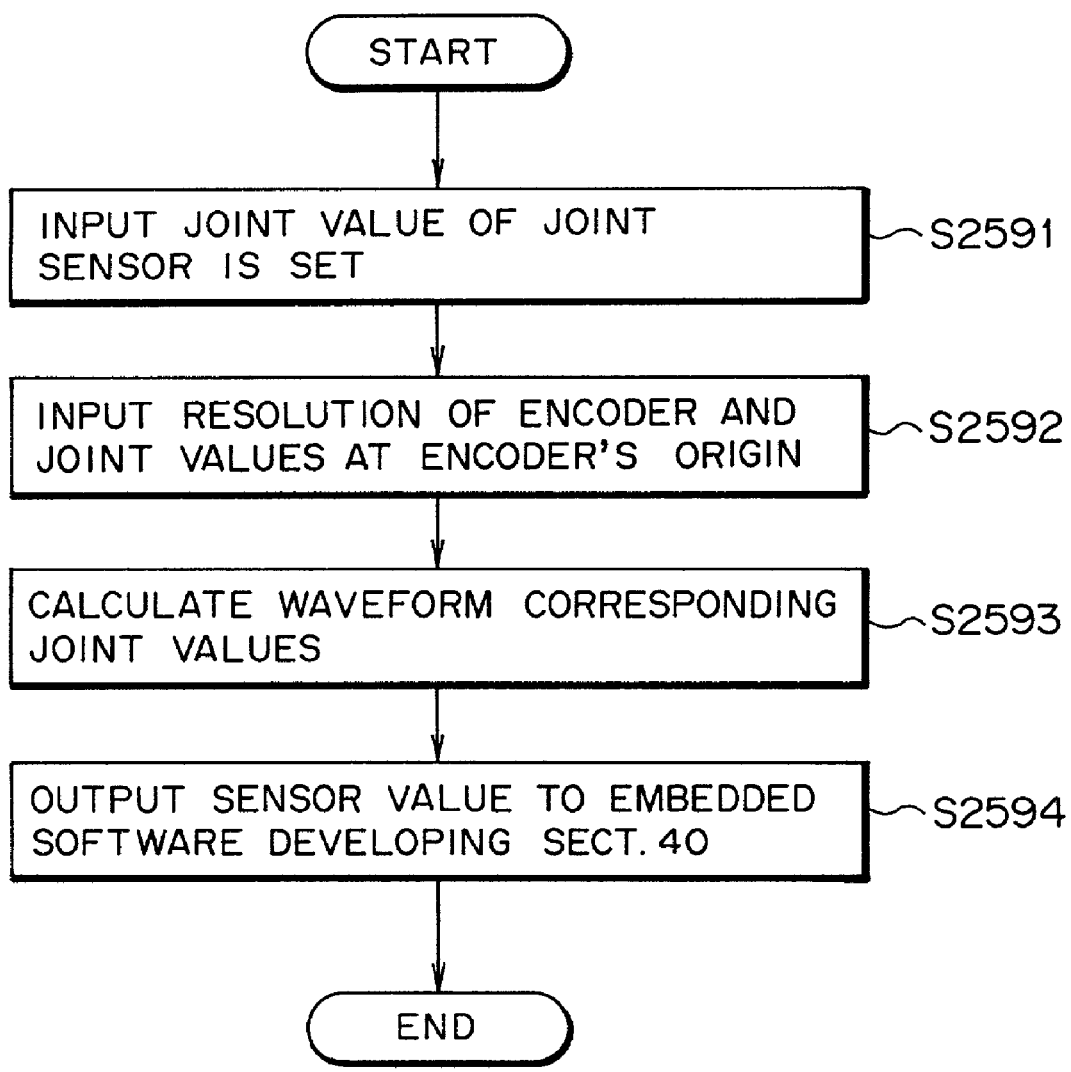
FIG. 81 is a flow diagram illustrating the simulation procedure of an encoder.

How to simulate an encoder on 3D model simulator 30 will now be described with reference to FIG. 81. FIG. 81 is a flow diagram illustrating the simulation procedure of an encoder.

As shown in FIG. 81, for simulating an encoder on the 3D model simulator 30, first of all, the joint value of the joint, with the encoder as a sensor, and the resolution of the encoder and the joint value at the encoder's origin are input (steps S2591 and S2592), whereupon a waveform corresponding to the joint value is calculated to thereby calculate a sensor value corresponding to the joint value (step S2593). Finally the calculated sensor value is output to the embedded software developing section 40 (step S2594).

How to simulate a potentiometer on the 3D model simulator 30 will now be described with reference to FIG. 82. FIG. 82 is a flow diagram illustrating the simulation procedure of a potentiometer.

Figure 82:
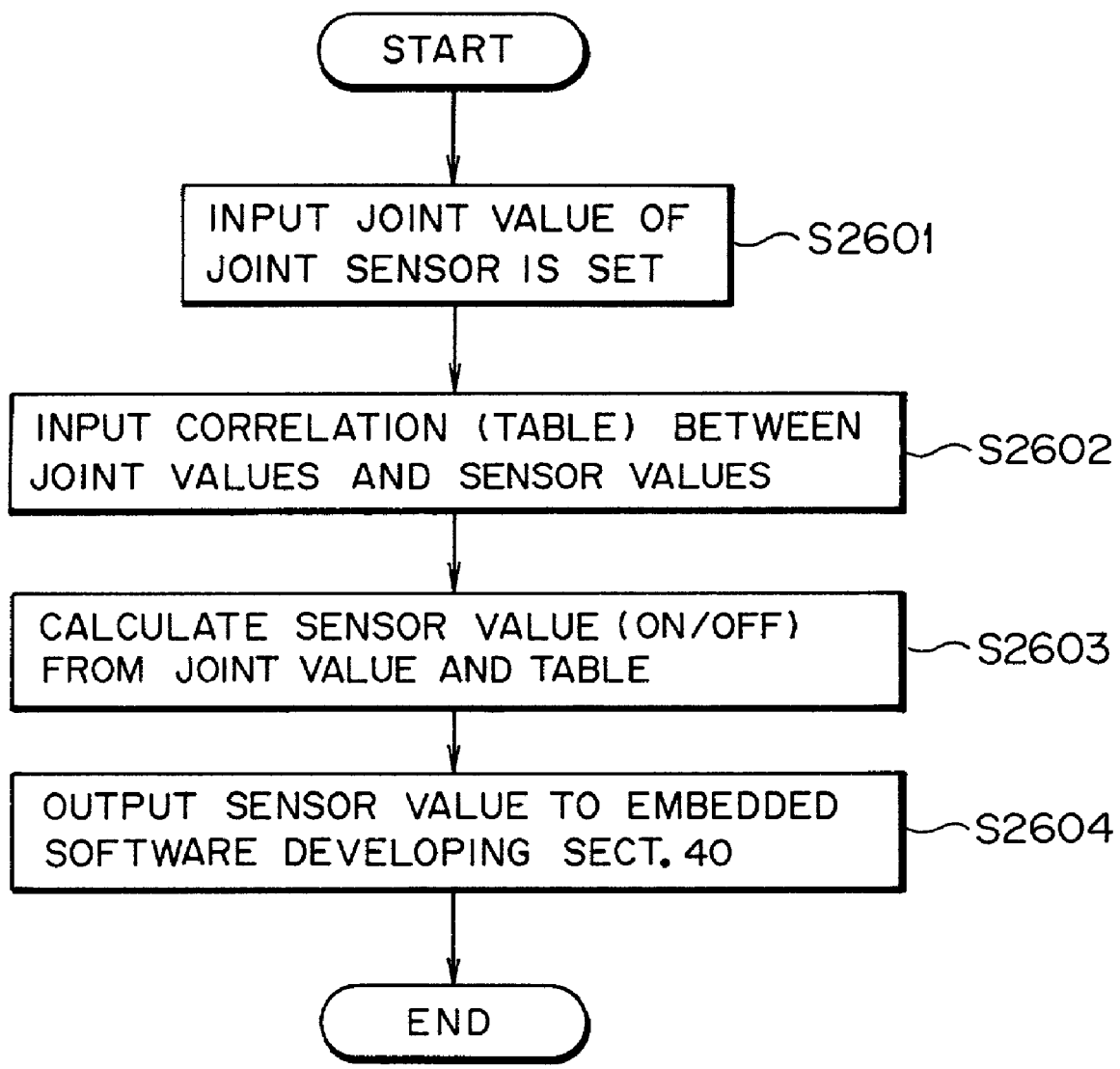
FIG. 82 is a flow diagram illustrating the simulation procedure of a potentiometer.

As shown in FIG. 82, for simulating a potentiometer on 3D model simulator 30, first of all, the joint value of a joint, with the potentiometer as a sensor, and the correlation (table) between the joint value and the sensor value are input (steps S2601 and 2602), whereupon the sensor value is calculated based on the joint value and the table (step S2603). Finally the calculated sensor value is output to the embedded software developing section 40 (step S2604).

Thus according to the support system 10 of the illustrated embodiments of the present invention, by taking the three-dimensional real-time simulator 30 as the pivot section, it is possible not only to progress the developing the embedded software (control program) separately (concurrently) of the designing the mechanism, without making a trial product of the mechanism. Namely, it is possible to concurrently perform designing of the mechanism by the mechanism designing section 20 and developing of the embedded software by the embedded software developing section 40 so that efficient developing of the embedded software and reduction of the developing period (term) and the number of steps can be achieved.

At that time, it is possible to efficiently develop the embedded software in the absence of a trial product of the mechanism, by combining the task control describing method, which is according to the status-transition diagram or table, with the three-dimensional real-time simulator 30.

Further, with the mechanism designing section 20 operatively connected with the three-dimensional real-time simulator 30, if a movable part of the three-dimensional-mechanism model is moved on the simulation without manufacturing a trial product, it is possible to perform the designing of the mechanism while checking whether the prospective mechanism could make an intended motion without any risk that the individual parts would inadvertently contact each other. As a result, the designer can find any problem of design as early as possible and hence can make rearrangement of parts or necessary changes in view of movable parts, requiring only a shortened period (term) of development of products and reducing the cost of production.

Furthermore, given that the microcomputer chip 42 and the three-dimensional real-time simulator 30 are operatively coupled, it is possible to debug a mechanism control program without physically manufacturing a mechanism, which would be some contribution to reducing the developing period (term) of embedded software and hence providing inexpensive products.

The present invention should by no means be limited to the illustrated examples, and various other changes or modifications may be suggested without departing from the gist of the invention.

What is claimed is:

1. A support system, comprising:
   a mechanism designing section for three-dimensionally designing a mechanism composed of a plurality of parts including an actuator and a sensor;
   a three-dimensional-mechanism model simulating section, in which the mechanism is structured as a three-dimensional-mechanism model, for simulating an operation of the mechanism;
   an embedded software developing section for developing a control program, which is to be embedded in the mechanism to control the operation of the mechanism, as embedded software;
   a first interface section for inputting designing data, which is created in said mechanism designing section as a result of the designing by said mechanism designing section, from said mechanism designing section to said three-dimensional-mechanism model simulating section to be reflected on the three-dimensional-mechanism model; and
   a second interface section transferring actuator instruction data and sensor data between said three-dimensional-mechanism model simulating section and said embedded software developing section while synchronizing said three-dimensional-mechanism model simulating section and said embedded software developing section in operation with each other,
   wherein:
      said embedded software developing section includes a status-transition diagram or table creating section for creating and editing a status-transition diagram or table describing specifications of the embedded software to execute detailed designing of the embedded software; and
      said second interface section transfers data between said three-dimensional-mechanism model simulating section and said status-transition diagram or table creating section while synchronizing said three-dimensional-mechanism model simulating section and said status-transition diagram or table creating section in operation with each other.

2. A support system according to claim 1, wherein said first interface section inputs the result of the simulating by said three-dimensional-mechanism model simulating section from said three-dimensional-mechanism model simulating section to said mechanism designing section to be reflected on the designing of the mechanism.

3. A support system according to claim 1, wherein:
   said status-transition diagram or table creating section employs a multi-task, which executes a plurality of tasks in parallel to one another, and executes, separately from the plural tasks, a synchronous task functioning so as to stop the plural tasks during the simulation operation of said three-dimensional-mechanism model simulating section; and
   said second interface section synchronizes said three-dimensional-mechanism model simulating section and said status-transition diagram or table creating section in operation with each other using the synchronous task.

4. A support system according to claim 3, wherein the synchronous task is set to a highest priority to control starting/stopping of the plural tasks in accordance to the synchronous task to thereby synchronize said three-dimensional-mechanism model simulating section and said status-transition diagram or table creating section in operation with each other.

5. A support system according to claim 1, wherein:
   said embedded software developing section includes a microcomputer chip in which said embedded software is embedded during the developing; and
   said second interface section transfers data between said three-dimensional-mechanism model simulating section and said microcomputer chip while synchronizing said three-dimensional-mechanism model simulating section and said microcomputer chip in operation with each other.

6. A support system according to claim 5, wherein:
   said microcomputer chip employs a multi-task, which executes a plurality of tasks in parallel to one another, and executes, separately from the plural tasks, a synchronous task functioning so as to stop the plural tasks during the simulation operation of said three-dimensional-mechanism model simulating section; and
   said second interface section synchronizes said three-dimensional-mechanism model simulating section and said microcomputer chip in operation with each other using the synchronous task.

7. A support system according to claim 6, wherein said three-dimensional-mechanism model simulating section and said microcomputer chip are synchronized in operation with each other by setting the synchronous task to a highest priority to control starting/stopping of the plural tasks in accordance to the synchronous task.

8. A support system according to claim 1, wherein said second interface section transfers:
   an actuator instruction signal for the actuator in the three-dimensional-mechanism model from said embedded software developing section to said three-dimensional-mechanism model simulating section; and
   a sensor signal, which is obtained as the result of simulation in response to said actuator instruction signal, from said three-dimensional-mechanism model simulating section to said embedded software developing section.

9. A support system according to claim 8, further comprising an analyzing section for analyzing and displaying variation of said actuator instruction signal for the actuator and said sensor signal from said three-dimensional-mechanism model simulating section with real time.

10. A computer-readable recording medium in which a support program to realize, on a computer, a function of assisting a development of embedded software to be embedded in a mechanism, composed of a plurality of parts including an actuator and a sensor, as a control program to control the mechanism is recorded, said support program comprising:
    a mechanism designing program for instructing the computer to function as a mechanism designing section which designs the mechanism three-dimensionally;
    a three-dimensional-mechanism model simulating program for instructing the computer to function as a three-dimensional-mechanism model simulating section, in which the mechanism is structured as a three-dimensional-mechanism model, for simulating an operation of the mechanism;

an embedded software developing program for instructing the computer to function as an embedded software developing section which develops the embedded software;

a first interface program for instructing the computer to function as a first interface section for inputting designing data, which is created in said mechanism designing section as the result of a designing by said mechanism designing section, from the mechanism designing section to the three-dimensional-mechanism model simulating section to be reflected on the three-dimensional-mechanism model;

a second interface program for instructing the computer to function as a second interface section which transfers actuator instruction data and sensor data between the three-dimensional-mechanism model simulating section and the embedded software developing section while synchronizing the three-dimensional-mechanism model simulating section and the embedded software developing section in operation with each other, wherein:

said embedded software developing program includes a status-transition diagram or table creating program instructing the computer to function as a status-transition diagram or table creating section for creating and editing a status-transition diagram or table describing specifications of the embedded software to execute detailed designing of the embedded software; and said second interface program transfers data between said three-dimensional-mechanism model simulating section and said status-transition diagram or table creating section while synchronizing said three-dimensional-mechanism model simulating section and said status-transition diagram or table creating section in operation with each other.

11. A computer-readable recording medium according to claim 10, wherein said first interface program inputs the result of the simulating by said three-dimensional-mechanism model simulating section from said three-dimensional-mechanism model simulating section to said mechanism designing section to be reflected on the designing of the mechanism.

12. A computer-readable recording medium according to claim 10, wherein:

said status-transition diagram or table creating program employs a multi-task, which executes a plurality of tasks in parallel to one another, and executes, separately from the plural tasks, a synchronous task functioning so as to stop the plural tasks during the simulation operation of said three-dimensional-mechanism model simulating section; and said second interface program synchronizes said three-dimensional-mechanism model simulating section and said status-transition diagram or table creating section in operation with each other using the synchronous task.

13. A computer-readable recording medium according to claim 12, wherein said three-dimensional-mechanism model simulating section and said status-transition diagram or table creating section are synchronized in operation with each other by setting the synchronous task to a highest priority to control starting/stopping of the plural tasks in accordance to the synchronous task.

14. A computer-readable recording medium according to claim 10, wherein said second interface program transfers data between said three-dimensional-mechanism model simulating section and a microcomputer chip, in which said embedded software being developed is embedded, while synchronizing said three-dimensional-mechanism model simulating section and said microcomputer chip in operation with each other.

15. A computer-readable recording medium according to claim 14, wherein:

said microcomputer chip employs a multi-task, which executes a plurality of tasks in parallel to one another, and executes, separately from the plural tasks, a synchronous task functioning so as to stop the plural tasks during the simulation operation of said three-dimensional-mechanism model simulating section; and said second interface program synchronizes said three-dimensional-mechanism model simulating section and said microcomputer chip in operation with each other using the synchronous task.

16. A computer-readable recording medium according to claim 15, wherein said synchronous task is set to a highest priority to control starting/stopping of the plural tasks in accordance to the synchronous task to thereby synchronize said three-dimensional-mechanism model simulating section and said microcomputer chip in operation with each other.

17. A computer-readable recording medium according to claim 10, wherein said second interface program transfers:

an actuator instruction signal for the actuator in the three-dimensional-mechanism model from said embedded software developing section to said three-dimensional-mechanism model simulating section; and a sensor signal, which is obtained as the result of simulation in response to said actuator instruction signal, from said three-dimensional-mechanism model simulating section to said embedded software developing section.

18. A computer-readable recording medium according to claim 17, wherein said support program further comprises an analyzing program for instructing the computer to function as an analyzing section which analyzes and displays variation of said actuator instruction signal for the actuator and said sensor signal from said three-dimensional-mechanism model simulating section with real time.

19. A support computer apparatus comprising:

a programmed computer processor controlling the support computer apparatus according to a process comprising:

three-dimensionally designing a mechanism composed of a plurality of parts comprising an actuator and a sensor;

simulating operation of the mechanism according to a three-dimensional-mechanism model of the mechanism based upon design data from the three-dimensional designing of the mechanism;

developing an embedded control program to be embedded in the mechanism to control the operation of the mechanism, by creating and editing a status-transition diagram or table describing specifications of the embedded control program as detailed designing of the embedded control program, and exchanging mechanism data and the status-transition specifications with the three-dimensional-mechanism model simulating while synchronizing the three-dimensional-mechanism model simulating with the status-transition specifications for developing the embedded control program.

* * * * *